United States Patent [19]

Nagase et al.

[11] Patent Number: 4,936,052
[45] Date of Patent: Jun. 26, 1990

[54] MACHINE AND METHOD OF GRINDING MOLDING DIE

[75] Inventors: Noboru Nagase; Masao Yamaguchi, both of Gifu, Japan

[73] Assignee: Nagase Iron Works Co., Ltd., Japan

[21] Appl. No.: 133,039

[22] PCT Filed: Apr. 1, 1987

[86] PCT No.: PCT/JP87/00201

§ 371 Date: Dec. 4, 1987

§ 102(e) Date: Dec. 4, 1987

[87] PCT Pub. No.: WO87/05846

PCT Pub. Date: Oct. 8, 1987

[30] Foreign Application Priority Data

| Apr. 5, 1986 | [JP] | Japan | 61-78595 |
| Apr. 5, 1986 | [JP] | Japan | 61-78596 |
| Apr. 5, 1986 | [JP] | Japan | 61-51093[U] |
| Apr. 9, 1986 | [JP] | Japan | 61-81572 |
| Apr. 9, 1986 | [JP] | Japan | 61-81573 |
| Apr. 9, 1986 | [JP] | Japan | 61-81574 |
| Apr. 9, 1986 | [JP] | Japan | 61-81575 |
| Apr. 11, 1986 | [JP] | Japan | 61-84489 |
| Apr. 11, 1986 | [JP] | Japan | 61-55195[U] |
| Apr. 12, 1986 | [JP] | Japan | 61-84808 |
| Apr. 12, 1986 | [JP] | Japan | 61-55121[U] |
| Apr. 12, 1986 | [JP] | Japan | 61-55122 |
| Apr. 22, 1986 | [JP] | Japan | 61-92870 |
| Apr. 22, 1986 | [JP] | Japan | 61-60786 |
| Jun. 21, 1986 | [JP] | Japan | 61-145410 |
| Jun. 21, 1986 | [JP] | Japan | 61-145411 |
| Aug. 27, 1986 | [JP] | Japan | 61-130559[U] |
| Sep. 30, 1986 | [JP] | Japan | 61-233952 |
| Sep. 30, 1986 | [JP] | Japan | 61-233953 |
| Oct. 24, 1986 | [JP] | Japan | 61-163714[U] |
| Oct. 24, 1986 | [JP] | Japan | 61-163715[U] |
| Dec. 22, 1986 | [JP] | Japan | 61-307445 |
| Jan. 17, 1987 | [JP] | Japan | 62-8794 |
| Jan. 17, 1987 | [JP] | Japan | 62-8795 |
| Jan. 19, 1987 | [JP] | Japan | 62-6798[U] |

[51] Int. Cl.⁵ .................. B24B 19/08; B24D 7/18

[52] U.S. Cl. .................. 51/34 E; 51/35; 51/56 R; 51/60; 51/165.75; 51/DIG. 14; 51/33 R

[58] Field of Search .................. 51/34 E, 35, 56 R, 66, 51/165.75, 165 R, 165.71, 168, DIG. 14, 33

[56] References Cited

U.S. PATENT DOCUMENTS

| 702,037 | 6/1902 | Stigliz | 51/34 E |
| 1,172,183 | 2/1916 | Wardwell | 51/34 E |
| 2,195,108 | 3/1940 | Graff | 51/34 E |
| 2,705,291 | 4/1955 | Spalding | 51/34 E |
| 3,026,653 | 3/1962 | Zordo | 51/56 |

(List continued on next page.)

FOREIGN PATENT DOCUMENTS 0105549 4/1984 European Pat. Off. .
0165762 12/1985 European Pat. Off. .

(List continued on next page.)

Primary Examiner—Frederick R. Schmidt
Assistant Examiner—Blynn Shideler
Attorney, Agent, or Firm—Ostrolenk, Faber, Gerb & Soffen

[57] ABSTRACT

A grinding apparatus comprising: the frame (1) being composed of a pair of supports (3) standing in opposing relation to each other and a support frame (4) which is stretched between and secured to the respective upper end portions of the supports (3); first moving structure (16) provided on the support frame (4) in such a manner that the first moving structure (16) is reciprocatable in one horizontal direction; second moving structure (21) provided on the first moving structure (16) in such a manner that the second moving structure (21) is reciprocatable in a horizontal direction which intersects the direction of movement of the first moving structure (16) at right angles; third moving structure (37) provided on the second moving structure (21) in such a manner that the third moving structure (37) is reciprocatively movable in the vertical direction; and a wheel head (48) provided on the third moving structure (37).

23 Claims, 45 Drawing Sheets

U.S. PATENT DOCUMENTS

| | | | |
|---|---|---|---|
| 3,466,807 | 9/1969 | Haas | 51/60 |
| 3,611,642 | 10/1971 | Stony | 51/33 R |
| 3,803,767 | 4/1974 | Kotov | 51/33 R |
| 3,822,509 | 7/1974 | Everty | 51/33 R |
| 3,846,912 | 11/1974 | Newbould . | |
| 4,537,085 | 8/1985 | Valentine . | |
| 4,555,229 | 11/1985 | Biddigo | 51/33 R |
| 4,627,196 | 12/1986 | Veal | 51/35 |

FOREIGN PATENT DOCUMENTS

| | | | |
|---|---|---|---|
| 3519993 | 6/1985 | Fed. Rep. of Germany . | |
| 48-28188 | 4/1973 | Japan . | |
| 49-29000 | 3/1974 | Japan . | |
| 49-112272 | 10/1974 | Japan . | |
| 49-122095 | 11/1974 | Japan . | |
| 51-275514 | 7/1976 | Japan . | |
| 120965 | 9/1980 | Japan | 51/34 E |
| 56-32290 | 4/1981 | Japan . | |
| 56-33264 | 4/1981 | Japan . | |
| 56-126567 | 10/1981 | Japan . | |
| 59-134646 | 1/1983 | Japan . | |
| 59-142062 | 2/1983 | Japan . | |
| 58-59765 | 4/1983 | Japan . | |
| 60108265 | 11/1983 | Japan . | |
| 59-8760 | 1/1984 | Japan . | |
| 59-50657 | 4/1984 | Japan . | |
| 59-187438 | 10/1984 | Japan . | |
| 126453 | 6/1928 | Switzerland . | |
| 357998 | 8/1957 | Switzerland . | |
| 2103129 | 2/1983 | United Kingdom . | |
| 2157649 | 10/1985 | United Kingdom . | |

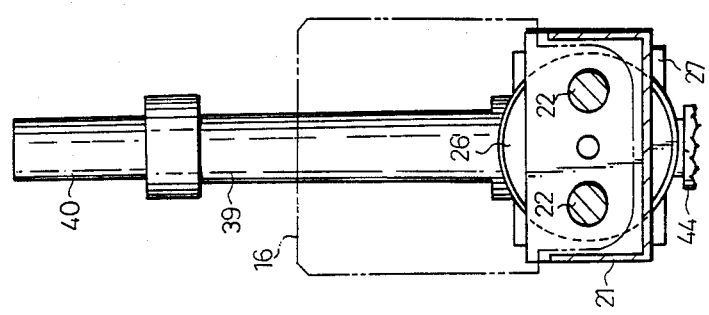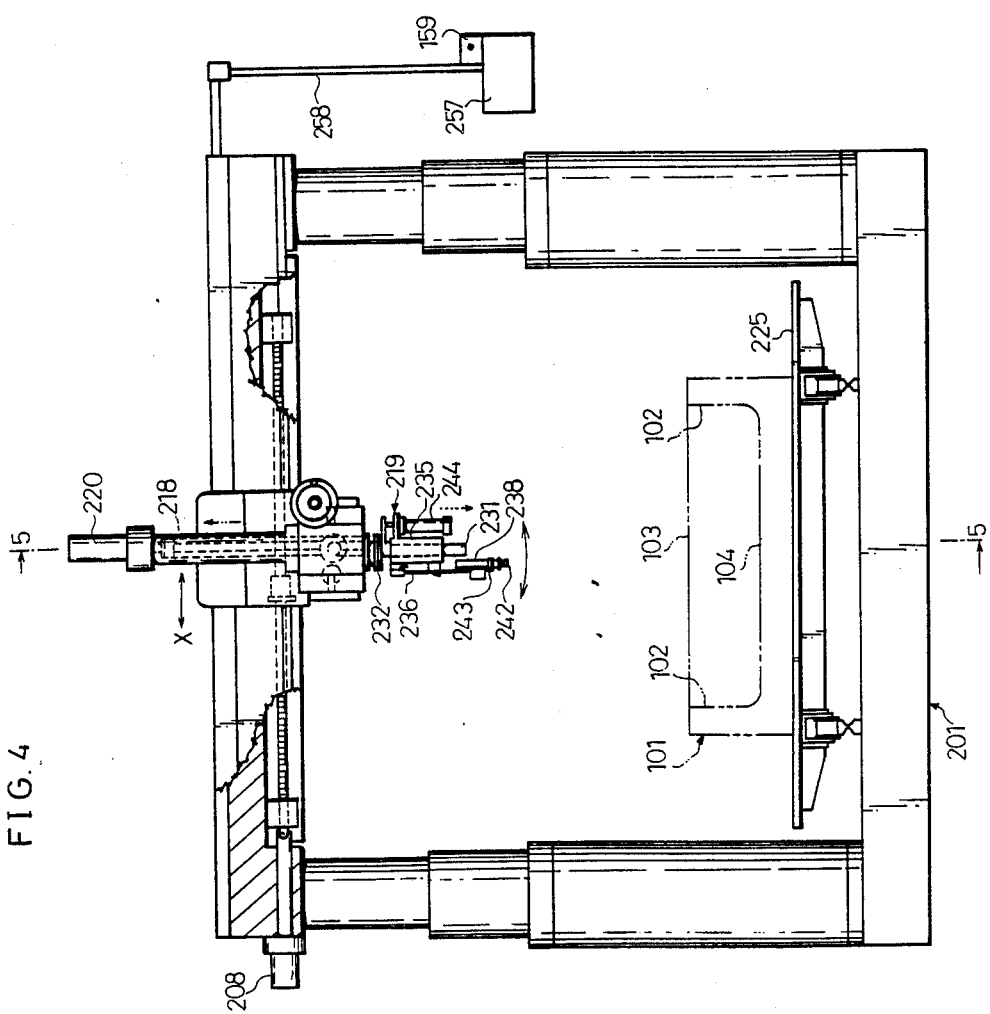

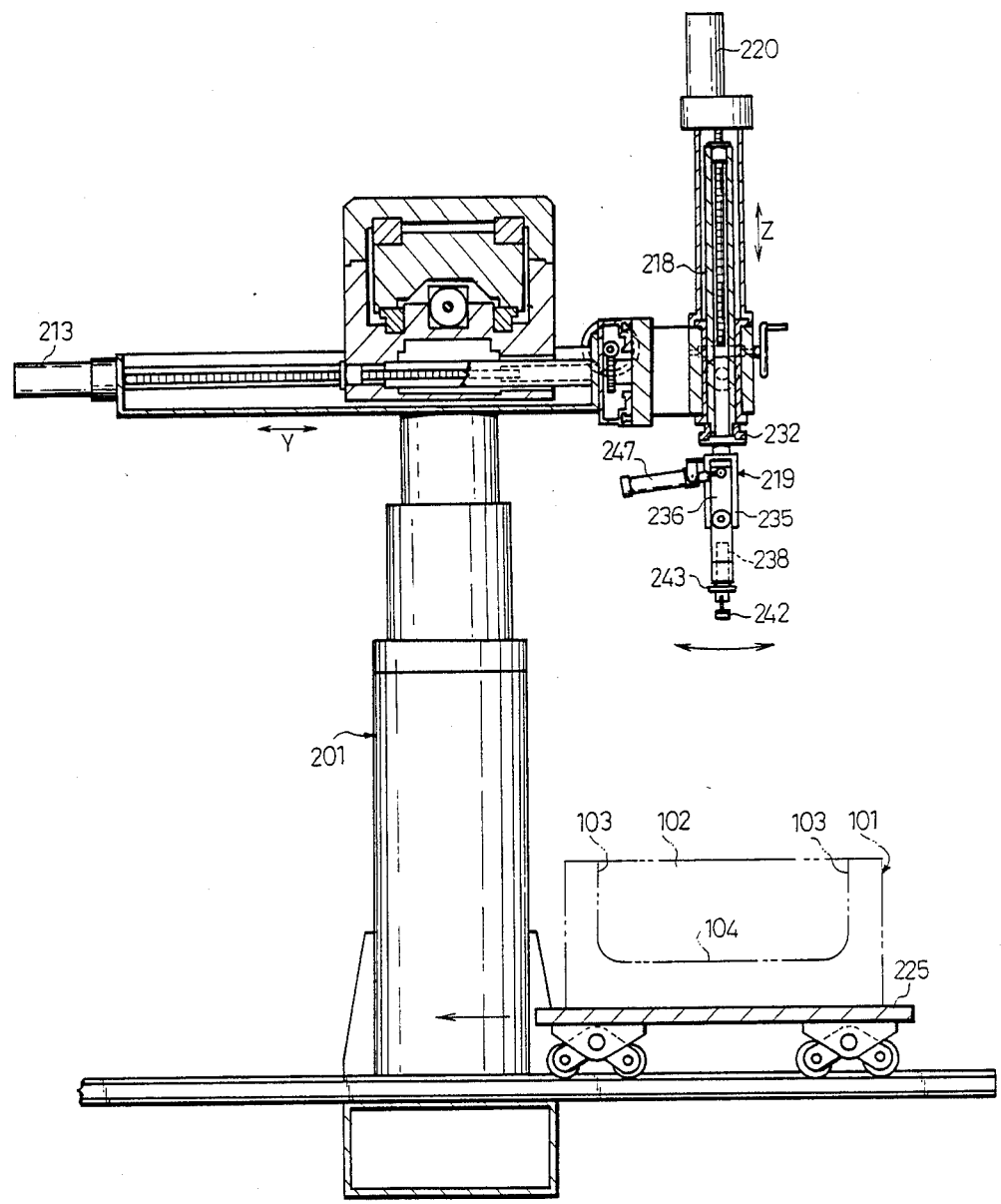

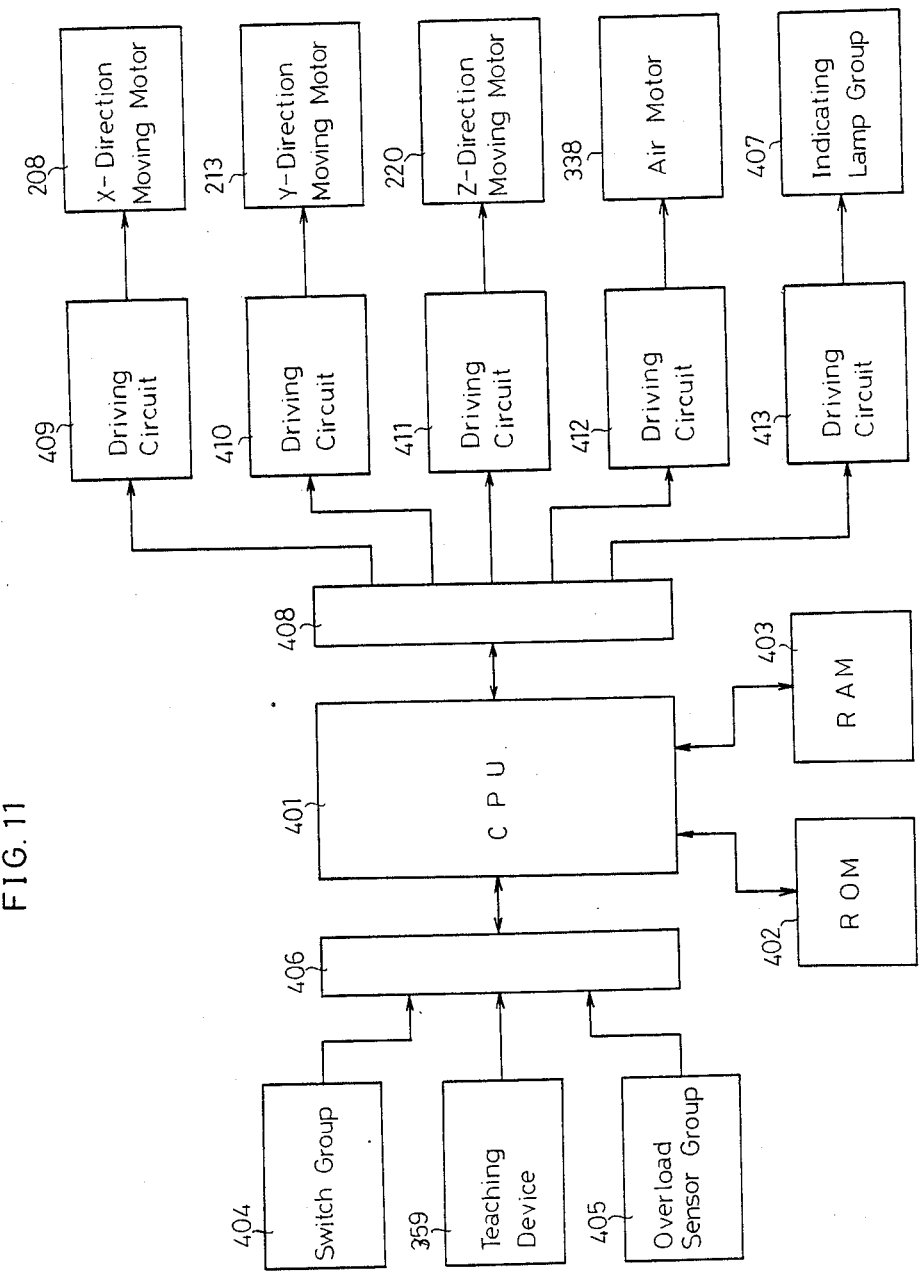

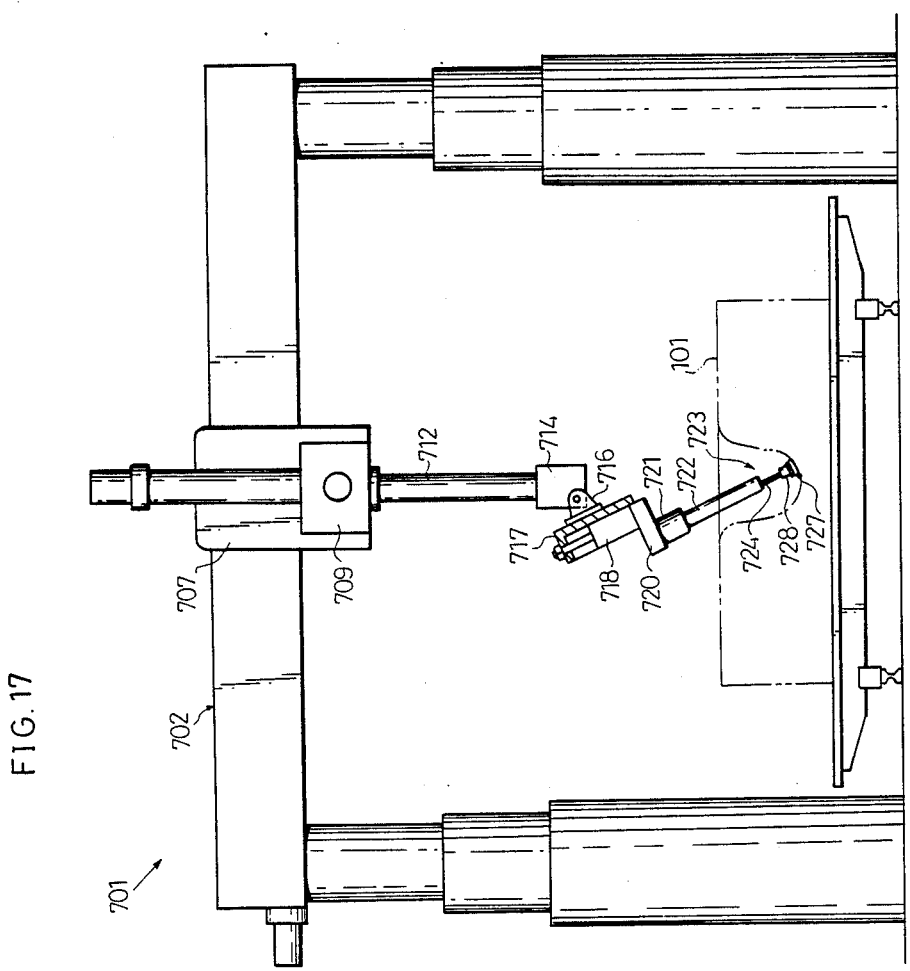

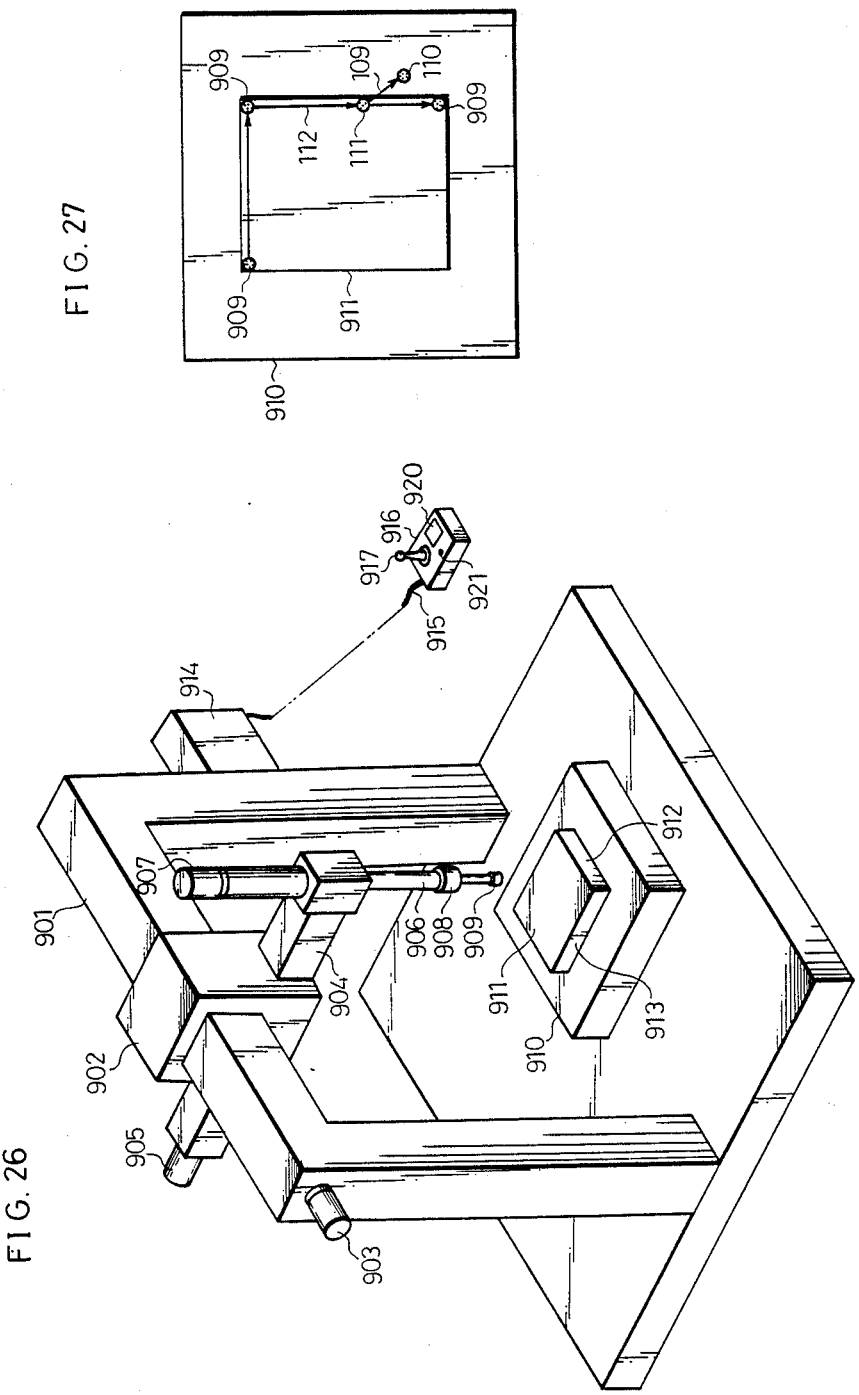

MACHINE AND METHOD OF GRINDING MOLDING DIE

TECHNICAL FIELD

The present invention relates to a grinding apparatus and method used to grind a processed surface such as a molded surface of a workpiece, for example, a molding die.

BACKGROUND ART

One type of this sort of grinding apparatus has heretofore been known in which an upper support frame which extends horizontally in the lateral direction of the apparatus is stretched between and supported by supports of a frame in such a manner that the upper support frame is movable in the longitudinal direction, and a moving member is supported on the upper support frame so as to be laterally movable, and further a wheel head is vertically movably supported on the moving member.

In this grinding apparatus, however, the upper support frame is moved on the supports together with the moving member and the wheel head in order to change the position of the wheel head in the longitudinal direction. Therefore, it is necessary to provide guide support frames or the like for the upper support frame on both lateral sides, respectively, of the frame, and this complicates the structure. Moreover, the left and right sides of the frame are closed by the guide support frames or the like. Accordingly, there is the problem that it is considerably troublesome to handle a workpiece when it is loaded into or unloaded from the frame. In addition, to grind a processed surface of a molding die or the like which has a complicated configuration, it is generally necessary to press a grindstone against the processed surface and move the grindstone in this state so as to follow changes in configuration of the processed surface.

There has been known another type of the above-described sort of grinding apparatus in which a mounting member is vertically movably supported with respect to a moving member which is supported on a frame in such a manner that the moving member is movable in two directions which intersect each other at right angles within a horizontal plane, and a wheel head is vertically movably attached to the mounting member.

However, in grinding of vertically extending processed surfaces by the use of this grinding apparatus, when, after one surface has been ground, another surface is to be ground, it is necessary to change the direction or angle in or at which the grindstone is mounted to the wheel head. Particularly, in the case where the vertically extending surfaces are curvedly contiguous with each other, the operator must frequently and repeatedly change the grindstone mounting direction or angle, which results disadvantageously in a considerable lowering in the operating efficiency.

Further, in this grinding apparatus, the change of the position of the wheel head in the vertical direction can be effected only in the vicinity of the wheel head. Accordingly, the amount of change in the position is limited and it is therefore impossible to cope with a large workpiece, disadvantageously.

A still another type of the above-described sort of grinding apparatus has heretofore been known in which a mounting member is vertically movably supported with respect to a moving member which is supported on a frame in such a manner that the moving member is movable in the longitudinal and lateral directions, and a wheel head is supported with respect to the mounting member in such a manner as to be rotatable around an axis which extends horizontally in the lateral direction and also around an axis which extends longitudinally while intersecting said axis at right angles.

However, in this grinding apparatus, the wheel head is rotatably supported on the vertically movable mounting member, and the center of rotation of the wheel head is moved in accordance with the vertical movement of the mounting member. Accordingly, the distance from the wheel head to the center of rotation thereof is constant at all times. As a result, the movable range of the wheel head is limited by the angle of rotation thereof to a narrow range, which means that the grindstone cannot reach the innermost portion of the workpiece, disadvantageously.

In still another type of the above-described sort of grinding apparatus, a single grindstone is reciprocatively oscillated along a processed surface of a workpiece to grind it.

In this grinding apparatus, however, it is necessary to set a large oscillation stroke for the grindstone in order to enable a single grindstone to grind the processed surface over a wide range. However, such an arrangement leads to an increase in the moment of oscillation of the grindstone, resulting in the grindstone support mechanism portion being heavily loaded. Accordingly, it is necessary in this grinding apparatus to strongly build the grindstone support mechanism portion, so that the arrangement of the wheel head is complicated and increased in size, disadvantageously.

In still another type of the above-described sort of grinding apparatus, an abrasive member which is defined by a grindstone is pressed against a workpiece and this grinding member is rotated or oscillated sideward within one plane which is substantially parallel to the surface of the workpiece which is being ground, thereby effecting, for example, abrasive finishing of the surface of the workpiece.

In the above described grinding apparatus, however, the abrasive member only slides on the surface being ground. Therefore, the surface being ground is subjected to no cavitation nor striking action caused on the basis of the vertical oscillation of the abrasive member. For this reason, cuttings generated and accumulated in the area between the abrasive member and the workpiece during grinding are not effectively discharged. Accordingly, it is difficult to improve the grinding efficiency of the grinding apparatus, disadvantageously.

In still another type of the above-described sort of grinding apparatus, a grindstone is tiltably supported with respect to a moving member for reciprocatively moving it so that the abrasive surface of the grindstone extends parallel with the processed surface of a workpiece at all times.

However, in this grindstone tiltably supporting arrangement, when the grindstone is rotated around an axis which is orthogonal with respect to its abrasive surface, particularly when a grindstone whose abrasive surface is polygonal, e.g., quadrangular is used, a corner of the abrasive surface is located forward in the direction of movement as the grindstone is rotated. As a result, the corner may locally contact the processed surface of the workpiece, causing a large resistance to act against the movement of the grindstone, and thus hindering the movement.

In still another type of the above described sort of grinding apparatus, an air motor for activating a grindstone is rigidly fastened to a wheel head by means of nuts and bolts through an air motor mounting member.

For this reason, if, in the above-described grinding apparatus, the nuts are not sufficiently tightened, the air motor mounting angle may be deviated from a set mounting angle by the action of vibrations or grinding pressure generated during an operation, so that the air motor cannot be maintained at the set mounting angle, disadvantageously.

In still another type of the above-described sort of grinding apparatus, when a grinding path is to be stored in memory by moving a grindstone in a desired direction in advance, the movement of the grindstone is controlled from a position which is remote therefrom using a remote-controllable teaching device.

However, the arrangement that utilizes the teaching device has the problem that, since the teaching device is remote from the grindstone and they are not combined together in one unit, the operability is inferior and it is difficult to handle the apparatus, disadvantageously.

In still another type of the above-described sort of grinding apparatus, a nozzle is disposed in the vicinity of an abrasive member, and a grinding fluid is supplied from the nozzle to cool the frictional heat generated between the abrasive member and the workpiece.

However, it is necessary in a workpiece grinding apparatus to move the abrasive member in various directions as desired in accordance with a variety of configurations of workpieces. Accordingly, in the above-described grinding apparatus, the nozzle interferes with the abrasive member and limits the movement of the latter and the provision of the nozzle increases the number of required parts of the grinding apparatus, disadvantageously.

There is one type of grinding tool which is disclosed in Japanese Utility Model Publication No. 37-20287 (20287/1962). This tool is arranged such that a spherical joint receiver is fitted to a power transmission member which is secured to the distal end of a driving shaft, and projections are provided on the inner peripheral wall of a spherical hole provided in the spherical joint receiver in such a manner that the projections are equally spaced apart from each other along the circumference. On the other hand, a spherical portion of a spherical joint which is provided with a longitudinal slide groove engageable with the projections irremovably received within the spherical hole. In addition, a pad plate which is provided with sand paper is rigidly secured to the lower end of a leg portion of the spherical joint by means of a flat countersunk head screw. Further, a pressing spring is interposed between the pad plate and the above-described power transmission member so that a grinding operation can readily be carried out in accordance with irregularities on the processed surface without changing the angle of inclination of the driving shaft.

In the above-described grinding tool, the pressing force applied to the processed surface by the grinding apparatus acts on the spherical joint at the inner top portion of the spherical hole in the spherical joint receiver which is spaced apart from the sand paper. Accordingly, when the central axis of the pad plate intersects the central axis of the driving shaft at an angle as the pad plate follows irregularities on the processed surface, since the distance from the top portion of the spherical joint to the sand paper is long, the pad plate readily comes off the processed surface, undesirably. Therefore, in order to prevent the pad plate from coming off the processed surface, the pressing spring is provided to bias the pad plate, and the diameter of the pad plate is made much larger than the distance from the top portion of the spherical joint to the sand paper.

For this reason, the above-described grinding tool suffers from the following problems: the number of required parts is disadvantageously large; the structure is complicated; and much labor and time are needed to assemble the tool. In addition, since it is difficult to reduce the diameter of the pad plate to a substantial extent, it is disadvantageously impossible to grind irregularities having small curvatures.

As one type of this sort of grinding tool, for example, a grinding tool such as that shown in FIG. 85 is known in which a grindstone 2231 is rigidly secured to the distal end of a base member 2230 which is inserted into a recess 183 in a workpiece 101. The base member 2230 is connected to an oscillation generator for a wheel head in a grinding apparatus (these are not shown), and after one inner wall surface 181 has been ground by the oscillation of the grindstone 2231 under pressure, the grindstone 2231 is turned upside down to grind the other inner wall surface 182.

In the case of using this grinding tool, however, an independent grinding step is needed for each processed surface and, in addition, every time processed surfaces to be ground are changed from one to another, the grinding tool must inconveniently be dismounted from and remounted on the wheel head, and this lowers the operating efficiency. When the recess 183 is narrow, the pressure with which the grindstone 2231 is pressed against the processed surface may be nonuniform, that is, said pressure at the inner end side of the recess 183 may be different from that at the open end side, resulting in unevenness of grinding. Further, when the recess 183 is narrow, it may be impossible to insert the grinding tool itself into the recess 183.

It is an object of the present invention to provide a grinding apparatus which facilitates handling of a workpiece including loading thereof and unloading thereof after machining.

It is another object of the present invention to provide a grinding apparatus which is capable of readily coping with a variety of workpieces which have various sizes.

It is still another object of the present invention to provide a grinding apparatus which enables a grindstone to reach satisfactorily the innermost portion of a processed surface of a workpiece.

It is a further object of the present invention to provide a grinding apparatus which is capable of successively grinding processed surfaces of a workpiece.

It is a still further object of the present invention to provide a grinding apparatus which is capable of efficiently grinding a processed surface.

It is a still further object of the present invention to provide a grinding apparatus and method which enables a pressure cylinder to be readily switched over between an operative state and an inoperative state.

It is a still further object of the present invention to provide a grinding apparatus and method which enables data concerning a grinding path to be readily stored in memory.

It is a still further object of the present invention to provide a grinding apparatus and method which enables a grinding operation to be efficiently carried out without the need to designate a grinding path for each machining process.

It is a still further object of the present invention to provide a grinding method which has no need to move a wheel head from a movement terminating position to a movement starting position after the completion of the teaching step and therefore enables the operation to be simplified.

It is a still further object of the present invention to provide a grinding apparatus and method which involves no fear of a grindstone to collide with a projection or the like on the processed surface.

It is a still further object of the present invention to provide a grinding apparatus and method which enables a grinding operation to be safely carried out without any fear of a grinding operation or the like being continued with a grindstone being overloaded and without any risk of a grinding operation to be repeatedly conducted on the basis of erroneous grinding path data.

It is a still further object of the present invention to provide a grinding apparatus which is capable of grinding a processed surface uniformly and with high accuracy without any unevenness of grinding, i.e., without any fear of a recess in the processed surface being insufficiently ground and without any fear of a projection on the processed surface being excessively ground.

It is a still further object of the present invention to provide a grinding apparatus which is capable of minimizing vibration of the grindstone which are transmitted to the frame.

It is a still further object of the present invention to provide a grinding apparatus which enables even a narrow portion in a processed surface having a complicated configuration to be readily ground.

It is a still further object of the present invention to provide a grinding apparatus which is so designed that it is possible to simplify the arrangement of each moving member and the frame.

It is a still further object of the present invention to provide a grinding apparatus which is so designed that the performance of the grindstone to follow the processed surface is improved in order to enable a grinding operation to be carried out without any hindrance.

It is a still further object of the present invention to provide a grinding apparatus which is capable of uniformly grinding a processed surface by enabling the grindstone to readily follow even irregularities on the processed surface which have small curvatures.

It is a still further object of the present invention to provide a grinding apparatus which is free from a fear of the air cylinder and the rotary mechanism portion interfering with each other in response to the rotation of the wheel head.

It is a still further object of the present invention to provide a grinding apparatus which is so designed that it is possible to eliminate the need for the operator to change the position of the grindstone in which it is mounted on the wheel head in accordance with the position of the processed surface to be ground, thereby enabling an improvement in the operating efficiency.

It is a still further object of the present invention to provide a grinding apparatus and method which is so designed that, when the grindstone moves along an erroneous path during the teaching step, the teaching step need not be redone from the beginning, and there is no fear of the machining time being wasted in the playback step and no fear of the erroneous path portion being unevenly ground by overgrinding.

It is a still further object of the present invention to provide a grinding apparatus and method which enables the teaching step to be carried out continuously and smoothly.

It is a still further object of the present invention to provide a grinding apparatus and method which enables an operation for correction to be simply and speedily carried out in the teaching step.

It is a still further object of the present invention to provide a teaching box used in a teaching operation in relation to a grinding apparatus or the like, the teaching box being so designed that accurate teaching can be effected with a simple structure and there is substantially no fear of failure.

It is a still further object of the present invention to provide a grinding apparatus wherein the grindstone is smoothly reciprocated to enable a grinding operation to be carried out smoothly.

It is a still further object of the present invention to provide a grinding apparatus which is so designed that there is no need to increase the grindstone operating stroke and it is possible to simplify the arrangement of the wheel head and reduce the size thereof as well as enable a processed surface of a workpiece to be ground over a wide range at the same time by cooperation of a plurality of grindstones.

It is a still further object of the present invention to provide a grinding apparatus which is so designed that a plurality of grindstones can be driven by means of a single common motor and it is therefore possible to simplify the arrangement for driving the same.

It is a still further object of the present invention to provide a grinding apparatus which is so designed that a workpiece is eroded by means of cavitation and striking action caused on the basis of vertical vibration of an abrasive member in addition to grinding effected by the reciprocative movement of the abrasive member within a horizontal plane and cuttings which are generated from the grinding member and the workpiece are discharged without any fear of residing in the area therebetween.

It is a still further object of the present invention to provide a grinding apparatus which is so designed that an abrasive member can be brought into contact with a ground surface of a workpiece over a wide area.

It is a still further object of the present invention to provide a grinding apparatus which is so designed that there is no need to dispose an obstructive member such as a nozzle for supplying a grinding fluid in the vicinity of an abrasive member, thereby enabling an increase in the degree of freedom with which the abrasive member moves and also permitting a reduction in the number of required parts.

It is a still further object of the present invention to provide a grinding apparatus which is so designed that it is possible to increase the workpiece cooling effect by means of a grinding fluid.

It is a still further object of the present invention to provide a grinding apparatus which is so designed that the grindstone is not rotated around an axis which intersects its abrasive surface at right angles.

It is a still further object of the present invention to provide a grinding apparatus which is so designed that the grindstone can smoothly be moved without any hindrance With its abrasive surface being kept parallel with the processed surface of a workpiece.

It is a still further object of the present invention to provide a grinding apparatus which exhibits excellent operability in the teaching step and which can be handled extremely easily.

It is a still further object of the present invention to provide a grinding apparatus which is so designed that it is possible to clearly designate the direction in which an actuating member may be operated with a reduced number of indicating elements and to thereby improve the operability.

It is a still further object of the present invention to provide a grinding apparatus which is so designed that it is possible to readily adjust the angle at which the wheel head is mounted with respect to the Z-direction moving shaft.

It is a still further object of the present invention to provide a grinding apparatus which is so designed that an air motor can be readily and reliably retained in a position of desired angle.

It is a still further object of the present invention to provide a grinding apparatus which is so designed that it is possible to readily and accurately adjust the amount of air to be supplied to each of the first and second air cylinders.

It is a still further object of the present invention to provide a grinding apparatus which is so designed that the grindstone can readily be inserted into and removed from a recess in a workpiece.

It is a still further object of the present invention to provide a grinding apparatus which is so designed that it is possible to simultaneously grind a plurality of inner wall surfaces of a workpiece in a single step without the need to change the position of the grindstone. It is a still further object of the present invention to provide a grinding apparatus which is so designed that, when a ribbed workpiece which has a plurality of grinding blocks is to be ground, it is possible to reduce the number of times of movement of the grindstone along non-grinding paths corresponding to the ribs of the workpiece, so that it is possible to eliminate a waste of time and to thereby enable the machining efficiency to be further improved.

It is a still further object of the present invention to provide a grinding apparatus which is so designed that the processed surface of a workpiece can be finished beautifully without any fear of a pattern of movement of the grindstone being left on the finished surface.

DISCLOSURE OF INVENTION

According to the present invention, a frame 1 is composed of a pair of supports 3 which stand in opposing relation to each other and a support frame 4 which is stretched between and secured to the respective upper end portions of the supports 3, and first moving means 16 is provided on the support frame 4 so as to be reciprocatable in one horizontal direction, the first moving means 16 being provided with second moving means 21 so as to be reciprocatable in a horizontal direction which intersects at right angles the direction of movement of the first moving means 16, the second moving means 21 being provided with third moving means 37 so as to be reciprocatable in the vertical direction, the third moving means 37 being provided with a wheel head 48. Accordingly, it is possible to readily effect handling of a workpiece 101 including loading of the workpiece 101 and unloading it after machining.

Further, according to the present invention, biasing means 515 for biasing the grindstone 526 toward a processed surface of the workpiece 101 is provided between a wheel head 511 and drive means 522. Accordingly, it is possible to grind the processed surface uniformly and highly accurately without unevenness of grinding, that is, without any fear of a recess in the processed surface being insufficiently ground and without any fear of a projection on the processed surface being excessively ground.

Further, according to the present invention, mounting means 615, 616 and 622 are provided for mounting a grindstone 624 at a position which is eccentric with respect to a wheel head 613. Accordingly, it is possible to minimize vibration of the grindstone 624 which are transmitted to a frame 601.

Further, according to the present invention, there are provided a support member 1536 which is attached at its upper end to the moving members 16, 21 and 37 so as to be movable in both the horizontal directions and which supports at its lower end a grindstone 1539, an actuating member 1563 which is provided on the support member 1536 in order to tilt the grindstone 1539 together with the support member 1536 in the horizontal directions, and a pair of detectors 1546 and 1550 for detecting tilting of the support member 1536 in both the horizontal directions by the actuating member 1563 to thereby move the moving members 16 and 21 in both the horizontal directions. Accordingly, operability in the teaching step is excellent and the workpiece can be handled extremely easily.

Further, according to the present invention, there are provided actuators 1659 and 1660 which generate signals for moving the wheel head 48 in two of the three direction, i.e., two orthogonal horizontal directions and the vertical direction, on the basis of the manual operation conducted on an actuating member 1655. Accordingly, it is possible to clearly designate directions in which the actuating member 1655 may be operated by means of a reduced number of indicating members 1671 to 1675 and to thereby improve the operability.

Further, according to the present invention, there is provided means 2028 for activating third driving means 2607 corresponding to the remaining one direction among the above-described three directions so that a grindstone 2013 is moved to the remaining one direction when a set processed surface is being ground. Accordingly, when a ribbed workpiece 101 which has a plurality of grinding blocks is to be ground, it is possible to reduce the number of times of movement of the grindstone 2013 along non-grinding paths corresponding to the ribs of the workpiece 101, so that it is possible to eliminate a waste of time and improve the machining efficiency.

Further, according to the present invention, a drive means 1744 is arranged so that the position of its rotation around one axis is adjustable, and the drive means 1744 is provided on its outside with a mounting angle adjusting member 1749 which has on its outer peripheral surface a circular portion with its center at said axis and which has first engagement portions 1750 formed on the circular portion, while a wheel head 1714 is provided with second engagement portions 1752 which are engageable with the first engagement portions 1750 of the mounting angle adjusting member 1749 at a position of desired angle of rotation, so that the drive means 1744 is retained at a position of desired angle by engagement of the first and second engagement portions 1750 and 1752. Accordingly, the drive means 1744 can readily and reliably be retained at a position of desired angle.

Further, according to the present invention, a plurality of grindstones 1017 are disposed at predetermined intervals so as to be reciprocatable in the same direction. Accordingly, it is unnecessary to increase the operating stroke of each grindstone 1017, and it is possible to simplify the arrangement of the wheel head and reduce the size thereof. In addition, cooperation of the plurality of grindstones 1017 enables a processed surface of the workpiece 101 to be ground over a wide range at the same time.

Further, according to the present invention, the grindstone 1417 is tiltably supported on moving members 1415 and 1431 so that the abrasive surface 1417a of the grindstone 1417 extends parallel with the processed surface of the workpiece 101. In addition, a restraining means 1420 is provided between the grindstone 1417 and the moving members 1415, 1431 so as to restrain the rotation of the grindstone 1417 around an axis which intersects the abrasive surface 1417a at right angles. Accordingly, there is no fear of the grindstone 1417 rotating around the axis intersecting the abrasive surface 1417a at right angles.

Further, according to the present invention, a vibration generator 1103 is connected to an abrasive member 1113 for applying vibration to the abrasive member 1113 in a direction which crosses the direction of movement of the abrasive member 1113. Accordingly, the workpiece 101 is eroded by means of cavitation and striking action caused on the basis of vertical vibrations of the abrasive member 1113 in addition to grinding effected by the reciprocative movement of the abrasive member 1113 within a horizontal plane. In addition, cuttings which are generated from the abrasive member 1113 and the workpiece 101 are discharged without residing in the area therebetween.

Further, according to the present invention, there is provided a grinding fluid supply passage 1305 which opens to the abrasive surface 1306 of an abrasive member 1302. Accordingly, it is unnecessary to provide any obstructive member such as a nozzle for supplying a grinding fluid in the vicinity of the abrasive member 1302. It is therefore possible to increase the degree of freedom with which the abrasive member 1302 moves and also reduce the number of required parts.

Further, according to the present invention, a cushioning member 1203 which is made from a flexible material is secured to a support member 1202, and a planar abrasive member 1204 is bonded to the surface of the cushioning member 1203. Accordingly, the abrasive member 1204 can be brought into contact with the ground surface of the workpiece 101 over a wide area.

Further, according to the present invention, an abrasive means 732 is arranged so as to follow irregularities on the processed surface of the workpiece 101. Accordingly, it is possible to improve the capability of the abrasive means 732 to follow the processed surface, so that a grinding operation can be carried out without any hindrance.

Further, according to the present invention, an abrasive member 1901 comprises a base member 1902 which is inserted into a recess 1912 in the workpiece 101, an actuating member 1906 which is reciprocatable in a plurality of directions each of which intersects the axis of the insertion at right angles, and a plurality of grindstones 1911 for grinding inner wall surfaces 131 and 132 which are provided in correspondence with the directions, respectively, of movement of the actuating member 1906. Accordingly, a plurality of inner wall surfaces 131, 132 of the workpiece 101 can simultaneously be ground in a single step without the need to change the position of each grindstone 1911.

Further, the present invention comprises the teaching step in which a predetermined grinding path 112 is profiled by teaching means 359 and the grinding path 112 alone is stored in memory means 403 irrespective of the profiling speed, and the machining step in which the grindstone 242, 909 is repeatedly reciprocated only within a range designated in advance in accordance with the grinding path 112 stored in the memory means 403. Accordingly, it is unnecessary to designate the grinding path 112 for each machining process, and therefore the grinding operation can be carried out efficiently.

Further, the present invention comprises the teaching step in which a grindstone is moved along a desired path by a manual operation of an actuating member 2115 and the moving path 172 is input to memory means, and the playback step in which the grindstone 2109 is moved along a grinding paths 173 to 176 which are shifted from the stored moving path by predetermined amounts to thereby grind processed surfaces 2111 to 2113 of the workpiece 101. Accordingly, it is possible to finish beautifully the processed surfaces of the workpiece 101 without leaving any pattern of movement of the grindstone 2109 on the finished surfaces.

BRIEF DESCRIPTION OF DRAWINGS

FIG. 3 is a fragmentary enlarged sectional view taken along the line 3—3 of FIG. 2;

FIG. 4 is a partially sectioned front view of a grinding apparatus according to a second embodiment;

FIG. 5 is a sectional view taken along the line 5—5 of FIG. 4;

FIG. 11 is a block diagram of a control circuit;

FIG. 17 is a front view of a die grinding apparatus;

FIG. 18 is a vertical sectional view of another example of a grinding tool;

FIG. 26 is a perspective view of a die polishing machine according to an eighth embodiment;

FIG. 27 is a plan view of a die for describing a teaching method;

BEST MODE FOR CARRYING OUT THE INVENTION

Figure 1:
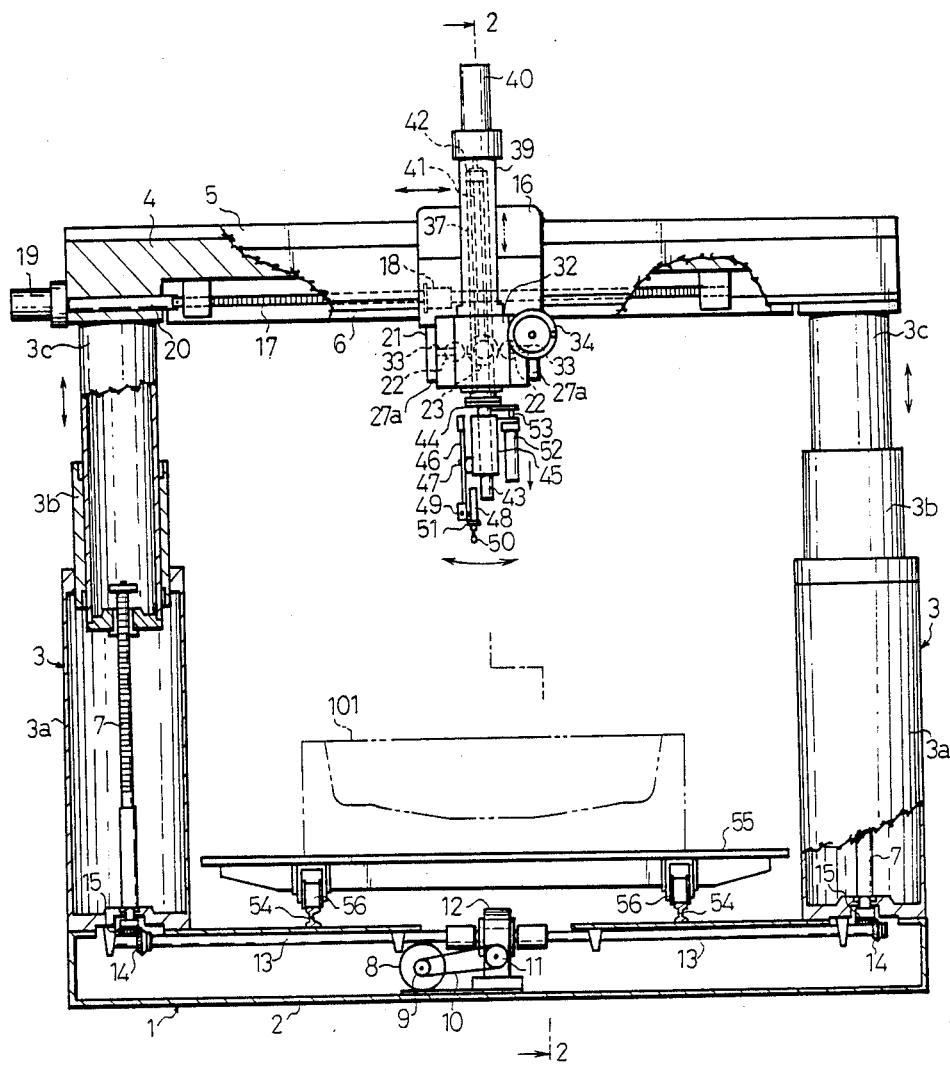
FIG. 1 is a partially-sectioned front view of a grinding apparatus according to a first embodiment.

A first embodiment of the grinding apparatus which embodies the present invention will be described hereinunder in detail with reference to FIGS. 1 to 3.

A frame 1 of this grinding apparatus is composed of a substantially box-shaped base 2 which is elongated in the lateral direction, a pair of supports 3 standing on the upper surfaces of the left and right ends, respectively, of the base 2, and an upper support frame 4 which extends horizontally in the lateral direction and which is stretched between and secured to the respective upper end portions of the supports 3, and the frame 1 thus defines a substantially gate-shaped configuration. Each of the supports 3 consists of a fixed tube 3a having a large diameter, a guide tube 3b which is fitted and secured to the upper end thereof, and a movable tube 3c having a small diameter and vertically stretchably fitted to the guide tube 3b. Further, two pairs of front and rear slide guide members 5 and 6 are secured to the upper and lower surfaces, respectively, of the upper support frame 4.

A lifting screw bar 7 is rotatably supported within the fixed tube 3a of each of the supports 3 and is in thread engagement with the lower end of the movable tube 3c. A reversible lifting motor 8 is provided inside the base 2. As the motor 8 rotates, both the screw bars 7 are rotated through a driving pulley 9, a belt 10, a driven pulley 11, a speed reducer gear 12, a pair of left and right transmission shafts 13, driving gears 14 and driven gears 15, thus causing both the movable tubes 3c to be vertically moved together with the upper support frame 4 in one unit.

An X-direction moving member 16 is laterally movably supported on the upper support frame 4 of the frame 1 through the slide guide members 5 and 6. A screw bar 17 for movement in the X-direction is rotatably supported on the lower surface of the upper support frame 4 and is in thread engagement with a ball screw member 18 provided within the X-direction moving member 16. A reversible motor 19 for movement in the X-direction is attached to the left end of the upper support frame 4. As the motor 19 rotates, the screw bar 17 is rotated through the transmission shaft 20, thus causing the X-direction moving member 16 to move in the lateral direction.

A Y-direction moving member 21 having a substantially U-shaped cross-sectional configuration is longitudinally movably supported on the X-direction moving member 16 through a pair of left and right guide bars 22 which extend through the X-direction moving member 16. A screw bar 23 for movement in the Y-direction is rotatably supported on the Y-direction moving member 31 and is in thread engagement with a ball screw member 24 within the X-direction moving member 16. A reversible motor 25 for movement in the Y-direction is attached to the rear side of the Y-direction moving member 21. As the motor 25 rotates, the screw bar 23 is rotated and the Y-direction moving member 21 is thereby moved in the longitudinal direction.

A cylindrical gear case 26 is secured to the front side of the Y-direction moving member 21. A first rotary member 27 is supported at the front side of the gear case 26 through an annular guide rail 28 in such a manner that the first rotary member 27 is rotatable around one horizonal axis which extends longitudinally. A first rotating handle 29 is provided on the right-hand side of the gear case 26. As the handle 29 is rotated, the first rotary member 27 is rotated by a predetermined angle through a worm 30 and a worm wheel 31.

A second rotary member 32 is supported between a pair of projecting walls 27a projecting from the front side of the first rotary member 27 through a pair of left and right pins 33 in such a manner that the second rotary member 32 is rotatable around a laterally extending axis which intersects at right angles the axis of rotation of the first rotary member 27. A second rotating handle 34 is provided on the right-hand side of the first rotary member 27. As the handle 34 is rotated, the second rotary member 32 is rotated by a predetermined angle through a worm 35 and a worm wheel 36.

A tubular Z-direction moving member 37 is vertically movably supported by the second rotary member 32 through a guide member 38 in such a manner that the Z-direction moving member 37 extends through the second rotary member 32. A support tube 39 is secured to the second rotary member 32 in such a manner as to-surround the Z-direction moving member 37. A reversible motor 40 for movement in the Z-direction is attached to the upper end of the support tube 39. A screw bar 41 for movement in the Z-direction is extended from the lower side of the motor 40 and is in thread engagement with a ball screw member 42 provided on the Z-direction moving member 37 As the motor 40 for movement in the Z-direction rotates, the screw bar 41 is rotated and the Z-direction moving member 37 is thereby moved vertically.

A guide support shaft 43 is secured through a coupling 44 to the lower end of the Z-direction moving member 37 in such a manner as to project therefrom A slide member 45 is vertically movably supported on the guide support shaft 43. A support arm 46 is tiltably supported at one side of the slide member 45 through a laterally extending support shaft 47. A wheel head 48 is tiltably attached to the lower end of the support arm 46 through a longitudinally extending support shaft 49. A grindstone 50 is detachably secured to the lower portion of the wheel head 48. Reciprocative oscillation in the longitudinal direction is applied to the grindstone 50 through an oscillation generator 51 in response to the operation of an air motor which is provided inside the wheel head 48. It should be noted that the grindstone 50 may be activated to perform rotation in place of the oscillation. A cylinder 52 is provided at one side of the slide member 45, and the upper end of a piston rod 53 of the cylinder 52 is secured to the coupling 44. In response to the operation of the cylinder 52, the slide member 45 is biased so as to move downward, thus causing the grindstone 50 to be pressed against a processed surface of a workpiece W described later.

On the other hand, a pair of left and right guide rails 54 are disposed on the base 2 in such a manner that the guide rails 54 extend longitudinally through the area between the supports 3 of the frame 1. A table 55 is longitudinally movably supported on the guide rails 54 through a plurality of wheels 56. The table 55 is adapted to mount a workpiece 101 such as a molding die on its upper side. The table 55 is longitudinally moved by means of a motor (not shown) for self-propelled traveling so that the workpiece W is loaded to and positioned under the grindstone 50, that is, at the machining position and the workpiece W is unloaded from the machining position, as shown in FIG. 2.

Figure 2:
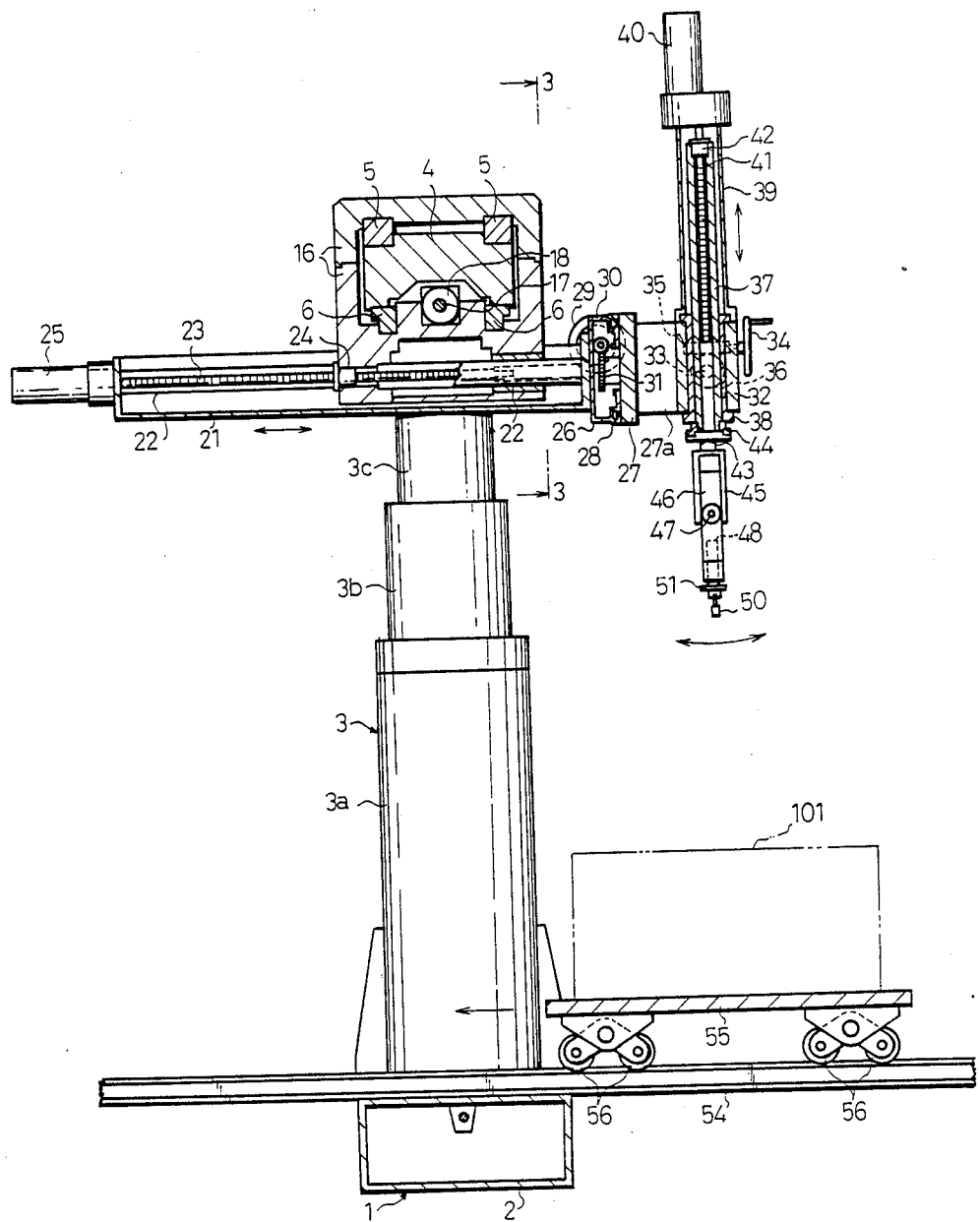
FIG. 2 is a sectional view taken along the line 2—2 of FIG. 1.

The following is a description of the operation of the grinding apparatus arranged as detailed above When a processed surface such as a molded surface of a workpiece 101 such as a molding die is to be polished using the grinding apparatus, the workpiece 101 is mounted on the table 55 and then loaded to and positioned at the machining position under the grindstone 50 as shown in FIG. 2. In this case, since the frame 1 is formed in the substantially gate-like shape from the base 2, the pair of supports 3 and the upper support frame 4 and the left and right sides of the frame 1 are substantially wholly open, it is possible to facilitate handling of the workpiece 101 including loading of the workpiece 101 and unloading of it after machining.

When the lifting motor 8 is rotated thereafter, the lifting screw bars 7 within the supports 3 are rotated, so that the supports 3 are expanded or contracted in the vertical direction and the upper support frame 4 is thus moved vertically. When the motors 19, 25 and 40 for movement in the X-, Y- and Z-directions, respectively, are rotated as desired, the screw bars 17, 23 and 41 which respectively correspond thereto are rotated. In consequence, the X-, Y- and Z-direction moving members 16, 21 and 37 are moved and the position of the wheel head 48 is thus changed laterally, longitudinally and vertically, respectively. Accordingly, the wheel head 48 can readily be moved and disposed at a position close to a processed surface of the workpiece 101. In particular, the amount of movement of the wheel head 48 in the vertical direction can be ensured to a substantial extent by means of the adjustment of expansion and contraction of the supports 3 and the adjustment of movement of the Z-direction moving members 37. Thus, it is possible to readily cope with a variety of workpieces having various sizes.

As the first and second rotating handles 29 and 34 are turned, the Z-direction moving member 37 supporting the wheel head 48 is laterally rotated about an axis extending longitudinally and is also longitudinally rotated about an axis extending laterally. At this time, the centers of these two different kinds of rotation of the Z-direction moving member 37 are disposed at a constant position at all times during the rotation thereof, and after the Z-direction moving member 37 has been rotated in a desired direction, it is moved vertically. Accordingly, the wheel head 48 can be moved over a wide range, so that the grindstone 50 is allowed to satisfactorily reach the innermost portion of the processed surface of the workpiece 101.

When, in this state, the cylinder 52 is activated, the wheel head 48 is biased so as to be moved further downward, causing the grindstone 50 to be pressed against the processed surface of the workpiece 101. When, in this pressing state, the air motor inside the wheel head 48 is activated, longitudinal reciprocative oscillation is applied to the grindstone 50 through the oscillation generator 51. Accordingly, this processed surface of the workpiece 101 can successively be ground by moving the grindstone 50 along the processed surface laterally, longitudinally or vertically as desired.

A second embodiment of the present invention will next be described with reference to FIGS. 4 to 8. In the second embodiment, servomotors 208, 213 and 220 are employed as motors for movement in the X-, Y- and Z-directions, respectively. In addition, the workpiece 101 is mounted on a table 225 in the same way as in the first embodiment.

First, the arrangement of a wheel head 219 will be explained in detail with specific reference to FIGS. 6 and 7. A guide support bar 231 is attached to the lower end of the above-described Z-direction moving member 218 through a rotary coupling 232 which consists of a fixed disk 233 and a movable disk 234. A slide member 235 is vertically movably supported on the guide support bar 231. A support arm 236 is pivotally supported at one side of the slide member 235 through a laterally extending support shaft 237. An air motor 238 is tiltably supported at the lower end of the support arm 236 by a longitudinally extending support shaft 239 through a support tube 240. The air motor 238 is normally retained in the vertical position shown in FIG. 6 by the action of a plurality of springs 241. A grindstone 242 is attached to the lower portion of the support tube 240 through an oscillation generator 243. Thus, the grindstone 242 is reciprocatively oscillated in the longitudinal direction through the oscillation generator 243 in response to the rotation of the air motor 238.

Figure 6:
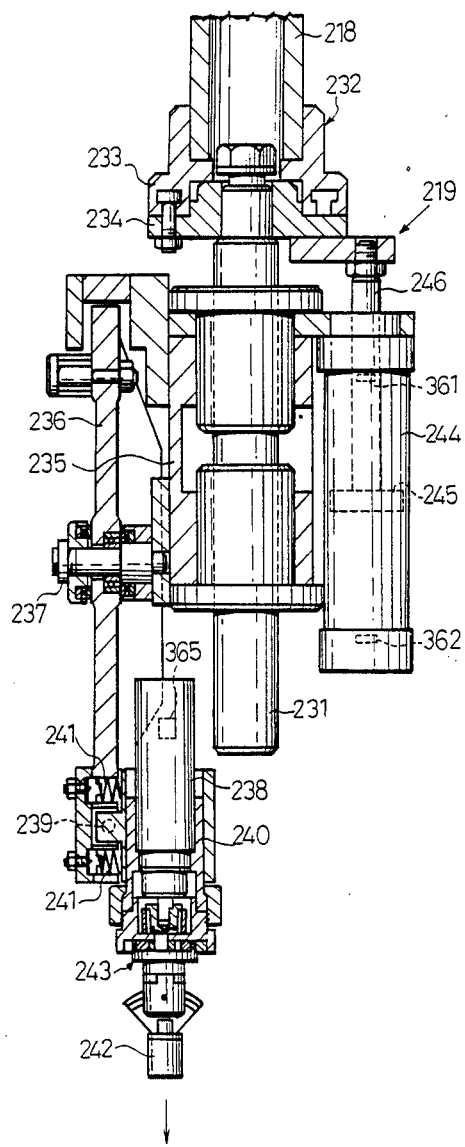
FIG. 6 is an enlarged sectional front view showing the arrangement of the wheel head portion.

As shown in FIG. 6, a first air cylinder 244 which defines pressing means is attached to one side of the slide member 235. The distal end of a rod 246 which extends from a piston 245 of the air cylinder 244 is secured to the movable disk 234 of the rotary coupling 232. Two of the three directions, i.e., the X-, Y- and Z-directions, for example, the X- and Y-directions, are selected and set as directions of movement of the wheel head 219, and a processed surface 104 of the bottom of the workpiece 101 is then ground by moving the wheel head 219 in the X- and Y-directions in response to the rotation of the motors 208 and 213 for movement in the X- and Y-directions. In this case, the slide member 235 is biased so as to move in the remaining one direction, i.e., the Z-direction (downward) by the action of the first air cylinder 244, thus causing the grindstone 242 to be pressed against the bottom processed surface 104.

Figure 7:
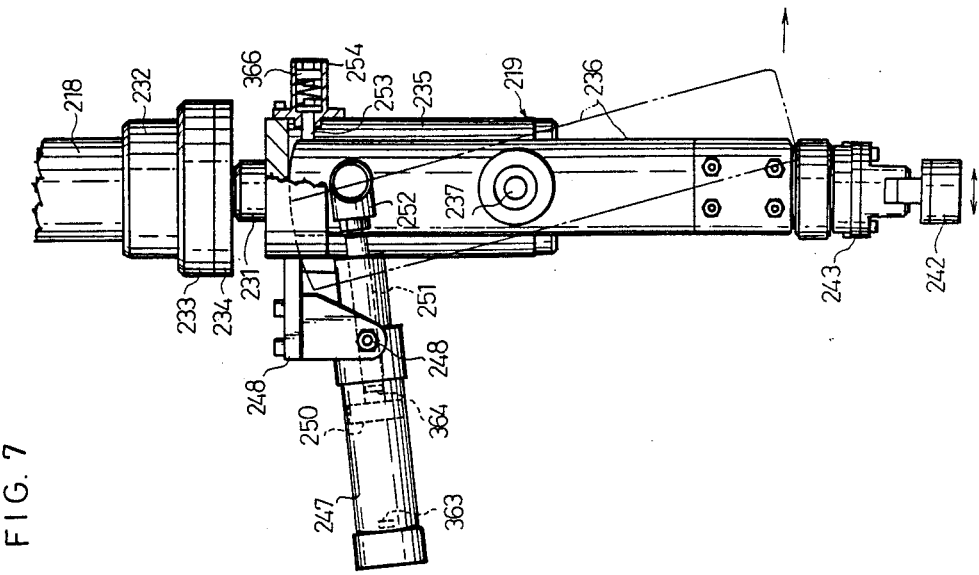
FIG. 7 is an enlarged side view showing the arrangement of the wheel head portion.

As shown in FIG. 7, a second air cylinder 247 which defines pressing means is tiltably supported at the rear side of the slide member 235 by a support shaft 249 through a mounting plate 248. The distal end of a rod 251 which extends from a piston 250 of the second air cylinder 247 is connected to the support arm 236 through a connecting member 252. A spring stopper 253 is attached to the front side of the slide member 235 through a support member 254. The spring stopper 253 is adapted to engage with the support arm 236 to define the stop position for the support arm 236. When the bottom processed surface 104 of the workpiece 101 is being ground by the movement of the wheel head 219 in the X- and Y-directions as described above, the second air cylinder 247 is in an inoperative state, and the support arm 236 is retained in a substantially vertical rest position by the engagement with the spring stopper 253.

When two directions, e.g., the X- and Z-directions, are selected and set as directions of movement of the wheel head 219 and the wheel head 219 is disposed in the position shown in FIGS. 5 and 7 or in the position achieved by rotating 180° the wheel head 219 through the rotary coupling 232 to grind processed surfaces 103 at both longitudinal ends of the workpiece 101, the second air cylinder 247 is switched to an operative state so as to activate the support arm 236 to pivot counterclockwise as viewed in FIG. 7, thus causing the grindstone 242 to be pressed against the processed surfaces 103 at the longitudinal ends. Further, when two directions, i.e., the Y- and Z-directions, are selected and set as directions of movement of the wheel head 219 and the wheel head 219 is disposed in a position which is achieved by rotating the wheel head 219 rightward or leftward through 90° from the position shown in FIGS.

5 and 7 to grind processed surfaces 102 at both lateral ends of the workpiece 101, the second air cylinder 247 is also switched to an operative state to pivot the support arm 236, thus causing the grindstone 242 to be pressed against the left and right processed surfaces 102.

On the other hand, as shown in FIG. 4, a control board 257 which is provided with switches and the like for selecting and setting directions of movement of the wheel head 219 is suspended at one side of the frame 201 through a support bar 258. This grinding apparatus is further provided with a teaching device which is used by hand when a grinding path determined on the basis of the movement of the wheel head 219 is to be stored in memory in advance.

Figure 8:
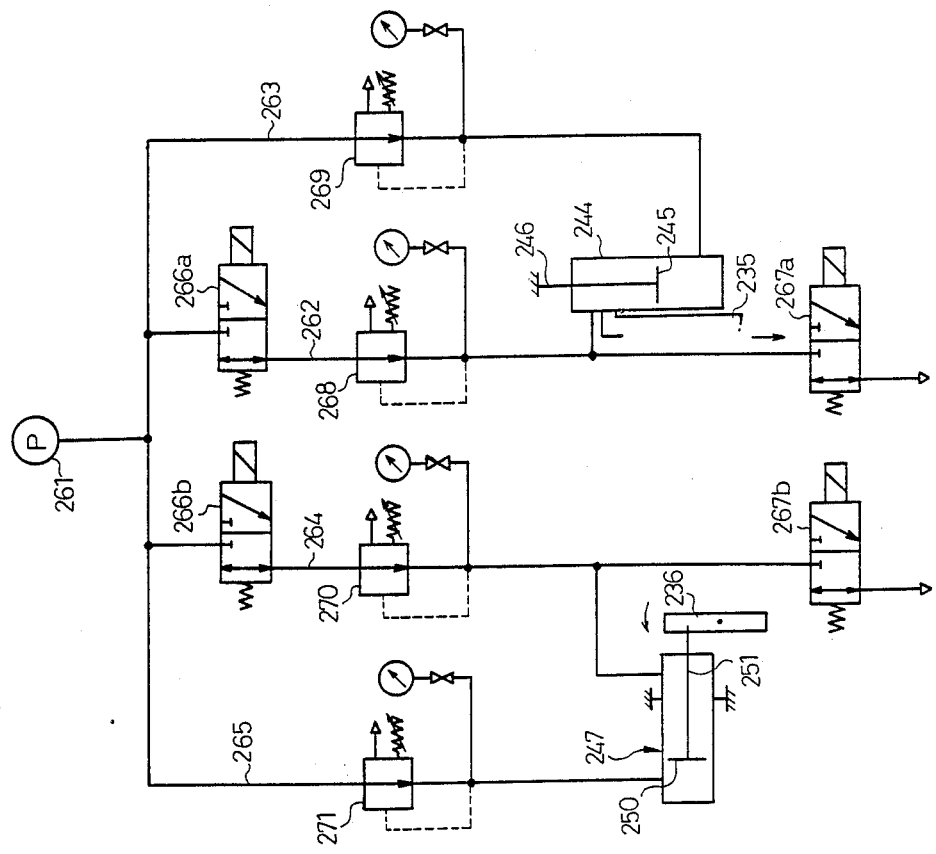
FIG. 8 shows an air supply control circuit for controlling the operation of an air cylinder for pressing a grindstone.

A control circuit for controlling the operations of the first and second air cylinders 244 and 247 will next be explained with reference to FIG. 8.

In this control circuit, two pairs of air supply passages 262, 263 and 264, 265 are connected to an air source 261. Among these passages, two air supply passages 262 and 264 have supply and discharge control switching valves 266a, 266b and 267a, 267b connected thereto, respectively. Further, pressure control valves 268, 269, 270 and 271 are respectively connected to the air supply passages 262 to 265. In one pair of air supply passages 262 and 263, one pressure control valve 268 is set so as to be lower in pressure than the other pressure control valve 269, including an amount of pressure corresponding to the pressure correction for the weight of the slide member 235 or the like. In the other pair of air supply passages 264 and 265, one pressure control valve 270 is set so as to be higher in pressure than the other pressure control valve 271.

In regard to the first air cylinder 244, one cylinder chamber is supplied with air through the supply side switching valve 266a and the pressure control valve 268 which are provided on the air supply passage 262, and the other cylinder chamber is supplied with air through the pressure control valve 269 provided on the air supply passage 263. With respect to the second air cylinder 247, one cylinder chamber is supplied with air through the supply-side switching valve 266b and the pressure control valve 270 which are provided on the air supply passage 264, and the other cylinder chamber is supplied with air through the pressure control valve 271 provided on the air supply passage 265.

The operation of the grinding apparatus arranged as described above will next be explained.

In this grinding apparatus, a workpiece 101 such as a molding die is mounted on the table 225 and loaded to and positioned at the machining position under the wheel head 219 as shown in FIG. 5. When a processed surface 104 at the bottom of the workpiece 101 is to be ground, two directions, i.e., the X- and Y-directions, are selected and set as directions of movement of the wheel head 219 by actuating switches on the control board 257. In consequence, the switching valves 266a and 267b shown in FIG. 8 are turned ON, while the switching valves 266b and 267a are turned OFF. Thus, the first air cylinder 244 is brought into an operative state, while the second air cylinder 247 is brought into an inoperative state. The operation of the first air cylinder 244 causes the grindstone 242 to be pressed downward against the bottom processed surface 104 with a predetermined pressure. In this state, the grindstone 242 is reciprocatively oscillated by the operation of the air motor 238, while the wheel head 219 is moved in the X- and Y directions as desired by the operation of the motors 208 and 213 for movement in the X- and Y-directions, whereby the bottom processed surface 104 is ground.

At this time, the pressure applied by the first air cylinder 244 is determined on the basis of a difference between pressures which are set by the pressure control valves 268 and 269, respectively When the processed surface 104 is smooth, said pressure is maintained at a constant value, whereas, when a projection on the processed surface 104 is to be ground, said pressure is set so as to be low, and when a recess in the processed surface 104 is to be ground, said pressure is set so as to be high. It should be noted that setting of these pressures may be executed by means of a computer in the teaching step carried out using the above-described teaching device 259.

When a processed surface 103 at each longitudinal end of the workpiece 101 is to be ground, the wheel head 219 is disposed in the position shown in FIGS. 5 and 7 or a position which is achieved by rotating the wheel head 219 through 180° from the illustrated position through the rotary coupling 232. Then, two directions, i.e., the X- and Z-directions, are selected and set as directions of movement of the wheel head 219. In consequence, the switching valves 266a and 267b are turned OFF, while the switching valves 266b and 267a are turned ON. As a result, the first air cylinder 244 is switched to an inoperative state, while the second air cylinder 247 is switched to an operative state. Thus, the support arm 236 is pivoted by the action of the second air cylinder 247, and the grindstone 242 is pressed against the processed surface 103 at each longitudinal end with a predetermined pressure such as that described above. In this state, the grindstone 242 is reciprocatively moved, while the wheel head 219 is moved in the X- and Z directions by the operation of the motors 208 and 220 for movement in the X- and Z-directions, whereby the processed surface 103 at each longitudinal end is ground.

Further, when a processed surface 102 at each lateral end of the workpiece 101 is to be ground, the wheel head 219 is disposed in a position which is achieved by rotating it rightward or leftward through 90° from the position shown in FIGS. 5 and 7 through the rotary coupling 232. Then, two directions, i.e., the Y- and Z-directions, are selected and set as directions of movement of the wheel head 219. In consequence, the switching valves 266a and 267b are turned OFF, while the switching valves 266b and 267a are turned ON, in the same manner as the above. Thus, the first air cylinder 244 is switched to an inoperative state, while the second air cylinder 247 is switched to an operative state, and the grindstone 242 is thereby pressed against the processed surface 102 at each lateral end with a predetermined pressure. In this state, the grindstone 242 is reciprocatively oscillated, while the wheel head 219 is moved in the Y- and Z-directions by the operation of the motors 213 and 220 for movement in the Y- and Z-directions, whereby the left and right processed surfaces 102 are ground.

Thus, the wheel head 219 is moved in two directions which are selected from the three directions, i.e., the X-, Y- and Z-directions, and the grindstone 242 is biased in the remaining one direction so as to be pressed against each of the processed surfaces 102, 103 and 104 with a predetermined pressure, thereby enabling each processed surface to be efficiently ground. In addition, the pressing air cylinders 244 and 247 can readily be switched from an operative state to an inoperative state and vice versa simply by turning ON or OFF the switching valves 266a, 266b, 267a and 267b.

Although in the foregoing description of the operation the switching valves 266a, 266b, 267a and 267b are alternately turned ON so as to activate the first and second cylinders 244 and 247 alternately, it is also possible to simultaneously turn ON all the switching valves so as to activate both the cylinders 244 and 247 at the same time and to effect grinding in this state.

Further, the supply and discharge controlling switching valves 266a, 266b, 267a and 267b in the air supply control circuit may be omitted.

Figure 9:
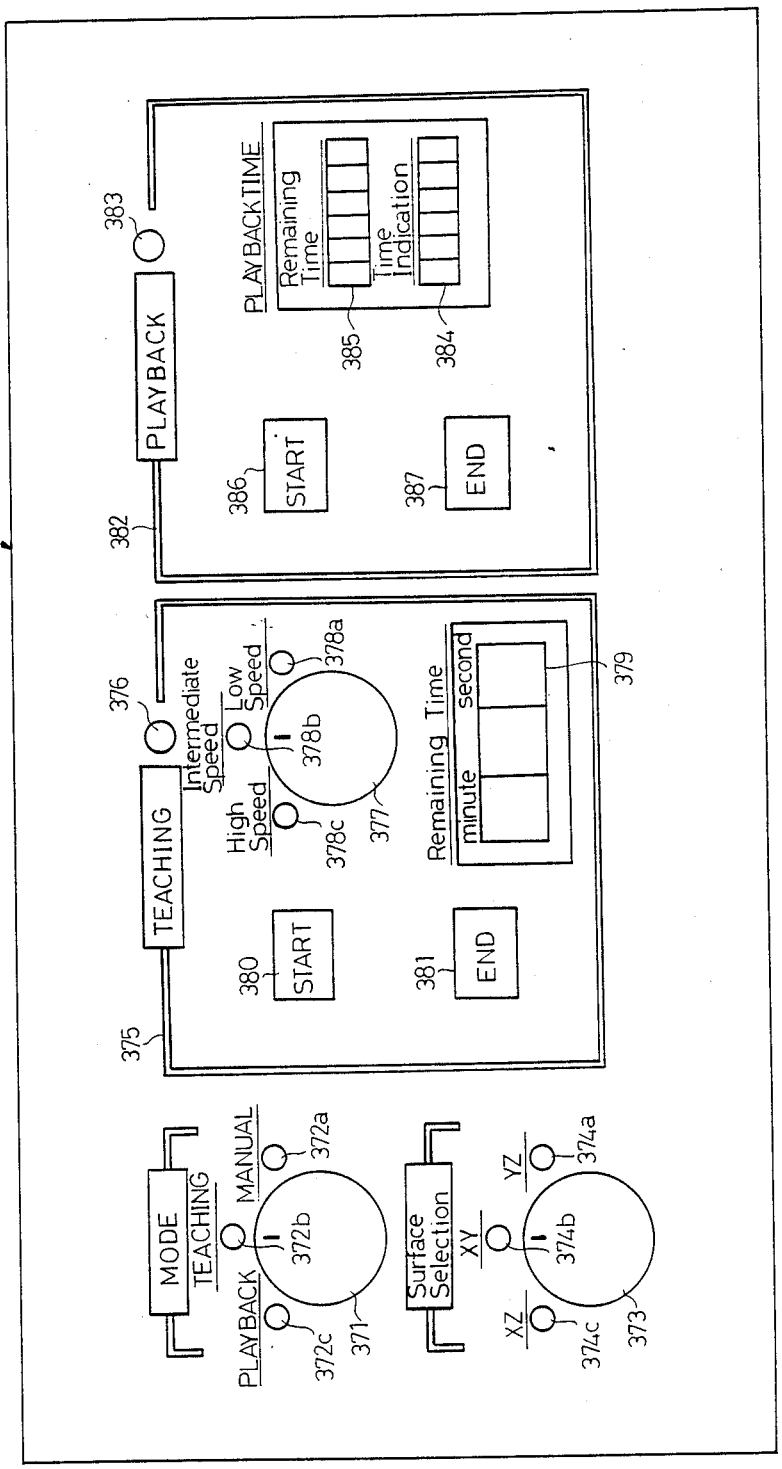
FIG. 9 is an enlarged front view of a control board in accordance with a third embodiment.
Figure 10:
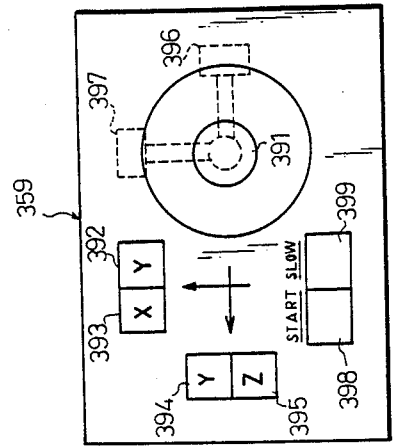
FIG. 10 is an enlarged front view of a teaching device.

A third embodiment of the present invention will next be described with reference to FIGS. 9 to 11 and in comparison with the second embodiment.

First, a description will be made on an arrangement for detecting an overload which acts on the grindstone 242 in the teaching step carried out using the teaching device 359 and the machining step carried out on the basis of grinding path data stored in memory in the teaching step. As shown in FIG. 6, a pair of first overload sensors 361 and 362 which are defined by magnetic sensors or the like are disposed inside the first air cylinder 244 in such a manner as to face two extremities, respectively, of movement of the piston 245. When an overload is generated while the processed surface 104 which extends in the X- and Y-directions is being machined, the upper sensor 361 or the lower sensor 362 outputs a detection signal on the basis of the abnormal approach of the piston 245 to the upper sensor 361 or the lower sensor 362. When a processed surface 102 which extends in the Y- and Z-directions or a processed surface 103 which extends in the X- and Z-directions is being machined, the upper first overload sensor 361 detects the position of the piston 245 which is in a fully-pushed position (at this time, the grindstone 242 is at its lower-limit position) to thereby confirm that the grindstone 242 is in its normal position.

As shown in FIG. 7, a pair of second overload sensors 363 and 364 which are defined by magnetic sensors or the like are disposed inside the second air cylinder 247 so as to face two extremities, respectively, of movement of the piston 250. When the grindstone 242 is overloaded laterally or longitudinally while a processed surface 102 or 103 is being machined, the left-hand sensor 363 or the right-hand sensor 364 outputs a detection signal on the basis of the abnormal approach of the piston 250 thereto. When the processed surface 103 is being machined, the left-hand (as viewed in FIG. 7) sensor 363 detects the position of the piston 250 which is in a fully-pushed position (at this time, the support arm 236 is in the vertical position) to thereby confirm that the grindstone 242 is in its normal position.

On the other hand, a fourth overload sensor 366 which is defined by a magnetic sensor or the like is disposed inside the support member 254. In machining of the processed surface 104, when an overload which causes the support arm 236 to tilt clockwise as viewed in FIG. 7 is generated, the fourth overload sensor 366 outputs a detection signal on the basis of the abnormal withdrawal of the spring stopper 253. Further, as shown in FIG. 6, a third overload sensor 365 which is defined by a magnetic sensor or the like is attached to the outer side of the air motor 238. When the grindstone 242 is overloaded in a direction in which it tilts about the support shaft 239, the sensor 365 outputs a detection signal on the basis of the abnormal approach to the support arm 236.

The arrangement of switches on the control board 357 will next be explained with reference to FIG. 9. A mode selecting switch 371 for selecting one of the manual operation mode, the teaching mode and the machining mode is provided on the left upper portion of the control board 357. Indicating lamps 372a, 372b and 372c are disposed in correspondence with the selecting positions, respectively, of the switch 371. A direction selecting switch 373 for selecting directions of movement of the wheel head 319 is provided below the mode selecting switch 371. Indicating lamps 374a, 374b and 374c are disposed in correspondence with the positions for selecting the Y- and Z-directions, the X- and Y-directions, and the X- and Z-directions, respectively.

A teaching mode operation region 375 is provided in the central portion of the control board 357. An indicating lamp 376 which is turned on when the teaching mode is selected using the mode selecting switch 371 is provided in the upper portion of the region 375. The operation region 375 is provided therein with a speed setting switch 377 for setting a speed of movement of the wheel head 319 in the teaching step. Indicating lamps 378a, 378b and 378c are disposed in correspondence with the positions for setting low speed, intermediate speed and high speed, respectively. A remaining time indicating section 379 for indicating the rest of time during which storage can be done in the teaching step is provided below the speed setting switch 377. A start switch 380 for starting the teaching step and an end switch 381 for finishing the teaching step are provided in the left-hand portion of the operation region 375.

A machining mode operation region 382 is provided on the right-hand portion of the control board 357. An indicating lamp 383 which is turned on when the machining mode is selected using the mode selecting switch 371 is provided in the upper portion of the region 382. A time setting section 384 for specifying total time for the machining step and a remaining time indicating section 385 for indicating the rest of time in the machining step are provided in the right-hand portion of the operation region 382. Further, a start switch 386 for starting the machining step and an end switch 387 for finishing the machining step are provided in the left-hand portion of the operation region 382.

The arrangement of the above-described teaching device 359 will next be described with reference to FIG. 10. An operating handle 391 is provided so as to project from the right-hand portion of the front side of the device. The handle 391 can be pivoted so as to tilt in any desired direction within the range from the upward position to the leftward position in accordance with arrows put on the front side of the device. Two pairs of indicating lamps 392, 393 and 394, 395 are respectively provided on the upper portion and the left-hand portion of the front side of the device. When directions of movement of the wheel head 319 are selected using the direction selecting switch 373 on the control board 357, for example, when the Y- and Z directions are selected, the indicating lamps 392 and 395 are turned on; when the X- and Y-directions are selected, the indicating lamps 393 and 394 are turned on; and when the X- and Z-directions are selected, the indicating lamps 393 and 395 are turned on, thus designating the directions in which the operating handle 391 may be actuated.

A pair of encoders 396 and 397 are provided inside the teaching device 359 in opposing relation to the operating handle 391. The encoders 396 and 397 are activated through a pivot shaft or the like in response to the tilting of the operating handle 391 so as to output signals for driving the motors 208, 213 and 220 for movement in the X-, Y- and Z-directions in accordance with the direction and amount of pivoting of the handle 391. Further, a start switch 398 for starting a teaching operation and a slowdown switch 399 for further lowering the speed of movement of the wheel head 319 are provided on the front side of the device.

The control circuit for the grinding apparatus arranged as described above will next be explained with reference to FIG. 11. A read-only memory (ROM) 402 and a random-access memory (RAM) 403 which defines a memory means are connected to a central processing unit (CPU) 401 which defines a control means. A program or the like for controlling the operation of the whole grinding apparatus is stored in the ROM 402. The RAM 403 is adapted to store grinding path data or the like for the wheel head 319 which is input through the teaching device 359 in the teaching step.

To the CPU 401 are further connected, through an input interface 406, a switch group 404 consisting of various switches provided on the control board 357, the above-described teaching device 359, and an overload sensor group 405 consisting of the above-described first to third overload sensors 361 to 365, so that various signals output therefrom are input to the CPU 401. To the CPU 401 are further connected the motors 208, 213 and 220 for movement in the X-, Y- and Z-direction, the air motor 238, and an indicating lamp group 407 consisting of the various indicating lamps on the control board 357 and those on the teaching device 359, through an output interface 408 and respective driving circuits 409 to 413, so that driving and stop signals are output thereto from the CPU 401.

The operation of the grinding apparatus arranged as described above will next be explained.

In this grinding apparatus, a workpiece 101 such as a molding die is mounted on the table 225 and then loaded to and positioned at the machining position under the wheel head 219, as shown in FIGS. 4 and 5. When teaching of a grinding path is to be carried out by moving the wheel head 219 along the processed surfaces 102, 103 and 104, the teaching mode is first selected using the mode selecting switch 371 on the control board 357. Then, the direction selecting switch 373 is actuated to select and set two directions, e.g., the X- and Y-directions, as directions of movement of the wheel head 219. Next, the speed setting switch 377 in the teaching operation region 375 is actuated to set a moving speed of the wheel head 319 at, e.g., intermediate speed, and the start switch 380 is then pressed. Thereupon, the rest of time during which data can be stored into the RAM 403 is displayed on the remaining time indicating section 379, and the indicating lamps 393 and 394 on the teaching device 359 are turned on to indicate directions in which the operating handle 391 may be actuated.

Then, the operating handle 391 is pivoted so as to tilt in any desired direction such as the X-direction, the Y-direction or a direction intermediate therebetween in accordance with the indication by the indicating lamps 393 and 394. In consequence, detection signals are output from the encoders 396 and 397 to the CPU 401 in accordance with the direction and amount in which the handle 391 is pivoted. The CPU 401 outputs driving signals to the motors 208 and 213 for movement in the X- and Y-directions on the basis of the detection signals, and the motors 208 and 213 are thereby activated. The operation of the motors 208 and 213 causes the wheel head 219 to move a predetermined amount in each of the X- and Y-directions. At the same time, equivalent signals are output from the CPU 401 to the RAM 403, and positional data alone is stored as grinding path data independently of the speed of profiling. Accordingly, it is possible to readily store data concerning a grinding path in the X- and Y-directions along the bottom processed surface 104 of the workpiece 101 by tilting the operating handle 391 while confirming the position in movement of the wheel head 319.

When the bottom processed surface 104 of the workpiece 101 is to be ground on the basis of the grinding path data thus stored, the machining mode is selected using the mode selecting switch 371 on the control board 357, and a total time for the machining step is designated using the time designating section 384 in the machining mode operation region 382. When, in this state, the start switch 386 is pressed, the rest of time for the machining step is displayed on the remaining time indicating section 385. On the other hand, grinding path data is read out from the RAM 403 to the CPU 401, and driving signals are output to the motors 208 and 213 for movement in the X- and Y-directions on the basis of the read data. Thus, the motors 208 and 213 are rotated, and the wheel head 219 is thereby moved in the X- and Y-directions.

At the same time, the first air cylinder 244 shown in FIG. 6 acts the grindstone 242 to be pressed against the bottom processed surface 104 of the workpiece 101 and, in this state, reciprocative oscillation is applied to the grindstone 242 on the basis of the operation of the air motor 238. Thus, the processed surface 104 is successively ground along a predetermined grinding path. This grinding operation is repeatedly carried out by means of the wheel head 219 which reciprocatively moves along the path according to the grinding path data until the time preset in the time setting section 384 has elapsed. Accordingly, it is unnecessary to designate a grinding path for each machining, and therefore the grinding operation can be conducted efficiently.

In this embodiment, the first movement of the wheel head 219 in the machining step starts from the movement terminating position to the movement starting position of the wheel head 219 in the teaching step, that is, the wheel head 219 goes back along the grinding path. Accordingly, the wheel head 219 need not return to the movement starting position from the movement terminating position upon completion of the teaching step, and the operation can therefore be simplified. Further, it is possible to reliably prevent the grindstone 242 from colliding with a projection or the like on the processed surface which might otherwise be caused, for example, when the wheel head 219 is returned straight from the movement terminating position to the movement starting position.

Further, when a lateral processed surface 102 or longitudinal processed surface 104 of the workpiece 101 is to be ground, two directions, i.e., the Y- and Z-directions, or the X- and Z-directions, are selected by actuating the direction selecting switch 373 in the teaching step and, in this state, grinding path data is input by the teaching device 359. Thus, it is possible to readily and efficiently grind the lateral processed surface 102 or longitudinal processed surface 103 in the machining step on the basis of the input grinding path data.

When, in the teaching step or the machining step, the grindstone 242 comes into contact with a projection or the like on the processed surface and is therefore overloaded, a detection signal is output to the CPU 401 from one of the first to fourth overload sensors 361 to 366 shown in FIGS. 6 and 7. In response to this, stop signals are output from the CPU 401 to the motors 208, 213 and 220 for movement in the X-, Y- and Z-directions and the air motor 238, and the movement of the wheel head 219 and the machining operation of the grindstone 242 are immediately suspended. At this time, a data erasing signal is output from the CPU 401 to the RAM 403, thus invalidating the grinding path data stored in the RAM 403. Accordingly, there is no fear of the grinding operation or the like being continued in an overloaded state nor risk of the grinding operation being repeatedly carried out on the basis of erroneous grinding path data, and it is therefore possible to safely carry out the grinding operation.

It should be noted that, in the above-described third embodiment, for example, a reciprocative operation in the machining step may be designated in terms of the number of times in place of time. In the case of designation of the number of times, there is no fear of the wheel head 219 being suspended upon expiration of the designated time despite the fact that the wheel head 219 is halfway on the grinding path, which would result in incomplete grinding.

A fourth embodiment in which the present invention is embodied in a die polishing machine will be described hereinunder with reference to FIGS. 12 and 13.

Figure 12:
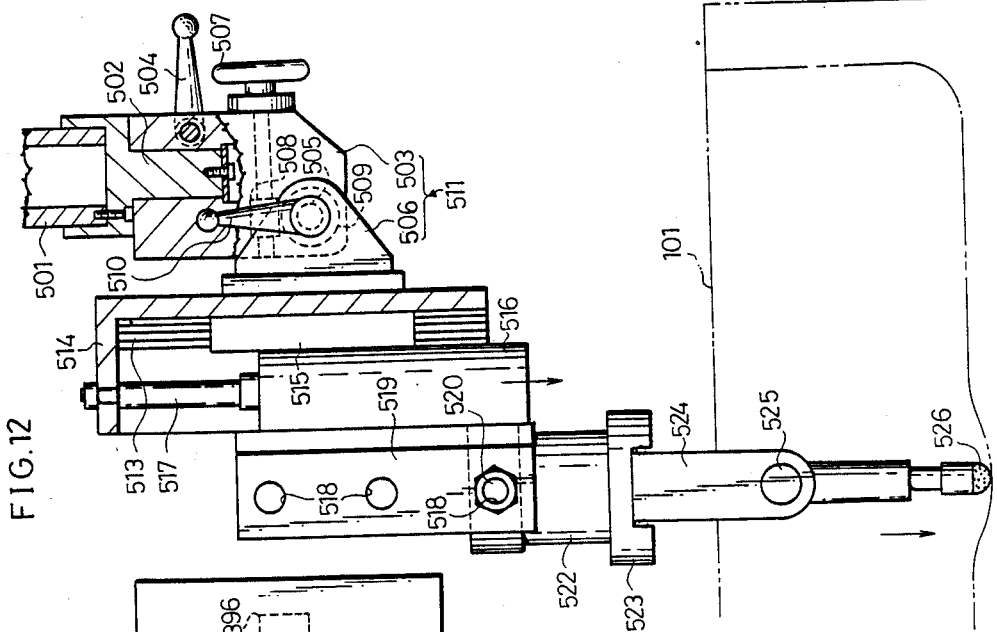
FIG. 12 is a partially-sectioned front view of a die polishing machine according to a fourth embodiment.

The frame of the die polishing machine is, as shown in FIG. 12, provided with a head support tube 501 which is movable in the X-, Y- and Z-directions. A mounting shaft 502 is rigidly secured to the lower end of the support tube 501. A head block 503 is attached to the mounting shaft 502 in such a manner that the head block 503 is rotatable for adjustment around a vertical axis, and is fixed at a desired adjusted position through a clamping lever 504. A bracket 506 is pivotally supported on the head block 503 through a horizontal shaft 505. The bracket 506 is adjusted to a desired pivoted position in response to the operation of a handle 507 through a worm 508 and a worm wheel 509, and is fixed at the adjusted position by means of a clamping lever 510. The head block 503 and the bracket 506 constitute in combination a wheel head 511 of this die polishing machine.

A guide member 514 which incorporates a rail 513 is secured to the bracket 506. An air cylinder 516 which serves as a biasing means is movably supported on the rail 513 through a slider 515. A piston rod 517 of the air cylinder 516 is fixedly connected to the guide member 514. A mounting member 519 which has a plurality of mounting bores 518 is rigidly secured to the air cylinder 516. An air motor 522 which serves as a driving means is attached to the mounting member 519 through bolt 520 which is selectively received through one of the mounting bores 518 so that the position of the air motor 522 is changeable. An oscillating member 524 is connected to the air motor 522 through an oscillation generator 523. A grindstone 526 is attached to the lower end of the oscillating member 524 through a clamping screw 525 in such a manner that the tilting of grindstone 526 is adjustable. It should be noted that the detailed arrangement of the oscillation generator 523 is shown in Japanese Patent Application No. 61-084489 (084489/1986) filed by the same applicant as that of this application.

When a molded surface of a molding die 101 is to be polished using the die polishing machine arranged as described above, the head block 503 and the bracket 506 which constitute the wheel head 511 are first appropriately rotated to effect adjustment so that the grindstone 526 is disposed in opposing relation to a desired processed surface of the die 101. For example, when the head support tube 501 is to be controlled so as to be fed in the X- and Y-directions, the wheel head 511 is disposed in the position shown in FIG. 12, and the grindstone 526 can thereby be disposed so as to face the bottom surface of the die 101. When the head support tube 501 is to be controlled so as to be fed in the Y- and Z-directions, the bracket 506 is pivoted 90° counterclockwise as viewed in FIG. 12, and the grindstone 526 is thereby disposed so as to face one side surface of the workpiece 101. If, in this state, the head block 503 is further rotated 90° around the vertical axis, the grindstone 526 faces another side surface of the die 101, and it is therefore also possible to cope with the need for the feed control in the X- and Z-directions.

When the air cylinder 516 is activated with the grindstone 526 facing a desired processed surface, the grindstone 526 is pressed against the processed surface as the body of the cylinder 526 moves. This pressing force can be appropriately adjusted in accordance with the working pressure of the air cylinder 516. If, in this state, the air motor 522 is started, the grindstone 526 is oscillated through the operation of the oscillation generator 523, and the processed surface is thereby ground. At this time, since the grindstone 526 is constantly biased toward the processed surface by the action of the air cylinder 516, the grindstone 526 is moved while following changes in configuration of the processed surface. Accordingly, the processed surface can be ground uniformly and highly accurately without any unevenness of grinding, i.e., without any fear of a recess in the processed surface being insufficiently ground and without any risk of a projection on the processed surface being excessively ground. In addition, since the air cylinder 516 is disposed closer to the grindstone 526 than the wheel head 511, the oscillations of the air motor 522, the oscillation generator 523 and the grindstone 526 are damped by the air cylinder 516, so that it is possible to minimize the oscillation which is transmitted to the frame.

Figure 13:
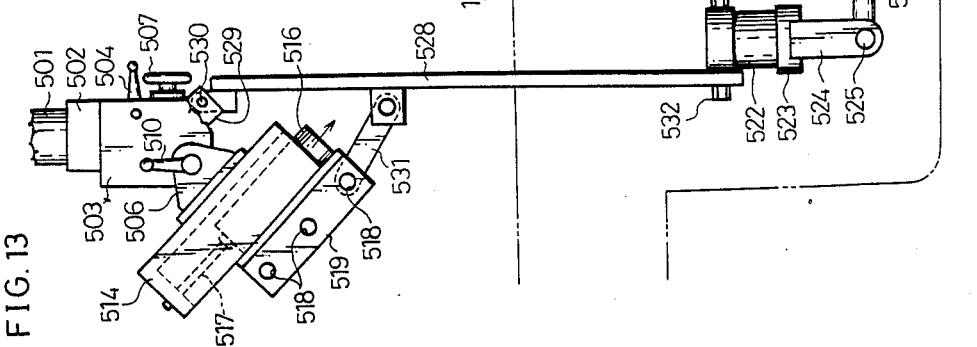
FIG. 13 is a front view showing another example of use.

FIG. 13 shows another example of use of the abovedescribed apparatus. The illustrated apparatus is arranged such that an arm member 528 is interposed between the wheel head 511 and the air cylinder 516 to thereby enable the grindstone 526 to be disposed as far as the inner portion of the workpiece 101.

More specifically, a support piece 529 is attached to the head block 503 which constitutes the wheel head 511. The proximal end of an arm member 528 is pivotally supported by the support piece 529 through a shaft 530. A link 531 is connected between the intermediate portion of the arm member 528 and one mounting bore 518 in the mounting member 519. Further, in this example of use, the air motor 522 which has the grindstone 526 is removed from the mounting member 519 and is attached to the lower end of the arm member 528 through a screw 532 instead. The biasing force from the air cylinder 516 acts on the grindstone 526 through the link 531 and the arm member 528, so that the grindstone 526 is pressed against a processed surface of the workpiece 101 by means of the force based on the working pressure of the air cylinder 516. Accordingly, it is possible according to this example of use to enable the grindstone 526 to reach the inner portion of the workpiece 101 without being obstructed by the wheel head 511, the guide member 514 or the like. Therefore, it is possible to readily grind even a narrow portion in a processed surface of the workpiece 101 which has a complicated configuration.

It should be noted that in the above-described fourth embodiment the biasing means may be defined by a spring in place of the air cylinder 516 and the arrangement may also be such that the grindstone 526 is connected directly to the air motor 522 in order to grind the processed surface by the rotation of the grindstone 526.

Figure 14:
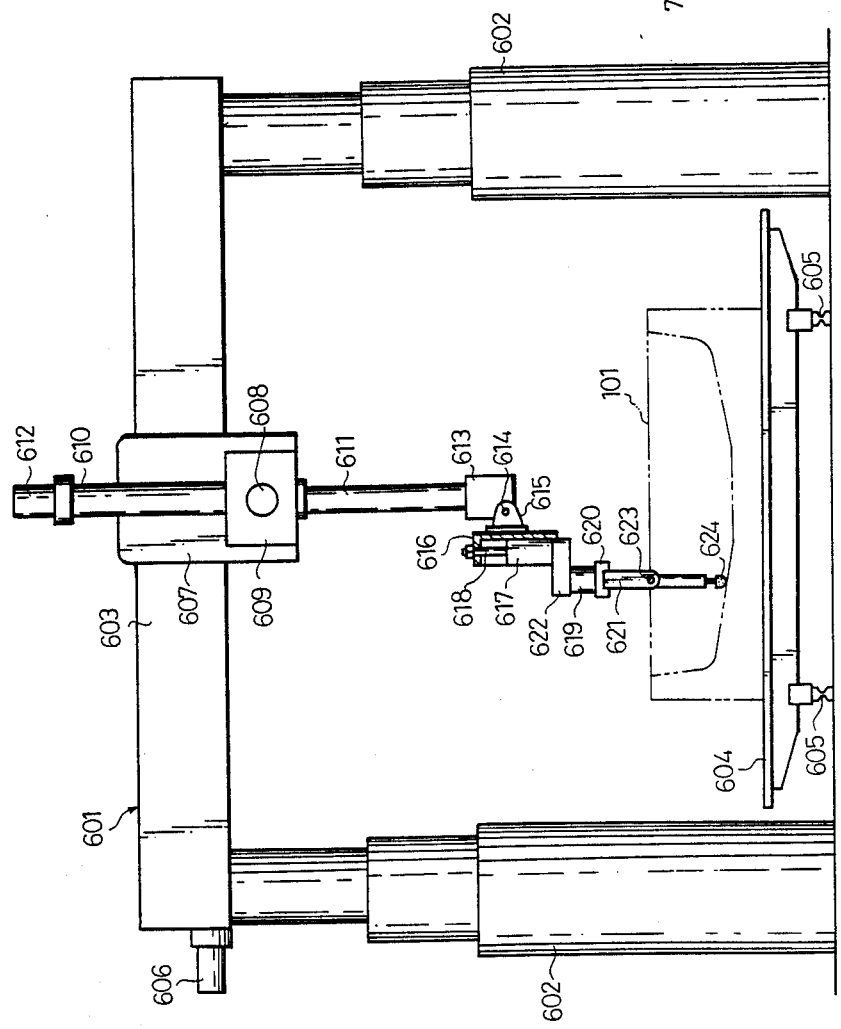
FIG. 14 is a front view of a die polishing machine according to a fifth embodiment.

A fifth embodiment in which the present invention is embodied in a die polishing machine will be described hereinunder with reference to FIG. 14.

A frame 601 of the die polishing machine is composed of a pair of stretchable supports 602 and a transverse frame 603 so as to define a substantially gate-shaped configuration as a whole, and a table 604 for mounting the workpiece 101 thereon is movably supported inside the frame 601 by means of rails 605. An X-moving member 607 which is driven by an X-motor 606 is supported on the transverse frame 603. A Y-moving member 609 which is driven by a Y-motor 608 is attached to the lower portion of the X-moving member 607. A guide tube 610 is fixed on the Y-moving member 609, and a Z-moving shaft 611 is received in the guide tube 610 in such a manner as to extend therefrom downwardly so that the shaft 611 is moved vertically by the Z-motor 612.

A wheel head 613 is attached to the lower end of the Z-moving shaft 611 in such a manner that the wheel head 613 is rotatable for adjustment within a horizontal plane. A bracket 615 is supported by the wheel head 613 through a horizontal shaft 614 in such a manner that the bracket 615 is pivotal for adjustment within a vertical plane. An air cylinder 617 is movably supported by a guide member 616 which is rigidly secured to the bracket 615, and a piston rod 618 of the air cylinder 617 is fixedly connected to the guide member 616. An air motor 619 which serves as a driving means is attached to the air cylinder 617 through a mounting piece 622. An oscillating member 621 is connected to the motor 619 through an oscillation generator 620. A grindstone 624 is secured to the oscillating member 621 by means of a screw 623 in such a manner that the tilting of the grindstone 624 is adjustable, and the grindstone 624 is pressed against a processed surface of the workpiece 101 by the air cylinder 617. In this pressed state, the air motor 619 is driven, and the grindstone 624 is thereby caused to slide on the processed surface through the operation of the oscillation generator 620, thus grinding the processed surface of the workpiece 101.

Accordingly, in the die polishing machine in accordance with this embodiment, a mounting member is composed of the bracket 615, the guide member 616 and the mounting piece 622. Thus, the grindstone 624 is arranged to grind the processed surface of the workpiece 101 at a position which is eccentrical with respect to the axis of the Z-moving shaft 611 supporting the wheel head 613. Accordingly, even in the case where the Z-moving shaft 611 extends long downward, vibrations which are generated by the rotation of the air motor 619 and the slide of the grindstone 624 are damped by a plurality of parts between the grindstone 624 and the wheel head 613. As a result, impact which acts on the moving members 607, 609 and the frame 601 is relieved by a large margin. In addition, since the grindstone 624 is located at a position which is spaced apart from the axis of the Z-moving shaft 611, there is no fear of the frame 601 being subjected to an exceedingly large vibrational moment due to a simple harmonic motion, and the arrangements of the moving members 607, 609 and the frame 601 can be simplified correspondingly.

It should be noted that in the above-described fifth embodiment, for example, the number of components of the mounting member may appropriately be increased or decreased, and the grindstone 624 may be connected directly to the air motor 619 so as to grind the processed surface by the rotation of the grindstone 624. Alternatively, the arrangement may be such that the air motor 619 is secured to, for example, the frame 601, and the oscillation generator 620 is driven through a transmission mechanism employing a wire or the like to thereby grind the processed surface.

A sixth embodiment of the present invention will be described hereinunder with reference to FIGS. 15 to 18.

As shown in FIG. 17, a grinding tool 723 is detachably attached to the distal end portion of a driving shaft 722 of an air motor 721, and the tool 723 is pressed against a processed surface of the workpiece 101 by means of an air cylinder 718.

Figure 15:
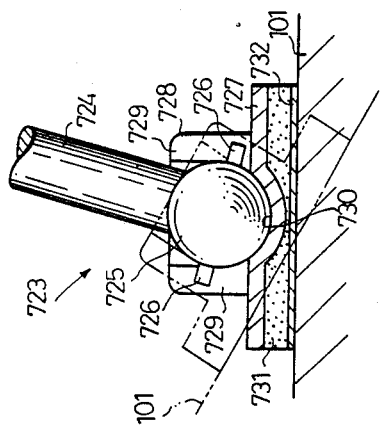
FIG. 15 is a vertical sectional view of a grinding tool according to a sixth embodiment.

As shown in FIG. 15, a spherical portion 725 is provided integral with the distal end portion of a mounting shaft 724 which constitutes the grinding tool 723. A pair of engagement projections 726 for transmitting rotation are symmetrically formed in the central portion of the this spherical portion 725, the projections 726 extending orthogonally with respect to the central axis of the mounting shaft 724.

On the other hand, a mounting member 727 which constitutes the grinding tool 723 is provided on its upper surface with a socket 728 for receiving the above-described spherical portion 725. This socket 728 has a pair of engagement grooves 729 formed at respective positions which are in opposing relation to each other. The engagement grooves 729 are engaged with the engagement projections 726, respectively, and adapted to slidably guide the engagement projections 726 Further, a support recess 730 which serves as a support portion is formed in the inner bottom of the socket 728 in such a manner that the recess 730 projects to the lower side of the mounting member 727. The support recess 730 is adapted to contact a part of the spherical surface of the spherical portion 725 in order to support the spherical portion 725 so as to be rotatable relative to the socket 728 in a direction in which the mounting shaft 724 is tilted.

Figure 16:
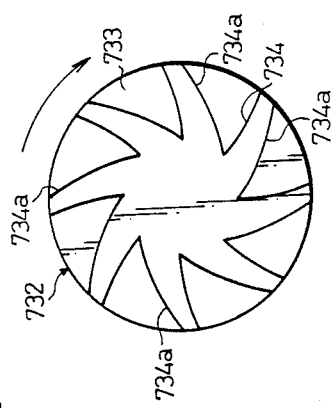
FIG. 16 is a plan view of a grindstone.

Further, a cushioning member 731 which is made from rubber and has a circular shape in plan view is rigidly secured to the lower surface of the mounting member 727. A grindstone 732 which is defined by diamond paper is bonded to the lower surface of the cushioning member 731 As shown in FIG. 16, this grindstone 732 consists of a base cloth 733 and an abrasive 734 which is ridigly secured to the surface of the base cloth 733 and which is formed by combining together synthetic diamond abrasive grains in the shape of a pinwheel in plan view The abrasive 734 is formed with cutting discharge surfaces 734a which are curved rearwardly as viewed in the direction of rotation.

Accordingly, when the air motor 721 is driven in the above-described pressed state, the grindstone 732 is rotated in contact with the workpiece 101 over a wide plane of contact and without any non contact portion in accordance with the configuration of the molded surface of the workpiece 101 by virtue of the flexibility of the cushioning member 731. Thus, the grinding efficiency is improved, and cuttings are discharged along the cutting discharge surfaces 734a by the rotation of the grindstone 732. Further, the grindstone 732 is rotated from the position shown by the solid line in FIG. 15 to the position shown by the two-dot chain line in accordance with irregularities on the processed surface of the workpiece 101. Accordingly, the grinding operation is carried out without any hindrance, and there is no need to change the angle of inclination of the mounting shaft 724.

By virtue of the bracket 716, the guide member 717, the mounting piece 720, etc., the grindstone 732 grinds the processed surface of the workpiece 101 at a position which is eccetrical with respect to the common axis of the wheel head 714 and the Z moving shaft 712. Accordingly, even in the case where the Z moving shaft 712 is extended long downwardly, vibrations which are generated by the rotation of the air motor 721 and the grinding tool 723 during a grinding operation are damped by a plurality of parts between the grindstone 732 and the wheel head 714. As a result, impact which acts on the moving members 707, 709 and the frame 702 is relieved by a large margin.

In the grinding tool 723 in accordance with the sixth embodiment, the mounting shaft 724 has a spherical portion 725 provided at its distal end, while the mounting member 727 for mounting the grindstone 732 such as diamond paper is provided with a socket 728 for receiving the spherical portion 725. The socket 728 is provided in its inner bottom with a support recess 730 which contacts a part of the spherical surface of the spherical portion 725 and thereby supports the spherical portion 725. Accordingly, the support recess 730 which is subjected to the pressure applied to a processed surface of the workpiece 101 from the die grinding apparatus 701 can be formed in close proximity with the grindstone 732. Thus, it is possible to reduce the force which acts on the mounting member 727 so as to come off the processed surface of the workpiece 101 when the central axis of the mounting shaft 724 and that of the mounting member 727 cross each other at an angle, and it is also possible to reduce the centrifugal force generated by the rotation of the mounting member 727. As a result, it is difficult for the grindstone 732 to come off the processed surface of the workpiece 101, so that the capability of the grindstone 732 to follow the processed surface is improved and it is therefore possible to carry out the grinding operation without any hindrance.

Further, in the grinding tool 723 of this embodiment, the distance from the support recess 730 in the mounting member 727 to the grindstone 732 is shortened, and the diameter of the mounting member 727 can be reduced correspondingly. Accordingly, the grindstone 732 can readily follow even irregularities on the processed surface of the workpiece 101 which have small curvatures and therefore uniform grinding can be effected.

Further, the grinding tool 723 of this embodiment has a small number of parts and a simple structure as compared with ordinary grinding tools, so that it can readily be assembled.

It should be noted that the sixth embodiment may also be carried out as follows:
(1) As shown in FIG. 18, the cushioning member 731 is omitted, and the mounting member 727 is formed in the shape of a flat plate. The grindstone 732 is bonded directly to the lower surface of this mounting member 727.
(2) The air motor 721 is mounted on, for example, the frame 702, and the driving shaft 722 is driven through a transmission mechanism employing a wire or the like, thereby grinding a processed surface.
(3) The grindstone 732 is formed in the shape of a flat plate.
(4) The abrasive 734 which constitutes the grindstone 732 is formed in a spiral shape in plan view.
(5) The mounting member 727 and the socket 728 are formed from a rigid synthetic resin, and an anti-wear member which is defined by a metallic plate is provided at each of the engagement grooves 729 and support recess 730, thereby reducing the weight.

A seventh embodiment of the present invention will next be explained with reference to FIGS. 19 to 25.

Figure 19:
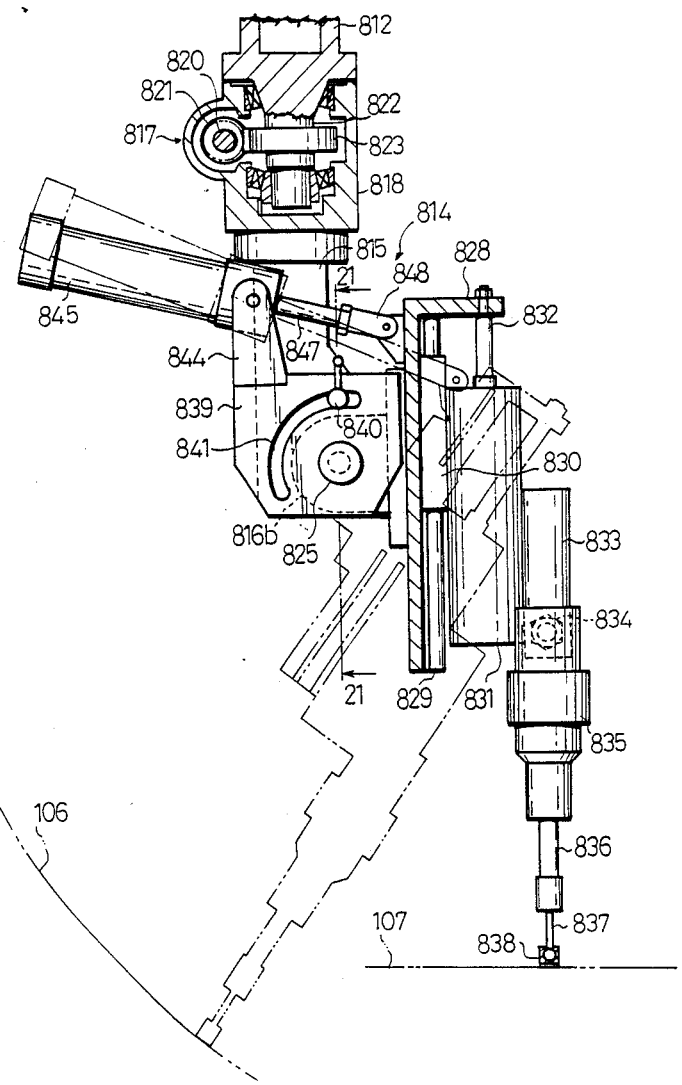
FIG. 19 is a partially-sectioned front view of a wheel head in accordance with a seventh embodiment.
Figure 21:
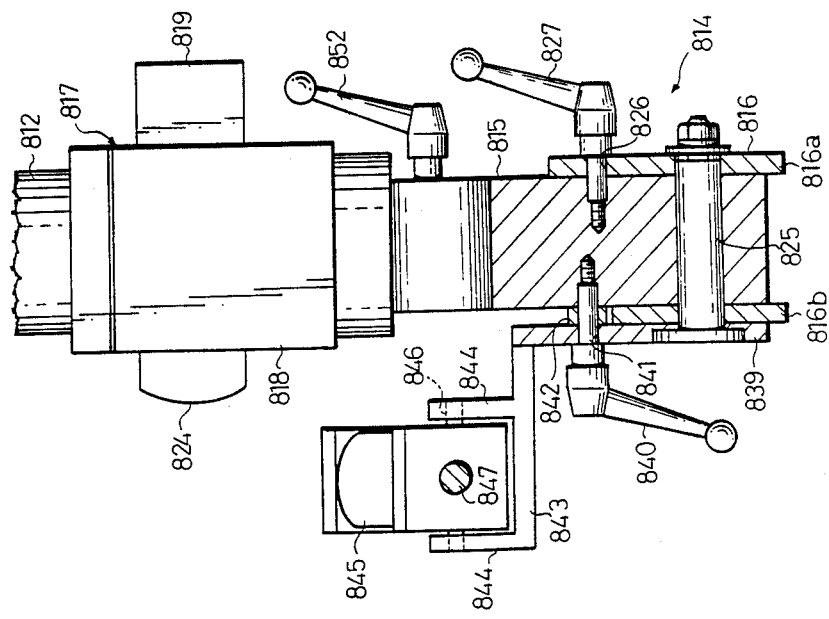
FIG. 21 is an enlarged sectional view taken along the line 21—21 of FIG. 19.

As shown in FIGS. 19 and 21, a wheel head 814 which is constituted by a head block 815 and a bracket 816 is provided at the lower end of a Z-direction moving shaft 812 through a rotational mechanism section 817. The wheel head 814, together with the rotational mechanism section 817, is rotated around the central axis of the Z-direction moving shaft 812. The rotational mechanism section 817 consists of a servomotor 819 which is provided at one side of a casing 818, a worm 821 which is rigidly secured to an output shaft 820 of the servomotor 819, and a worm wheel 823 which is rigidly secured to a mounting bar 822 at the lower end of the Z-direction moving shaft 812. The driving mechanism section 817 is rotated within the range of 360° in each of the forward and reverse directions from the original position shown in FIG. 19. Further, as shown in FIG. 21, the casing 818 is provided with a rotary encoder 824 which detects an angle of rotation of the output shaft 820. It should be noted that the head block 815 is provided in such a manner as to be pivotal for adjustment within a horizontal plane with respect to the rotational mechanism section 817 and is fixed by means of a clamping lever 852.

As shown in FIG. 21, the bracket 816 has a pair of support plates 816a and 816b which sandwich the head block 815 and is supported through a horizontal shaft 825 in such a manner that the bracket 816 is pivotal so as to be adjusted at any position within a vertical plane. The bracket 816 is secured at its fixed position by means of a clamping lever 827 which is passed through a slot 826 provided in one support plate 816a and which is screwed into the head block 815. A guide member 828 which incorporates a rail 829 is secured to the bracket 816. A first air cylinder 831 is movably supported on the rail 829 through a slider 830, and a piston rod 832 of the air cylinder 831 is fixedly connected to the guide member 828. A mounting member 833 is rigidly secured to the air cylinder 831, and an air motor 835 which serves as a drive means is attached to the mounting member 833 through a bolt 834. A grindstone 838 is rotatably attached through a mounting shaft 837 to a driving shaft 836 of this air motor 835. The first air cylinder 831 is adapted to move the grindstone 838 in a direction parallel to the bracket 816 so that the grindstone 838 is pressed against a processed surface of the workpiece 101 with a predetermined pressure.

Figure 24:
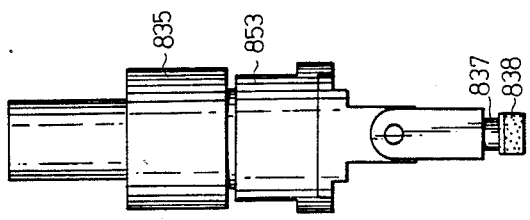
Figure 23:
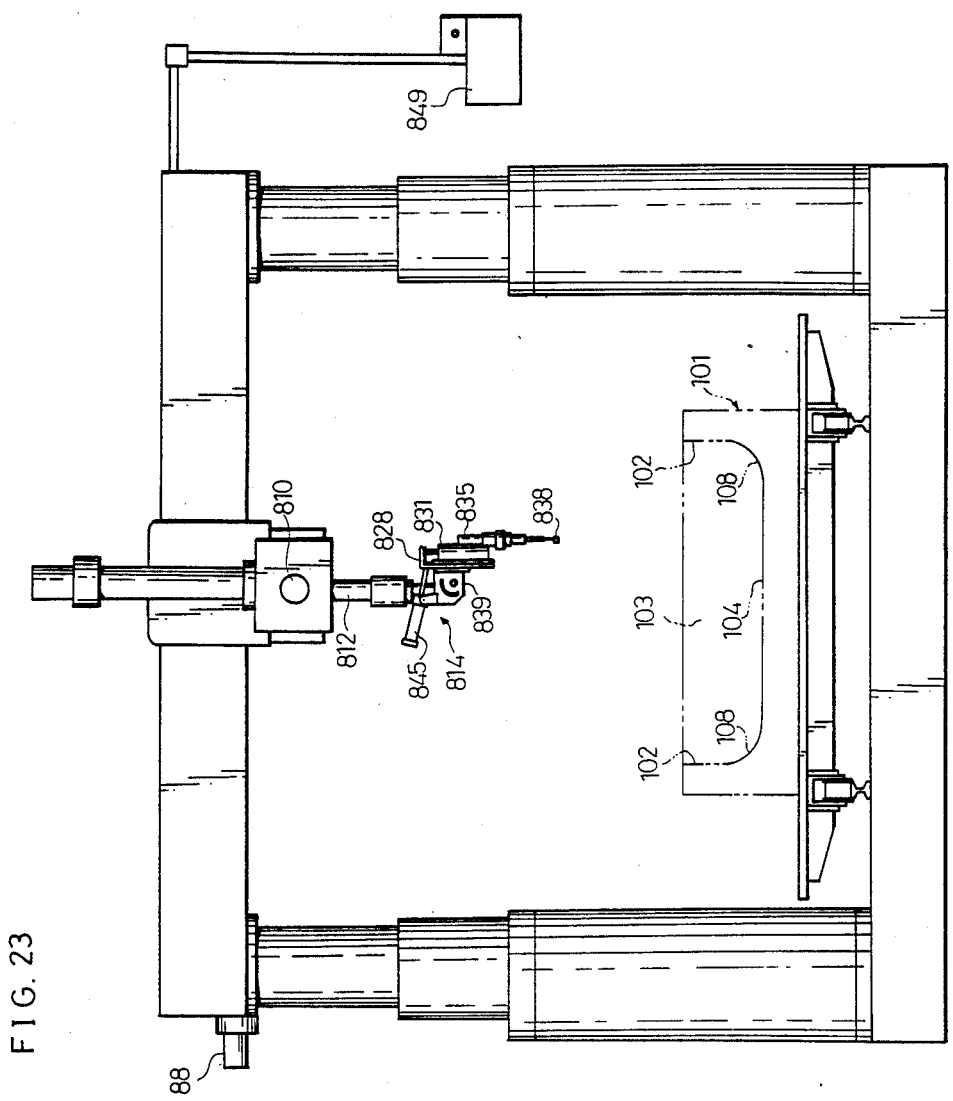
FIG. 23 is a front view of a grinding apparatus.

It should be noted that, as an attachment which is attached to the mounting member 833, oscillation generators 853 and 854 shown in FIGS. 23 and 24, respectively, may be employed, and the grindstone 838 may be oscillatably attached to the air motor 835 through such an oscillation generator. These are used to finish a processed surface of a molding die and to provide vertical lines for facilitating removal of a molded product.

As shown in FIGS. 19 and 21, a mounting plate 839 which is disposed so as to abut against the other support plate 816b of the bracket 816 is supported by the above-described horizontal shaft 825 in such a manner that the mounting plate 839 is pivotal to a desired position for adjustment. This mounting plate 839 is fixed by cooperation of a clamping lever 840 and a spacer 842 by pivoting the lever 840 which is passed through a slot 841 in the mounting plate 839 and which is screwed into the head block 815.

A support arm 843 is provided on the upper portion of one side of the mounting plate 839. The support arm 843 has a pair of bearing projections 844 on its upper surface, and a second air cylinder 845 is pivotally supported by a support shaft 846 between the bearing projections 844, the second air cylinder 845 being provided so as to press the grindstone 838 against a processed surface of the workpiece 101. The distal end of a piston rod 847 of the air cylinder 845 is connected to the guide member 828 through a connecting member 848. The clamping lever 827 is untightened to allow the bracket 816 to be pivotal, and the mounting plate 839 is fixed by means of the clamping lever 840. Further, the second air cylinder 845 is activated so as to project the piston rod 847, thus causing the bracket 816 to be pivoted from the position shown by the solid line in FIG. 19 so as to be disposed in the tilting position shown by the two-dot chain line.

It should be noted that the first and second air cylinders 831 and 845 are controlled by a control circuit (see FIG. 8) similar to that in the above-described second embodiment.

Figure 22:
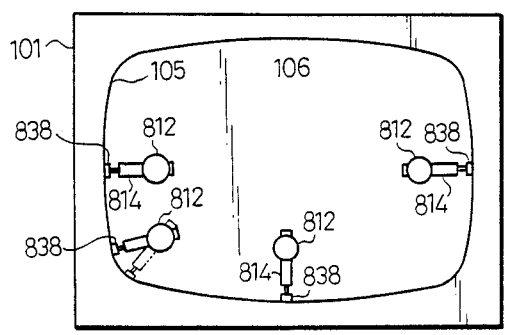
FIG. 22 is a plan view of a die for describing the grinding step.

When a vertically extending concave processed surface 105 of a workpiece 101 such as that shown in FIG. 22 (having an elliptical ring shape as viewed in FIG. 22) is to be ground using the die grinding apparatus arranged as described above, the bracket 816 of the wheel head 814 is first pivoted for adjustment so that the guide member 828 extends orthogonally with respect to the Z-direction moving shaft 812. Then, the bracket 816 is clamped by means of the clamping lever 827 so that the grindstone 838 is disposed in opposing relation to the processed surface 105 on the left-hand side of the workpiece 101. In this state, the switches on the control board 849 are actuated to bring the first air cylinder 831 into an operative state. Thus, the grindstone 838 is pressed against the processed surface 105 with a predetermined pressure by the operation of the first air cylinder 831.

Figure 20:
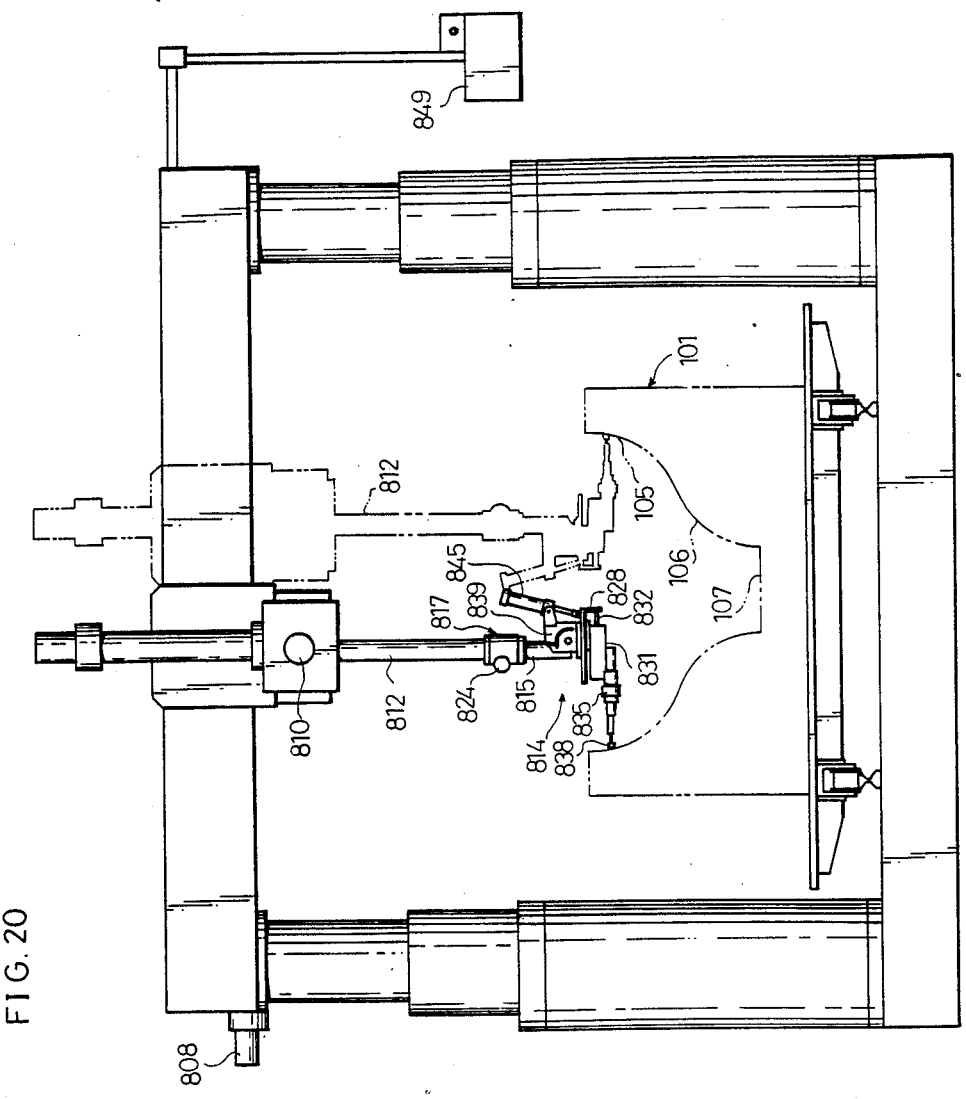
FIG. 20 is a front view of a grinding apparatus.

In this state, the air motor 835 is started to rotate the grindstone 838, and the wheel head 814 is moved vertically as viewed in FIG. 20. Thus, a part of the curved processed surface 105 is ground over a predetermined width in the vertical direction. Subsequently, the wheel head 814 is moved rightward and downward as viewed in FIG. 22. On the other hand, the wheel head 814 is stepwisely pivoted little by little by the operation of the servomotor 819, and the processed surface 105 which is contiguous with the above-described ground surface is thereby successively ground. In a corner shown in FIG. 22, the wheel head 814 is pivoted as shown by the two-dot chain line by the operation of the servomotor 819. Thus, the grindstone 838 is disposed in opposing relation to the processed surface 105, thereby allowing the curved processed surface 105 to be continuously ground.

To grind a processed surface 106 of the workpiece 101, the clamping lever 827 is untightened to allow the bracket 816 to be able to be pivoted, and the mounting plate 839 is clamped by means of the clamping lever 840. In this state, the switches on the control board 849 are actuated to bring the first and second air cylinders 831 and 845 into an operative state. By the operation of the second air cylinder 845, the bracket 816 is pivoted and disposed in a tilting position as shown by the two-dot chain line in FIG. 19. The first air cylinder 831 activates the grindstone 838 to move along the bracket 816. Accordingly, the grindstone 838 is pressed against the processed surface 105 with a predetermined pressure such as that described above by a resultant force from the respective working forces of the air cylinders 831 and 845.

In this state, the air motor 835 is started to rotate the grindstone 838, and the wheel head 814 is moved horizontally and vertically as viewed in FIG. 20. In consequence, a part of the processed surface 106 is ground over a predetermined width. Subsequently, the wheel head 814 is moved rightward and downward as viewed in FIG. 22, and the wheel head 814 is rotated by the operation of the servomotor 819. At this position, the grindstone 838 is disposed in opposing relation to the processed surface 106 to grind it continuously.

To grind a planar processed surface 107 of the workpiece 101, two directions, i.e., the longitudinal and vertical directions, are selected and set as directions of movement of the wheel head 814. The bracket 816 is disposed in the position shown by the solid line in FIG. 19 and then clamped by means of the clamping lever 827. The first air cylinder 831 is brought into an operative state in the same way as in the case of grinding the processed surface 105, and the wheel head 814 is thereby moved horizontally and longitudinally (a direction which is orthogonal with respect to the surface of paper) as viewed in FIG. 19, thereby allowing the bottom processed surface 107 to be ground.

When a processed surface of a workpiece 101 such as that shown in FIG. 23 is to be ground using the die grinding apparatus arranged as described above, the clamping lever 827 is first untightened to allow the bracket 816 to be able to be pivoted. To grind a processed surface 104 of the bottom of the workpiece 101, the switches on the control board 849 are actuated in this state so as to select and set two directions, i.e., the lateral and longitudinal directions, as directions of movement of the wheel head 814. Thus, the first and second air cylinders 831 and 845 are brought into an operative state. By the operation of the second air cylinder 845, the bracket 816 is pivoted and biased in the position shown by the solid line in FIG. 19. On the other hand, the first air cylinder 831 activates the grindstone 838 to move downward along the bracket 816, and the grindstone 838 is pressed against the processed surface 104 with a predetermined pressure.

It should be noted that, at this time, slight force is being applied to the processed surface 104 from the second air cylinder 845 in such a manner as to bias the guide member 828 and the like to pivot counterclockwise about the horizontal shaft 825.

In this state, the grindstone 838 is rotated by the operation of the air motor 835, while the wheel head 814 is moved as desired in the lateral and longitudinal directions by the operation of the motors 808 and 810 for movement in the X- and Y-directions, and the processed surface 104 is thereby ground.

To grind each of the processed surfaces 102 at both lateral sides of the workpiece 101, two directions, i.e., the longitudinal and vertical directions, are selected as directions of movement of the wheel head 814. On the other hand, the second air cylinder 845 is activated so as to project the piston rod 847, thereby pivoting and disposing the guide member 828 so as to extend orthogonally with respect to the Z-direction moving shaft 812. In consequence, the grindstone 838 is pressed against one processed surface 102 with a predetermined pressure by the operation of the first air cylinder 831. In this state, the air motor 835 is activated to rotate the grindstone 838, while the wheel head 814 is moved a desired in the longitudinal and vertical directions as viewed in FIG. 23, and the processed surface 102 is thereby ground. To grind processed surfaces 103 at both longitudinal sides of the workpiece 101, two directions, i.e., the lateral and vertical directions, are selected and set as directions of movement of the wheel head 814. On the other hand, the wheel head 814 is rotated 90° from the position shown in FIG. 23 and fixed by means of the clamping lever 852. Then, the second air cylinder 845 is activated to project the piston rod 847, thereby pivoting and disposing the guide member 828 so as to extend orthogonally with respect to the Z-direction moving shaft 812. In consequence, the grindstone 838 is pressed against the processed surface 102 with a predetermined pressure by the operation of the first air cylinder 831. In this state, the air motor 835 is activated to rotate the grindstone 838, while the wheel head 814 is moved as desired in the lateral and vertical directions as viewed in FIG. 23, and the processed surface 103 is thereby ground.

Further, to grind a portion at which the processed surfaces 102, 103 and 104 of the workpiece 101 are contiguous with each other, e.g., a processed surface 108, two directions, i.e., the longitudinal and vertical directions as viewed in FIG. 23, are selected and set as directions of movement of the wheel head 814. Then, the second air cylinder 845 is activated to pivot and dispose the guide member 828 in the tilting position shown by the two-dot chain line in FIG. 19. In consequence, the grindstone 838 is pressed against the processed surface 108 with a predetermined pressure by the operation of both the air cylinders 831 and 845. In this state, the air motor 835 is activated to rotate the grindstone 838, while the piston rod 846 of the second air cylinder 845 is withdrawn and advanced, and at the same time, the wheel head 814 is moved as desired in the longitudinal and vertical directions. thereby enabling the processed surface 108 to be ground.

Figure 25:
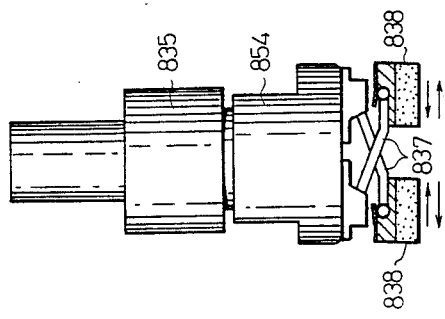
FIGS. 24 and 25 are front views respectively showing other attachments having grindstones attached thereto.

Upon completion of the operation of grinding the processed surface of the workpiece 101 by the rotary grindstone, the grindstone 838, together with the air motor 835, is removed from the mounting member 833. Then, the attachment shown in FIG. 24 or FIG. 25 is attached to the mounting member 833, and grinding for finishing each of the processed surfaces 102, 103, 104 and 108 and for providing vertical lines is effected by means of oscillation of the grindstone 838 caused by the oscillation generator 853 or 854.

In this embodiment, the grindstone 838 is constantly pressed against a processed surface of the workpiece 101 with a set given pressure by means of the first and second air cylinders 831 and 845. Accordingly, the grindstone 838 can be smoothly moved while following changes in configuration of the processed surface. As a result, it is possible to grind the processed surface uniformly and highly accurately without unevenness of grinding, that is, without any fear of a recess in the processed surface being insufficiently ground and without any fear of a projection being excessively ground. In addition, it is possible to prevent the grindstone 38 from locally contacting the processed surface.

Further, since in this embodiment the rotational mechanism section 817 which rotates the wheel head 814 around the central axis of the Z-direction moving shaft 812 is arranged so as to rotate together with the wheel head 814, there is no fear of the second air cylinder 845 interfering with the rotational mechanism section 817 by the rotation of the head block 815.

It should be noted that the processed surfaces 105 and 107 of the workpiece 101 may be ground with the bracket 816 allowed to pivot in the same manner as in the case of grinding the processed surface 106.

As described above in detail, in the seventh embodiment the wheel head is provided so as to be rotatable around the central axis of the Z-direction moving shaft through the rotational mechanism section. Therefore, when an operation of grinding a plurality of vertically extending processed surfaces of a workpiece is carried out, it is possible to eliminate the need for the operator to change the grindstone mounting position in accordance with the position of each of the processed surfaces, and it is therefore possible to improve the working efficiency. In particular, when these plurality of processed surfaces are curvedly contiguous with each other, the processed surfaces can be uniformly and highly accurately ground, advantageously.

An eighth embodiment of the present invention will be described hereinunder with reference to FIGS. 26 to 28. As shown in FIG. 26, a frame 901 of a die polishing machine has an X-moving member 902 provided so as to be laterally movable by means of an X-motor 903. A Y-moving member 904 is supported by the X-moving member 902 in such a manner that the member 904 is longitudinally movable by means of a Y-motor 905. A Z-moving member 906 is attached to the Y-moving member 904 in such a manner that the member 906 is vertically movable by means of a Z-motor 907, and a grindstone 909 is attached to the lower end of the Z-moving member 906 through a grindstone driving motor 908. The grindstone 909 is vibrated or rotated in response to the rotation of the grindstone driving motor 908 so as to selectively grind an X-Y processed surface 911, an X-Z processed surface 912 and a Y-Z processed surface 913 of a molding die 910.

A portable and remote-controllable teaching device 916 is connected through a cable 915 to a control board 914 which is secured to the frame 901. The device 916 has an operating member 917 which is tiltable within the range of 360°. A direction and amount of tilting of the operating member 917 are detected from a composite signal consisting of signals which are respectively output from a first-axis encoder 918 and a second-axis encoder 919 (see FIG. 28) which are disposed inside the device 916. The teaching device 916 is further provided with an input plate 920 and a correcting switch 921 serving as a correcting means which is actuated when the grindstone 909 is moved along an erroneous path.

Figure 28:
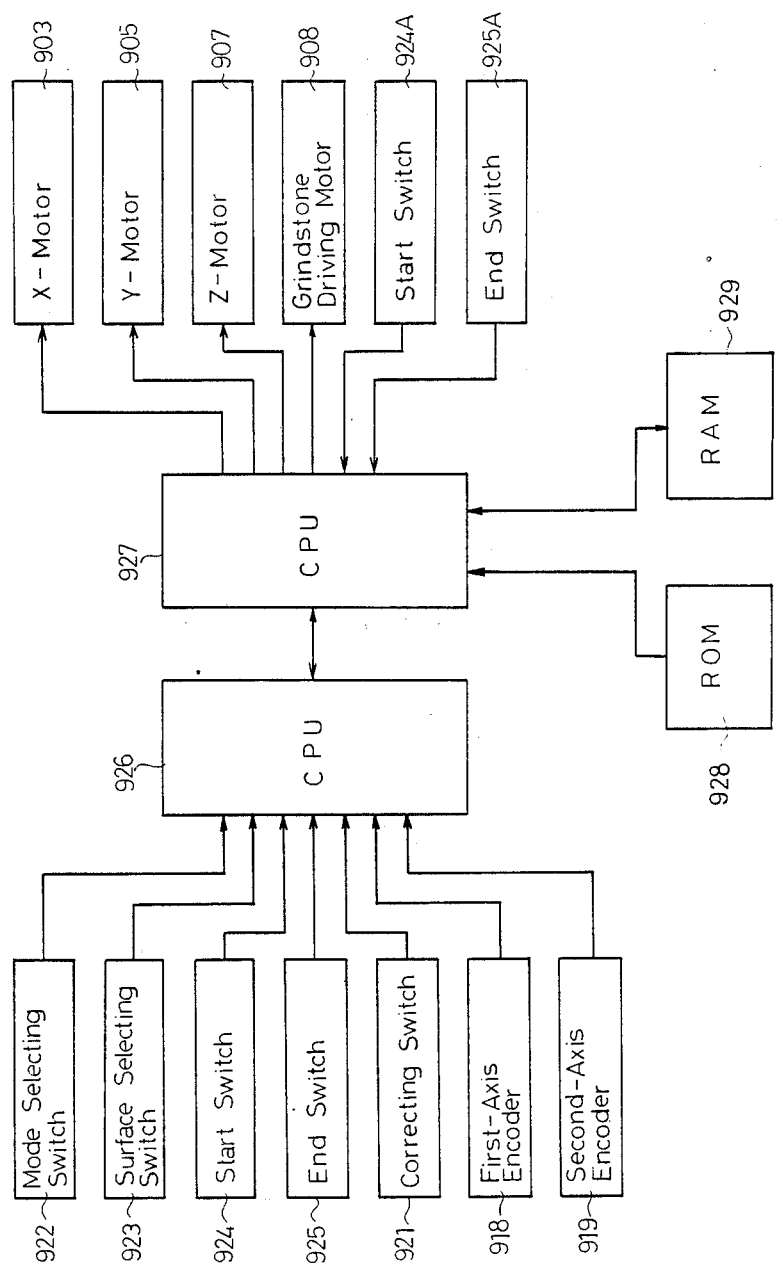
FIG. 28 is a block diagram schematically showing a control circuit for the die polishing machine.
Figure 29:
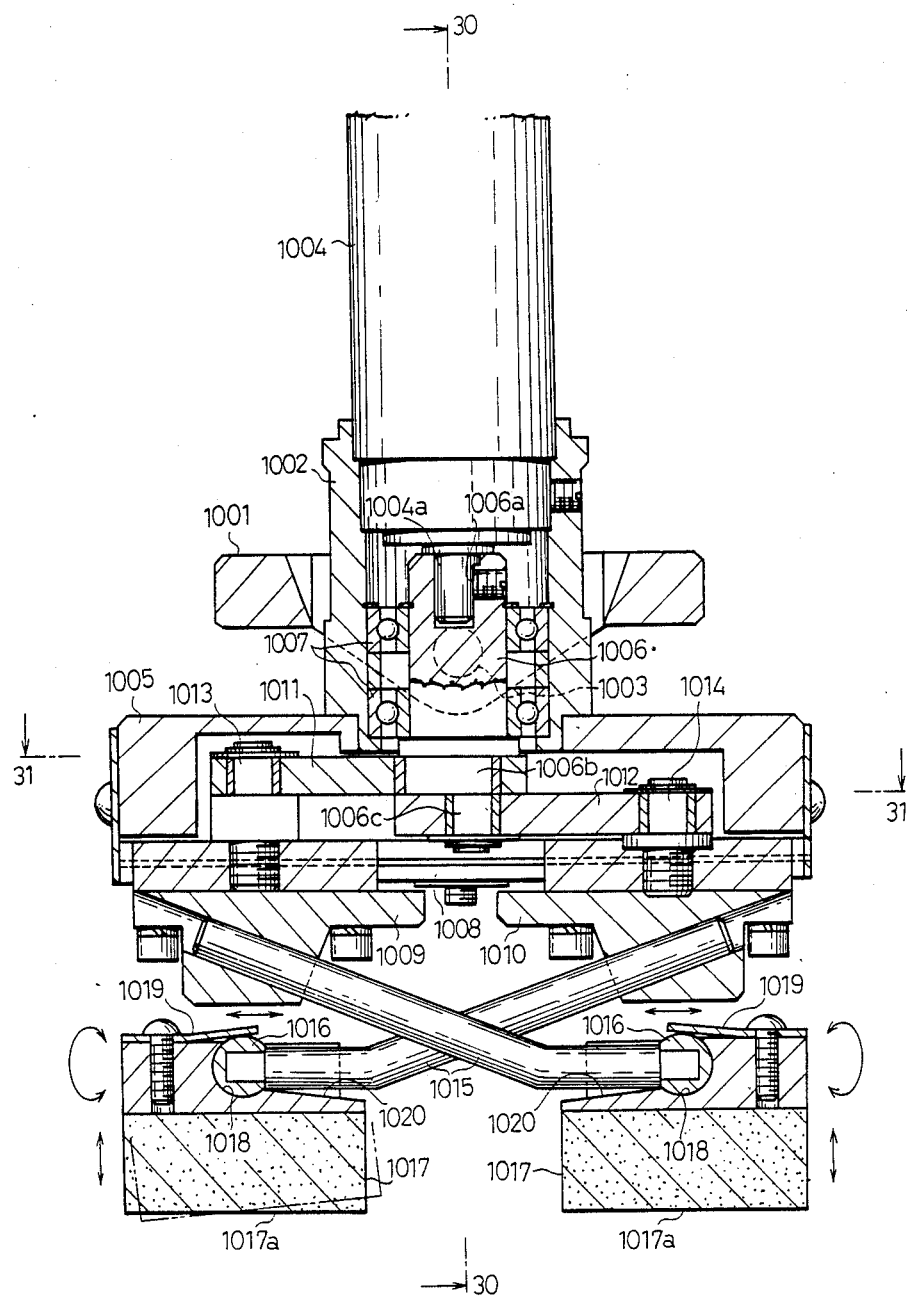
FIG. 29 is a fragmentary sectional view showing the arrangement of the wheel head portion of a grinding apparatus in a first practical example of a ninth embodiment of the present invention.
Figure 31:
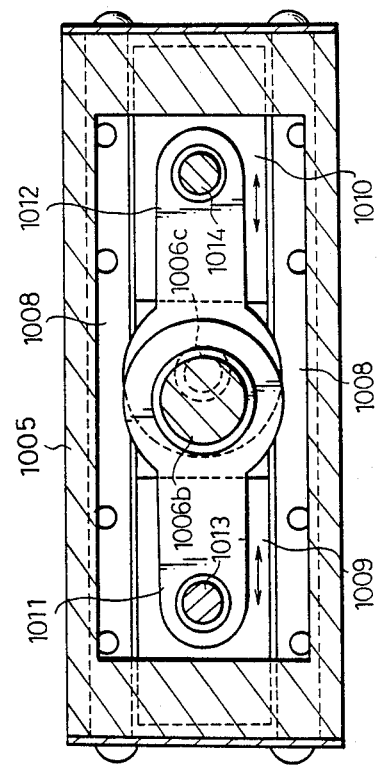
FIG. 31 is a sectional view taken along the line 31—31 of FIG. 29.
Figure 32:
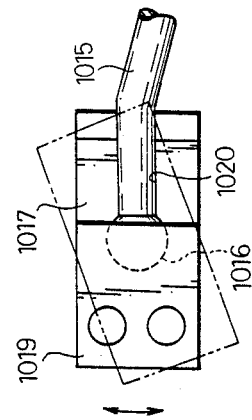
FIG. 32 is a fragmentary plan view showing the arrangement for supporting a grindstone.
Figure 30:
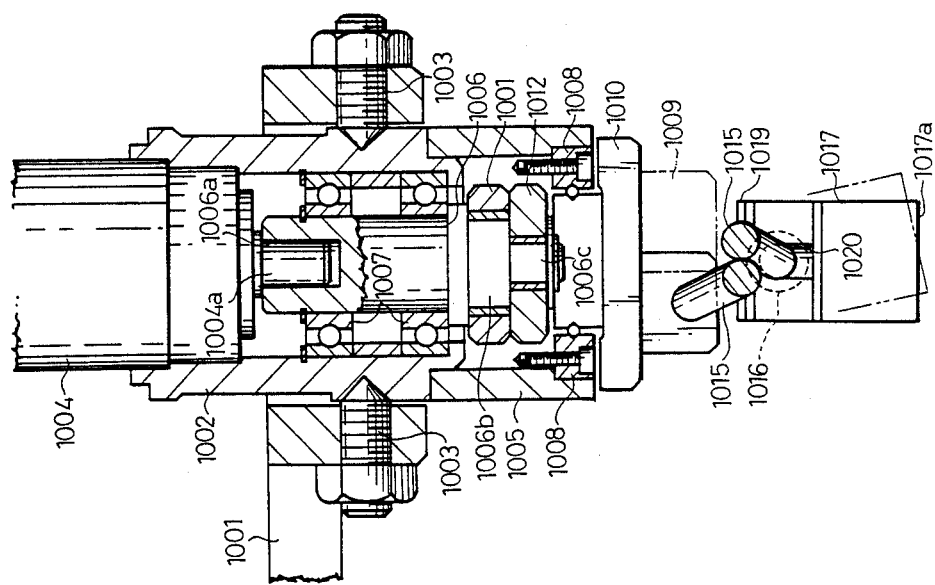
FIG. 30 is a fragmentary sectional view taken along the line 30—30 of FIG. 29.

On the input plate 920 are disposed, as shown in FIG. 28, a multiplicity of input switches such as a mode selecting switch 922 for selecting any one of the three modes, i.e., the manual operation mode, the teaching mode and the playback mode, a surface selecting switch 923 for selecting any one of the three processed surfaces, i.e., the X-Y processed surface 911, the X-Z processed surface 912 and the Y-Z processed surface 913, a start switch 924 for starting the teaching or playback step, and an end switch 925 for finishing each step. In addition, a display (not shown) for displaying a processed surface is provided on the input plate 920.

These switches 921 to 925 and the encoders 918, 919 are connected to the input side of a CPU 926 which is incorporated in the teaching device 916. The above-described display is connected to the output side of the CPU 926. Further, a CPU 927 which is incorporated in the control board 914 is connected to the output side of the CPU 926. Thus, data signals are transferred between the CPUs 926 and 927.

On the control board 914 are disposed, as shown in FIG. 28, input switches such as a start switch 924A for starting the teaching or playback step and an end switch 925A for finishing each step. In addition, a display (not shown) for displaying various running conditions during the teaching step, the playback step or the like is provided on the control board 914.

These switches 924A, 925A and the like are connected to the input side of the CPU 927, while the display is connected to the output side of the CPU 927. To the output side of the CPU 927 are further connected each of the motors 903, 905 and 907 for the X-, Y- and Z-directions and the grindstone driving motor 908, so that driving and stop signals are output from the CPU 927 to these motors. To the CPU 927 are further connected a ROM 928 for storing a program or the like for controlling the operation of the whole of the die polishing machine, and a RAM 929 serving as a memory means for rewritably storing grinding path data for the grindstone 909.

The following is a description of the teaching method for the die polishing machine arranged as described above. To effect teaching of a grinding path, the teaching mode is first selected by actuating the mode selecting switch 922 on the teaching device 916. Then, for example, the X-Y processed surface 911 is selected using the surface selecting switch 923, thereby setting two directions, i.e., X and Y, as directions of movement of the grindstone 909.

Subsequently, the operating member 917 of the teaching device 916 is tilted in a desired direction. In consequence, a detection signal corresponding to a direction and amount of tilting of the operating member 917 is output from each of the encoders 918 and 919 to the CPU 927. The detection signal is transferred from the CPU 926 to the CPU 927. Driving signals are output from the CPU 927 to the X- and Y-motors 903 and 905. As the motors 903 and 905 rotate, the grindstone 909 is moved along a desired grinding path in the X- and Y-directions, and the grinding path data is stored in the RAM 929.

If, as shown in FIG. 27, the grindstone 909 is moved along an erroneous path 109 during a teaching operation, the correcting switch 921 is pressed when the grindstone 909 is at the point 110 in FIG. 27. In consequence, the CPU 926 outputs a signal representative of this fact to the CPU 927. Thereupon, the CPU 927 reads out the path data stored in the RAM 929 in the reverse order to that at the time when it was input, and outputs reversing signals to the X- and Y-motors 903 and 905 Thus, the grindstone 909 is automatically returned along the erroneous path 109 from the point 110 toward a desired grinding path 112. When the grindstone 909 reaches the point 111 on the grinding path 112, the press on the correcting switch 921 is canceled. In consequence, the CPU 927 specifies data corresponding to the return path from the point 110 to the point 111 as erroneous path data and then erases the erroneous path data from the RAM 929. Accordingly, it is possible to dispose the grindstone 909 at the correct position immediately before the erroneous path was taken and to resume the rest of the teaching step from said position continuously and smoothly. When the playback mode is set using the mode selecting switch 922 upon the completion of the teaching step, the grinding path data stored in the RAM 929 in the above-described teaching step is read out in response to the operation of the start switch 924. The X- and Y-motors 903 and 905 are driven on the basis of the read data, and the grindstone 909 is moved on the X-Y processed surface 911 along the set grinding path a predetermined number of times and for a predetermined period of time, thereby allowing the die 910 to be automatically ground by the vibration or rotation of the grindstone 909.

It should be noted that, since the teaching device 916 in accordance with this embodiment incorporates the CPU 926, a multiplicity of input switches 921 to 925 and the like can readily be connected to the CPU 926. If data signals are serially transferred between the CPU 926 and the CPU 927 incorporated in the control board 914, it is possible to decrease the number of cables 915 and reduce the weight of the cable system, and the remote controllability of a large-sized die polishing machine can particularly be improved. In addition, a wireless controller may be employed as the teaching device 916.

Further, the erasion of the erroneous path data may be carried out when the grindstone 909 is automatically returned to the desired grinding path 112 along the erroneous path 109.

As has been described above in detail, according to the eighth embodiment, when the grindstone is moved along an erroneous path, the erroneous path data is erased from the memory means, and there is therefore no trouble of redoing the teaching step from the beginning. In addition, there is no fear of the machining time being wasted in the playback step nor risk of the erroneous path portion being excessively or unevenly ground. Further, in this case, the grindstone is returned to the desired grinding path along the erroneous path by actuating the correcting means. Accordingly, it is possible to dispose the grindstone at the correct position immediately before the erroneous path was taken and to resume the teaching step continuously and smoothly. Moreover, since the grindstone is automatically returned in response to the operation of the correcting means, it is possible to readily and speedily conduct the operation for correction.

A first practical example of a ninth embodiment of the present invention will be described hereinunder in detail with reference to FIGS. 29 to 32 and in comparison with the first embodiment.

In this practical example, a support arm 1001 is attached to the frame 1 of the grinding apparatus through the above-described support mechanism in such a manner that the arm 1001 is movable laterally, longitudinally and vertically. A support tube 1002 is tiltably supported on the support arm 1001 by means of a pair of pins 1003. An air motor 1004 is attached to the upper portion of the support tube 1002, and a box member 1005 the lower side of which is open is secured to the lower portion of the support tube 1002. A rotary shaft 1006 is received through the support tube 1002 and supported through bearings 1007. The support tube 1002 is formed at its upper end with a fitting bore 1006a for receiving a motor shaft 1004a of the air motor 1004, and a pair of eccentric pins 1006b and 1006c are provided on the support tube 1002 so as to project from its lower end.

A pair of front and rear guide rails 1008 are provided inside the box member 1005 and rigidly secured to both sides, respectively, of its lower end. A pair of left and right moving members 1009 and 1110 are supported between the guide rails 1008 in such a manner that they are movable in the same direction. Actuating arms 1011 and 1012 are pivotally attached to the upper sides of the moving members 1009 and 1110 at the outer ends thereof by means of pins 1013 and 1014, respectively. The above-described eccentric pins 1006b and 1006c are rotatably fitted in the respective inner ends of the actuating arms 1011 and 1012.

Support bars 1015 which serve as moving members and are defined by bar-shaped members project from the respective lower portions of the moving members 1009 and 1010 in such a manner that the bars 1015 extend along the moving direction of the moving members 1009 and 1010 and cross each other at the center. Spherical members 1016 are rigidly secured to the respective distal ends of the support bars 1015.

A pair of grindstones 1017 are tiltably supported at the respective distal ends of the support bars 1015 in such a manner that a spherical recess 1018 which is provided in the upper surface of each grindstone 1017 is engaged with the corresponding spherical member 1016. A square abrasive surface 1017a is provided on the bottom of each of the grindstones 1017. A leaf spring 1019 is attached to the upper surface of each grindstone 1017 so as to press the spherical member 1016 toward the inner side of the spherical recess 1018. A restraining groove 1020 which defines a restraining means is formed in the upper surface of each grindstone 1017. The distal end portion of each support bar 1015 is engaged with the corresponding restraining groove 1020, thereby preventing the grindstone 1017 from being pivoted in the direction of the arrow shown in FIG. 32 about an axis intersecting the abrasive surface 1017a at right angles.

The operation of the grinding apparatus arranged as described above will next be explained. In this grinding apparatus, the support arm 1001 is moved in a desired direction on the frame 1, and the rotary shaft 1006 is rotated in response to the drive of the air motor 1004 with the abrasive surfaces 1017a of the pair of grindstones 1017 disposed so as to face a predetermined processed surface of the workpiece 101. In consequence, the moving members 1009 and 1110 are reciprocatively moved toward and away from each other through the actuating arms 1011 and 1012 along the guide rails 1008 by the action of the eccentric pins 1006b and 1006c. In response to this movement, the pair of grindstones 1017 are bisymmetrically moved toward and away from each other through the support bars 1010, and the processed surface of the workpiece 101 is thus efficiently ground over a wide range by means of the abrasive surfaces 1017a of the grindstones 1017.

At this time, each grindstone 1017 is tiltably attached to the corresponding support bar 1015 through the spherical member 1016. Therefore, as shown by the chain line in FIGS. 29 and 30, the abrasive surface 1017a of each grindstone 1017 is tilted in any direction in accordance with the slanting condition of the processed surface of the workpiece 101 Accordingly, the abrasive surface 1017a is disposed in a position conformable with the processed surface of the workpiece 101 at all times, so that it is possible to carry out the grinding operation efficiently. Further, in this embodiment a part of the support bar 1015 is engaged with the engagement groove 1020 provided in each grindstone 1017 in order to prevent the grindstone 1017 from pivotaing about an axis intersecting the abrasive surface 1017a at right angles. Therefore, the grindstone 1017 is pivoted as shown by the two-dot chain line in FIG. 32, and there is therefore no fear of any corner of the abrasive surface 1017a being disposed forward in the direction of movement Accordingly, the grindstone 1017 is smoothly reciprocated without any risk of a corner of the abrasive surface 1017a locally contacting the processed surface of the workpiece 101, so that the grinding operation is smoothly carried out.

Figure 33:
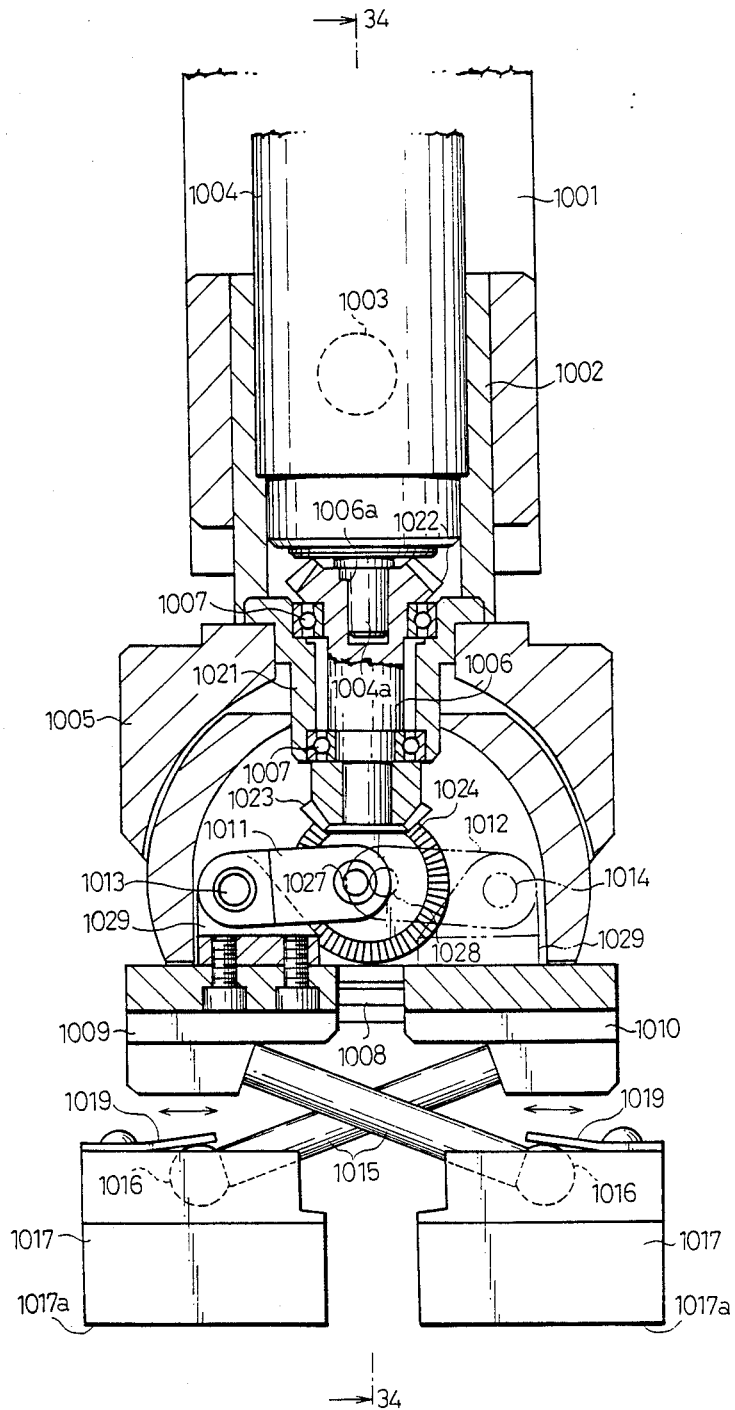
FIG. 33 is a sectional view of the wheel head portion in a second practical example of the ninth embodiment.

A second practical example of the ninth embodiment will next be described with reference to FIGS. 33 and 34 and in comparison with the first embodiment In this practical example, the rotary shaft 1006 which is rotated by the air motor 1004 is received in the upper portion of the box member 1005 and supported through a tubular member 1021 and a pair of bearings 1007. A transmission bevel gear 1022 is formed at the upper end of the tubular member 1021, and a driving bevel gear 1023 is rigidly secured to the lower end of the tubular member 1021. A pair of driven bevel gears 1024 and 1025 are rotatably supported in the lower portion of the box member 1005 through bearings 1026 Eccentric pins 1027 and 1028 are provided so as to project from the opposing end faces of the driven bevel gears 1024 and 1025, respectively.

Mounting members 1029 are rigidly secured to the pair of moving members 1009 and 1110, respectively, which are movably supported on the guide rails 1008 inside the box member 1005. The actuating arms 1011 and 1012 are pivotally attached to the mounting members 1029 at the outer ends thereof by means of the pins 1013 and 1014, respectively The above-described eccentric pins 1027 and 1028 are rotatably fitted in the respective inner ends of the actuating arms 1011 and 1012. Further, the support bars 1015 radially project from the respectively lower portions of the moving members 1009 and 1010, and the grindstones 1017 are tiltably supported at the lower ends of the support bars 1015 through the corresponding spherical members 1016, in the same manner as in the above-described ninth embodiment.

Accordingly, in the grinding apparatus of this practical example, when the rotary shaft 1006 is rotated by the air motor 1004, the driven bevel gears 1024 and 1025 are rotated through the driving bevel gear 1023. Thus, the moving members 1009 and 1010 are reciprocatively moved toward and away from each other along the guide rails 1008 by the action of the eccentric pins 1027 and 1028 through the actuating arms 1011 and 1012. In response to this movement, the pair of grindstones 1017 are bisymmetrically moved toward and away from each other through the support bars 1015, and it is therefore possible to efficiently grind the processed surface of the workpiece 101 over a wide range by means of the abrasive surface 1017a of each of the grindstones 1017 in the same manner as in the case of the above-described first practical example.

It should be noted that in this practical example the transmission bevel gear 1022 is provided at the upper end of the rotary shaft 1006. Therefore, the arrangement may also be such that the box member 1005 is attached to the outer surface of the support tube 1002, and the rotary shaft 1006 is disposed so as to extend on an axis intersecting the axis of the motor shaft 1004a at right angles, and further a bevel gear (not shown) which is meshed with the transmission bevel gear 1022 is secured to the motor shaft 1004a so that the rotation of the motor shaft 1004a is transmitted to the rotary shaft 1006.

Figure 34:
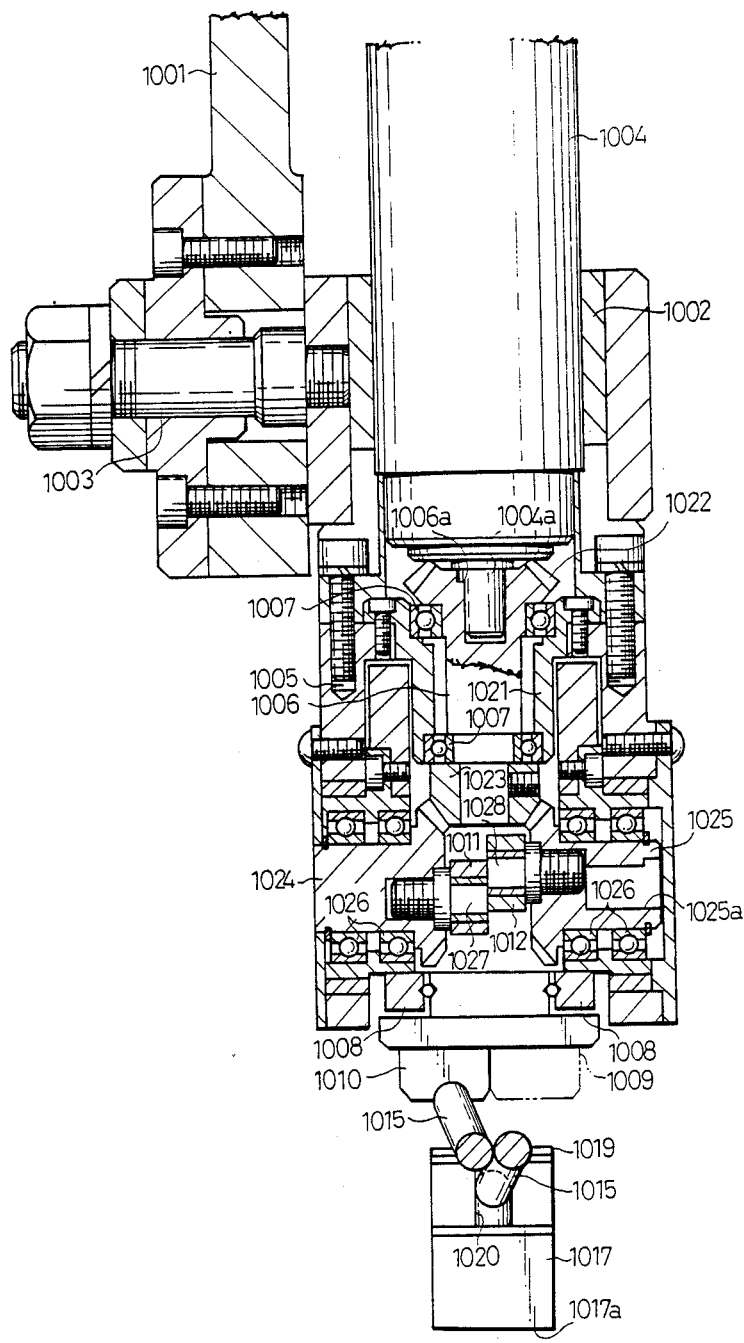
FIG. 34 is a fragmentary sectional view taken along the line 34—34 of FIG. 33.

Further, in this practical example, as shown in FIG. 34, a fitting bore 1025a is formed in the end portion of the shaft of one driven bevel gear 1025. Accordingly, the arrangement may also be such that the box member 1005 is attached to the lower end of the support tube 1002, and the distal end of the motor shaft 1004a is fitted into the fitting bore 1025a of the driven bevel gear 1025, so that the rotation of the motor shaft 1004a is transmitted directly to the one driven bevel gear 1025 and also to the other driven bevel gear 1024 through the driving bevel gear 1023.

Figure 35:
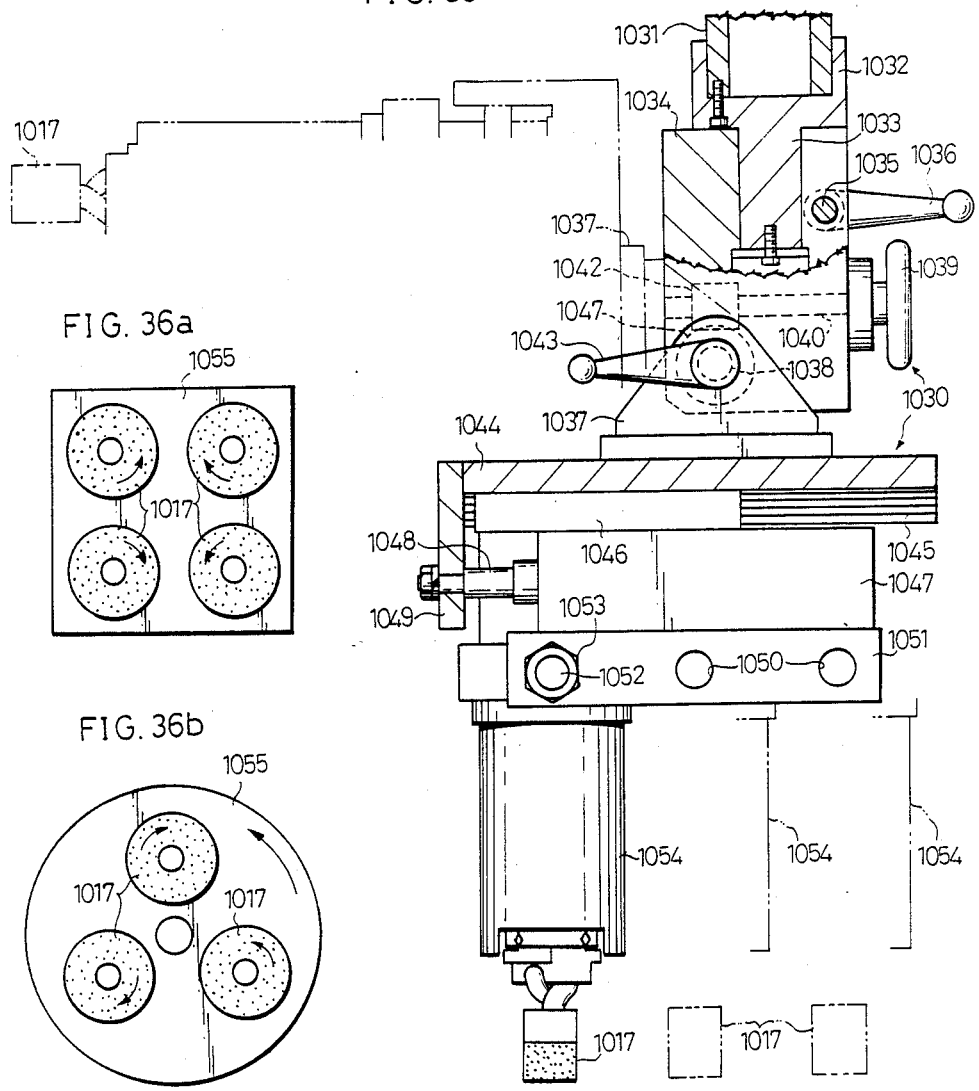
FIG. 35 is a fragmentary sectional view of the wheel head portion of a third practical example of the ninth embodiment.

A third practical example of the present invention will next be described with reference to FIG. 35. In this practical example, a changing mechanism 1030 is provided between a frame 1031 of the grinding apparatus and a grindstone 1017, the mechanism 1030 being adapted for changing the mounting position of the grindstone 1017 and the position of its abrasive surface 1017a in accordance with the configuration of the processed surface of the workpiece 101.

A support member 1034 is supported by a downwardly extending shaft portion 1033 of a mounting member 1032 which is rigidly secured to the lower end of the frame 1031 in such a manner that the support member 1034 is rotatable within a horizontal plane. The support member 1034 is adjusted to a desired rotational position by actuating a lever 1036 and fixed at the adjusted position through a clamping screw 1035. A bracket 1037 is pivotally supported at the lower end portion of the support member 1034 by means of a horizontal shaft 1038. Further, the support member 1034 has an operating shaft 1040 which is rotated using a handle 1039. The operating shaft 1040 is provided thereon with a worm 1042 which is in mesh with a worm wheel 1041 provided on the above-described horizontal shaft 1038. The bracket 1037 is pivoted for adjustment within a vertical plane in response to the operation of the handle 1039 and fixed at a desired pivotal position by means of a clamping lever 1043.

A guide member 1044 is rigidly secured to the lower surface of the bracket 1037. A moving member 1046 is reciprocatably and slidably supported on a pair of guide rails 1045 which are attached to both sides, respectively, of the lower surface of the guide member 1044. A cylinder 1047 for adjustment is rigidly secured to the moving member 1046 in such a manner as to extend horizontally, and a piston rod 1048 thereof is connected to a plate 1049 downwardly extending from the guide member 1044. A suspending member 1051 which has a plurality of mounting bores 1050 is rigidly secured to the lower side of the cylinder 1047 for adjustment. A reciprocative movement generating unit 1054 is attached to the suspending member 1051 using one of the bores 1050 and a combination of a screw 1052 and a nut 1053 in such a manner that the position of the unit 1054 is changeable. This unit 1054 is arranged in the same way as in the case of the above-described tenth embodiment, that is, it is adapted to cause a pair of grindstones 1017 to move toward and away from each other bisymmetrically.

Accordingly, in this third practical example, it is possible to untighten the lever 1036 and dispose the grindstones 1017 at any adjusted position within a horizontal plane by hand. Further, the grindstones 1017 can be pivoted for adjustment within the range of substantially 90° within a vertical plane through the bracket 1037 by actuating the handle 1039. Moreover, the position of the grindstones 1017 can be adjusted appropriately along the processed surface by a combination of the control of operation of the cylinder 1047 for adjustment and the change of the position at which the reciprocative movement generating unit 1054 is secured to the suspending member 1051. Accordingly, the grindstones 1017 can effectively be disposed so as to face a complicated molded surface of the workpiece 101. It should be noted that the operating shaft 1040 may be driven by means of a servomotor or the like in place of the above-described handle 1039.

Figure 36A:
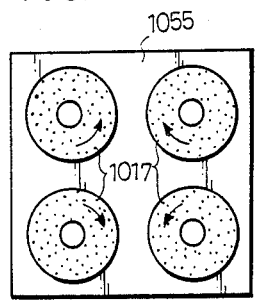
FIGS. 36(a) to 36(d) are bottom views respectively showing other examples of arrangement of grindstones in the ninth embodiment.
Figure 36B:
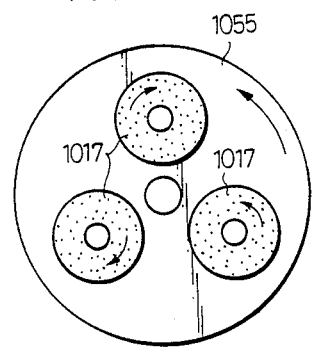
Figure 36C:
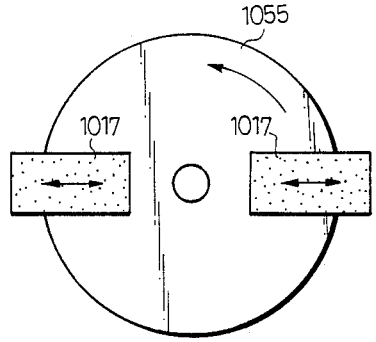
Figure 36D:
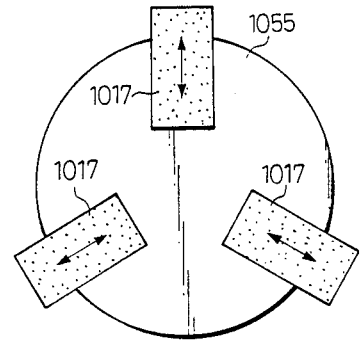

FIGS. 36(a) to 36(d) respectively show other examples of arrangement of the grindstones 1017 in the above-described ninth embodiment. FIG. 36(a) shows an arrangement in which four grindstones 1017 are disposed on the lower surface of a fixed support member 1055 in such a manner that each grindstone 1017 can be driven to rotate. FIG. 36(b) shows an arrangement in which three grindstones 1017 are supported on a support member 1055 which is driven to rotate around a shaft 1056 so that each grindstone 1017 is rotatable. FIG. 36(c) shows an arrangement in which a pair of grindstones 1017 are mounted on a support member 1055 which is rotated by a shaft 1056 in such a manner that the grindstones 1017 are movable toward and away from each other. FIG. 36(d) shows an arrangement in which three grindstones 1017 are disposed on a fixed support member 1055 so as to be movable toward and away from the center of the support member 1055. In these examples also, substantially the same function and effects as those in each of the above-described practical examples can be obtained.

As has been described above in detail, in the ninth embodiment, it is unnecessary to increase the grindstone operating stroke, and it is possible to simplify the arrangement of the wheel head and reduce the size thereof as well as simultaneously grind the processed surface of the workpiece 101 over a wide range by cooperation of a plurality of grindstones, advantageously. Further, the grindstones can be driven by means of a single common motor, so that the grindstone driving arrangement can also be simplified, advantageously.

Figure 37:
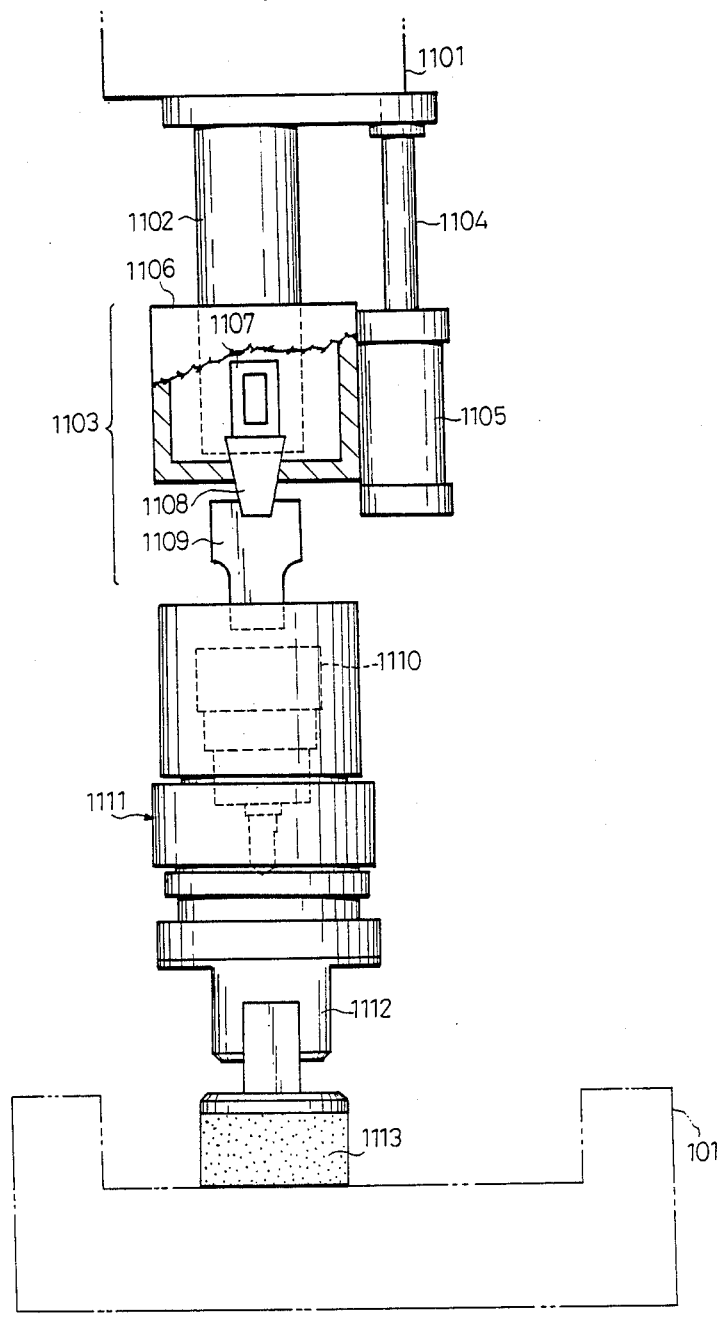
FIG. 37 is a partially-sectioned front view of a tenth embodiment of the present invention.

A tenth embodiment of the present invention will be described hereinunder in detail with reference to FIG. 37 and in comparison with the first embodiment.

A moving head 1101 is supported at the lower side of a support frame 1 in such a manner that the head 1101 is movable both longitudinally and laterally. A downwardly extending guide pillar 1102 is rigidly secured to the lower end of the moving head 1101. An ultrasonic vibration generator 1103 is vertically movably supported on the guide pillar 1102. An air cylinder 1105 which has a piston rod 1104 connected to the moving head 1101 is rigidly secured to one side of the generator 1103. As the piston rod 1104 is expanded and contracted, the ultrasonic vibration generator 1103 is vertically moved along the guide pillar 1102.

The ultrasonic vibration generator 1103 consists of a vibrator case 1106, a vibrator 1107 which is incorporated in the vibrator case 1106 and adapted to generate mechanical vibrations on the basis of the operation of an oscillator (not shown), a cone 1108 which is connected to the vibrator 1107 and supported so as to project downwardly from the vibrator case 1106, and a horn 1109 which is connected to the lower end portion of the cone 1108. Vibrations of the vibrator 1107 are enlarged through the cone 1108 and generated from the horn 1109 in the form of ultrasonic vibrations in the vertical direction.

A casing 1111 which incorporates an air motor 1110 serving as a drive source is suspended from the lower end of the horn 1109 of the ultrasonic vibration generator 1103. A support member 1112 which is reciprocatively vibrated within a horizontal plane on the basis of the operation of the air motor 1110 is provided at the lower side of the casing 1111. A grindstone member 1113 defined by a grindstone for polishing the workpiece 101 is supported and fixed at the lower end of the support member 1112.

The piston rod 1104 is expanded or withdrawn to move the casing 1111, the support member 1112 and the abrasiVe member 1113 through the movement of the ultrasonic vibration generator 1103, thereby pressing the abrasive member 1113 against the workpiece 101 under a predetermined pressure. When, in this state, the air motor 1110 is activated, the abrasive member 1113 is reciprocatively vibrated within a horizontal plane to polish the workpiece 101.

Accordingly, when the ultrasonic vibration generator 1103 is activated during the polishing of the workpiece 101, vertical ultrasonic vibrations are generated from the horn 1109. The ultrasonic vibrations are transmitted to the abrasive member 1113 through the casing 1111 and the support member 1112, thus subjecting the member 1113 to vertical ultrasonic vibrations. As a result, the workpiece 101 is eroded by the cavitation and striking action based on the vertical vibrations of the abrasive member 1113 in addition to the grinding effected by the reciprocative vibrations within a horizontal plane of the abrasive member 1113. In addition, cuttings which are generated from the abrasive member 1113 and the workpiece 101 are discharged without residing in the area therebetween. Accordingly, the grinding efficiency of the workpiece 101 is improved.

Further, the present invention may also be carried out as follows:

(a) The abrasive member 1113 is arranged so as to be rotated by means of a drive source.

(b) The abrasive member 1113 is arranged such that it is vibrated horizontally and also vibrated by means of ultrasonic vibrations in a direction which obliquely crosses the direction of the horizontal vibrations.

(c) The abrasive member 1113 is arranged such that it is rotated and also vibrated by means of ultrasonic vibrations in a direction which obliquely crosses the direction of the rotation thereof.

Figure 39:
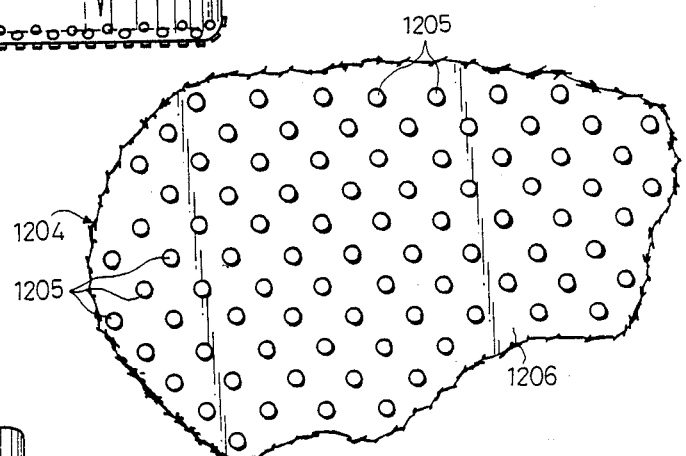
FIG. 39 is a fragmentary enlarged plan view of a planar abrasive member.

An eleventh embodiment of the present invention will next be explained with reference to FIG. 39.

Figure 38:
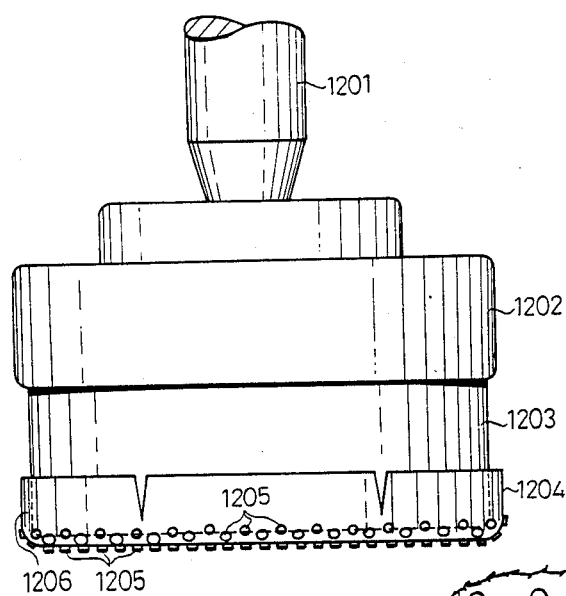
FIG. 38 is a front view of an eleventh embodiment in which the present invention is embodied in a grinding tool.

As shown in FIG. 38, a support member 1202 is attached to the distal end of a rotary rod 1201 which is rotated by means of an appropriate drive source, and a cushioning member 1203 which is made from rubber and has a circular shape in plan view is fixed to the lower surface of the support member 1202 so as to be supported thereby. Further, a planar abrasive member 1204 which is defined by paper diamond is bonded to the lower surface of the cushioning member 1203. As shown in FIG. 39, the planar abrasive member 1204 is composed of a base cloth 1206 and a multiplicity of abrasives 1205 formed by combining synthetic diamond grains.

Accordingly, when the planar abrasive member 1204 is engaged with the workpiece 101 to grind the latter by actuating the drive unit, the abrasive member 1204 is engaged with the workpiece 101 with flexibility provided by the cushioning member 1203. Therefore, the planar abrasive member 1204 can be brought into contact with the surface of the workpiece 101 which is to be ground over a wide area. Accordingly, it is possible to carry out efficient grinding.

In this embodiment, when the planar abrasive member 1204 has become worn, it is only necessary to remove the abrasive member 1204 and replace it with another.

Figure 40:
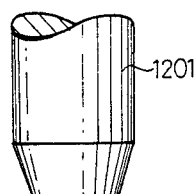
FIG. 40 is a partially-sectioned front view of another example.

This embodiment may also be carried out as follows:

(a) As shown in FIG. 40, a bolt 1207 is provided integral with the center of the lower surface of the support member 1202. An internal thread portion 1208 which is provided in the center of the upper surface of the cushioning member 1203 is brought into thread engagement with the bolt 1207, thereby detachably securing the cushioning member 1203 to the support member 1202. Further, the planar abrasive member 1204 is bonded to the surface of the cushioning member 1203, and the edge portions 1204a of the planar abrasive member 1204 are clamped between the support member 1202 and the cushioning member 1203.

Accordingly, in this example, when the planar abrasive member 1204 and the cushioning member 1203 have become worn, the thread engagement between the bolt 1207 and the internal thread portion 1208 is untightened to remove the cushioning member 1203 and the planar abrasive member 1204 so that these members can be replaced with new ones.

Figure 41:
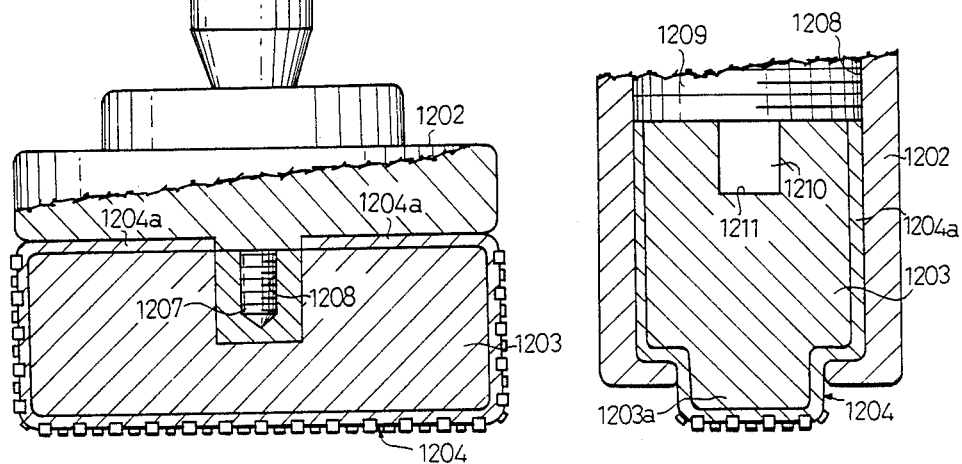
FIG. 41 is a sectional front view of still another example.

(b) As shown in FIG. 41, a projection 1210 is provided at the end of an external thread portion 1209 formed at the distal end of the rotary rod 1201, and this projection 1210 is engaged with a recess 1211 formed in the proximal end of the cushioning member 1203. Then, the cushioning member 1203 is fitted into a fitting tube 1212 in such a manner that only the distal end portion 1203a of the member 1203 can be exposed, and the internal thread portion 1208 at the proximal end and the external thread portion 1209 are brought into thread engagement with each other to secure the cushioning member 1203. Further, the planar abrasive member 1204 is bonded to the distal end portion 1203a of the cushioning member 1203, and the edge portions 1204a of the member 1204 are clamped between the cushioning member 1203 and the fitting tube 1212.

In this case also, the cushioning member 1203 and the planar abrasive member 1204 can be removed so as to be replaced with new ones.

Figure 42:
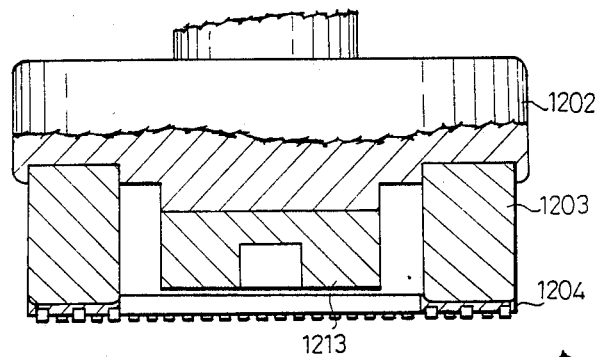
FIG. 42 is a partially-sectioned front view of a further example.

(c) As shown in FIG. 42, a magnet 1213 is rigidly secured to the central portion of the lower surface of the support member 1202, and a cylindrical cushioning member 1203 is rigidly secured to the support member 1202 in such a manner as to receive the magnet 1213. Further, a ring-shaped planar abrasive member 1204 is bonded to the lower surface of the cushioning member 1203.

Accordingly, in this example, when the planar abrasive member 1204 is engaged with the die, the abrasive member 1204 is brought into close contact with the surface which is to be ground by magnetic force of the magnet 1213.

(d) The cushioning member 1203 is formed from a rubber magnet.

In this case also, the planar abrasive member 1204 is magnetically brought into close contact and thereby engaged with the surface which is to be ground.

(e) An abrasive cloth other than paper diamond is used as the planar abrasive member 1204.

Figure 43:
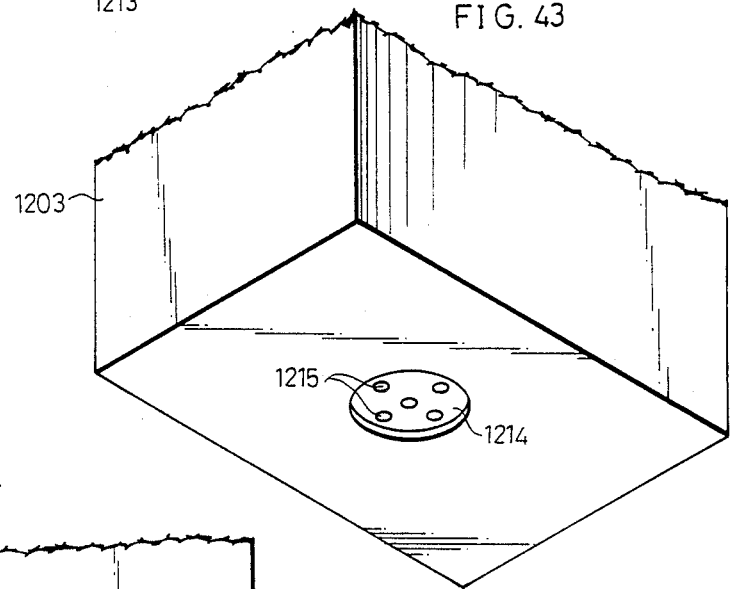
FIG. 43 is a fragmentary perspective view of a still further example.

(f) As shown in FIG. 43, A circular recess 1214 is provided in the central portion of the lower surface of the cushioning member 1203, and a grinding fluid supply passage 1215 is provided so as to extend vertically through the cushioning member 1203 and open into the recess 1214. Then, the planar abrasive member is bonded to the surface of the cushioning member 1203 so that a grinding fluid is supplied to the recess 1214 through the supply passage 1215 and permeated into the planar abrasive member so as to flow out from the abrasive surface.

Accordingly, in this example, the grinding fluid can be supplied directly to the area between the workpiece and the abrasive surface, and there is no need to dispose any obstructive member such as a grinding fluid supply nozzle in the vicinity of the support member or the cushioning member 1203.

Figure 44:
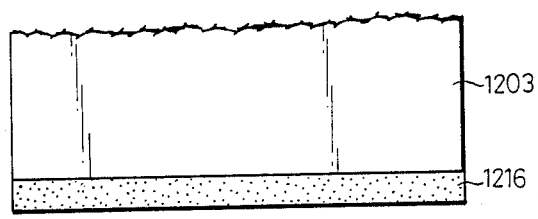
FIG. 44 is a front view of a still further example.

(g) As shown in FIG. 44, a plate-shaped grindstone 1216 which serves as a planar abrasive member is bonded to the lower surface of the cushioning member 1203.

Figure 45:
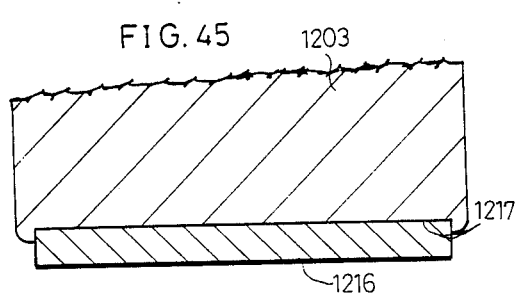
FIG. 45 is a sectional front view of a still further example.

(h) As shown in FIG. 45, the plate-shaped grindstone 1216 serving as a planar abrasive member is fitted and bonded to a recess 1217 which is provided in the lower surface of the cushioning member 1203.

Figure 46:
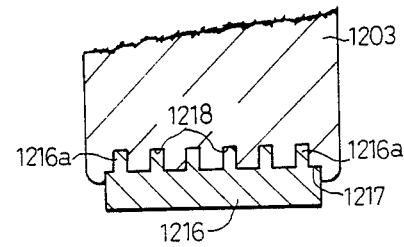
FIG. 46 is a sectional front view of a still further example.

(i) As shown in FIG. 46, the plate-shaped grindstone 1216 serving as a planar abrasive member is fitted and bonded to the recess 1217 provided in the lower surface of the cushioning member 1203, and projections 1216a which are provided on the upper surface of the grindstone 1216 are fitted and bonded to fitting holes 1218 which are provided in the recess 1217.

A twelfth embodiment of the present invention will be described hereinunder in detail with reference to FIG. 47.

Figure 47:
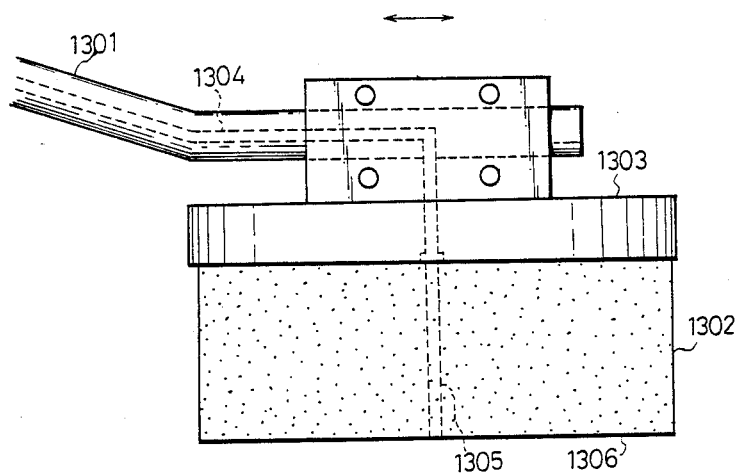
FIG. 47 is a front view of a twelfth embodiment of the present invention.

As shown in FIG. 47, a support member 1303 is attached to the horizontally supported distal end of a support rod 1301. An abrasive member 1302 for grinding which is formed from a grindstone and has a square shape in plan view is attached to the lower surface of the support member 1303. The support rod 1301 is horizontally (in the direction of the arrow) vibrated by means of a drive unit (not shown), and the abrasive member 1302 is thereby vibrated in the same direction, thus grinding a workpiece.

Grinding fluid supply pipes 1304 which are communicated with each other are respectively disposed inside the support rod 1301 and inside the support member 1303. The proximal end of the pipe 1304 is connected to a grinding fluid supply unit (not shown). The abrasive member 1302 has a grinding fluid supply passage 1305 extending therethrough in such a manner that the passage 1305 opens to an abrasive surface 1306 which is defined by the lower surface of the abrasive member 1302 and crosses the abrasive surface 1306 at right angles, the passage 1305 being connected to the distal end of the pipe 1304.

Accordingly, when the grinding fluid supply unit is activated when a workpiece is to be ground, the grinding fluid is supplied directly to the area between the workpiece and the abrasive surface 1306 through the pipe 1304 and the grinding fluid supply passage 1305. Therefore, the grinding fluid is supplied without the need to dispose any obstructive member such as a nozzle in the vicinity of the abrasive member 1302. Accordingly, there is nothing around the abrasive member 1302 which might restrict the movement of the abrasive member 1302, and it is therefore possible to increase the degree of freedom with which the a abrasive member 1302 can move and also reduce the number of required parts. Further, since in this embodiment a fresh grinding fluid can be supplied directly to the workpiece from the abrasive surface 1306, it is also possible to improve the workpiece cooling effect and the like by means of the grinding fluid.

Figure 48:
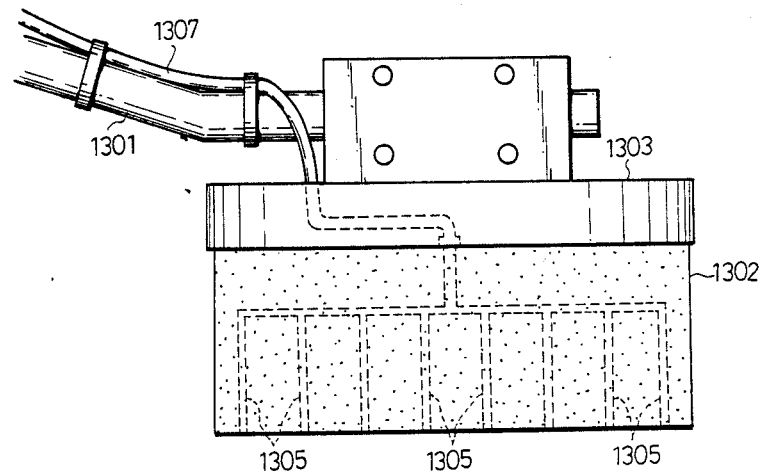
FIG. 48 is a front view of another example.

In addition, this embodiment may also be carried out as follows:

(a) As shown in FIG. 48, a tube 1307 is disposed along the outer periphery of the support rod 1301.

(b) As shown in FIG. 48, the grinding fluid supply passage 1305 provided in the abrasive member 1302 is branched off into a plurality of passages at the substantially middle portion of the abrasive member 1302.

Figure 49:
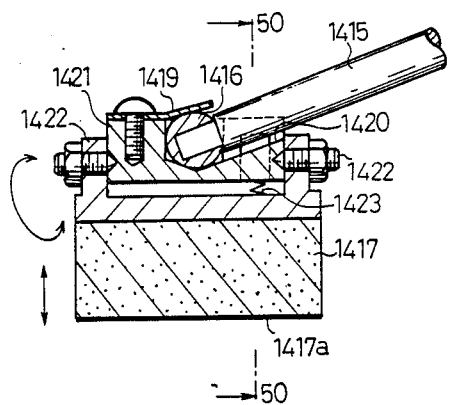
FIG. 49 is a fragmentary sectional view of a first practical example of a thirteenth embodiment of the present invention.
Figure 50:
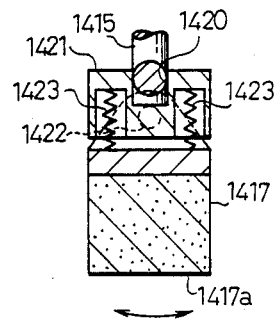
FIG. 50 is a fragmentary sectional view taken along the line 50—50 of FIG. 49.

A first practical example of a thirteenth embodiment of the present invention will next be described with reference to FIGS. 49 and 50. In this practical example, a support block 1421 is tiltably supported at the lower end of a support bar 1415 through a spherical member 1416. A grindstone 1417 is tiltably attached to the support block 1421 through a pair of pins 1422. A pair of springs 1423 for maintaining a neutral position are interposed between the support block 1421 and the grindstone 1417. Further, the support block 1421 is provided with a leaf spring 1419 for pressing the spherical member 1416 and a restraining groove 1420 which is engageable with the support bar 1415. Accordingly, in this practical example, the grindstone 1417 is tilted with respect to the support bar 1415 even more smoothly, and the grinding operation can be conducted smoothly and efficiently. Further, the engagement between the support bar 1415 and the restraining groove 1420 enables reliable prevention of the grindstone 1417 from pivoting about an axis which intersects the abrasive surface 1417a at right angles.

Figure 51:
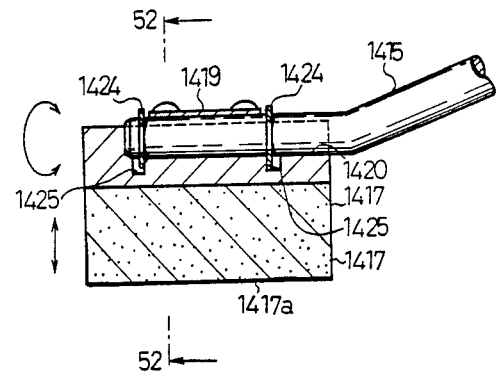
FIG. 51 is a fragmentary sectional view of a second practical example.
Figure 52:
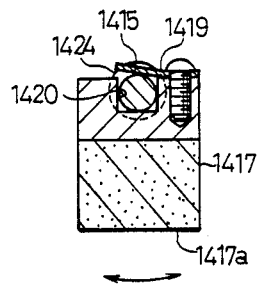
FIG. 52 is a sectional view taken along the line 51—51 of FIG. 51.

A second practical example of this embodiment will next be explained with reference to FIGS. 51 and 52. In this practical example, the lower end portion of the support bar 1415 is received in the restraining groove 1420 above the grindstone 1417 in such a manner as to be rotatable relative to the groove 1420. The relative movement of the support bar 1415 in the axial direction is blocked by the engagement between a pair of stop rings 1424 and a pair of engagement grooves 1425, and the support bar 1415 is pressed into the restraining groove 1420 so as to be retained by the leaf spring 1419 on the grindstone 1417. Accordingly, in this practical example also, the grindstone 1417 is tilted with respect to the support member 1415 as desired, and the grinding operation can be carried out smoothly and efficiently. Further, it is possible to reliably prevent the grindstone 1417 from being pivoted about an axis which intersects the abrasive surface 1417a at right angles.

Figure 53:
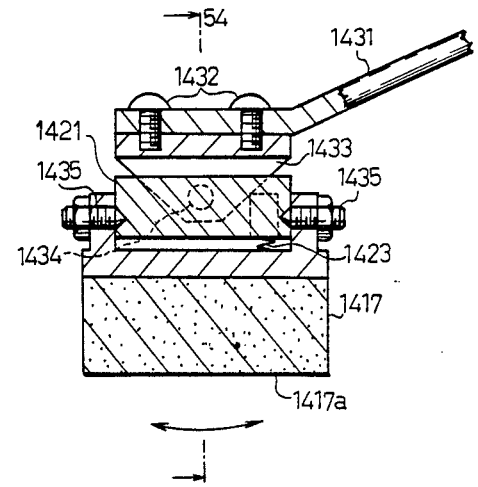
FIG. 53 is a fragmentary sectional view of a third practical example.
Figure 54:
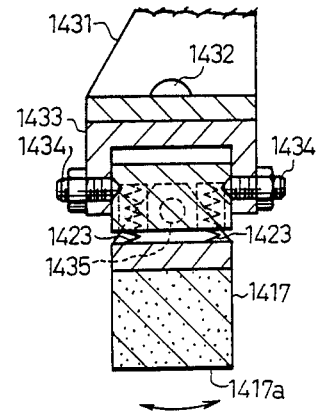
FIG. 54 is a sectional view taken along the line 54—54 of FIG. 53.

A third practical example of this embodiment will next be explained with reference to FIGS. 53 and 54. A U-shaped bracket 1433 is rigidly secured through screws 1432 to the lower surface of the distal end portion of a support plate 1431 which defines a moving member. A support block 1421 is supported by the bracket 1433 through a pair of pins 1434 in such a manner that the support block 1421 is tiltable about a first axis which is parallel to the abrasive surface 1417a of the grindstone 1417. Further, the grindstone 1417 is supported by the support block 1421 through a pair of pins 1435 in such a manner that the grindstone 1417 is tiltable about a second axis which intersects the first axis at right angles, the grindstone 1417 being normally maintained in a neutral position by means of a pair of springs 1423. Accordingly, in this practical example, the pins 1434 define a restraining means which restrains the grindstone 1417 from pivoting about an axis which intersects the abrasive surface 1417a at right angles, whereby it is possible to obtain the same function and effects as those in each of the above-described practical examples.

Further, in this embodiment, it is possible to reliably prevent a corner of the abrasive surface from locally contacting a processed surface of a workpiece. Moreover, since the grindstone is tiltable, it can be moved smoothly without any hindrance in a state wherein its abrasive surface extends parallel with the processed surface of the workpiece.

A fourteenth embodiment of the grinding apparatus in which the present invention is embodied will next be explained in detail with reference to FIGS. 55 to 61 and in comparison with the first embodiment.

Figure 55:
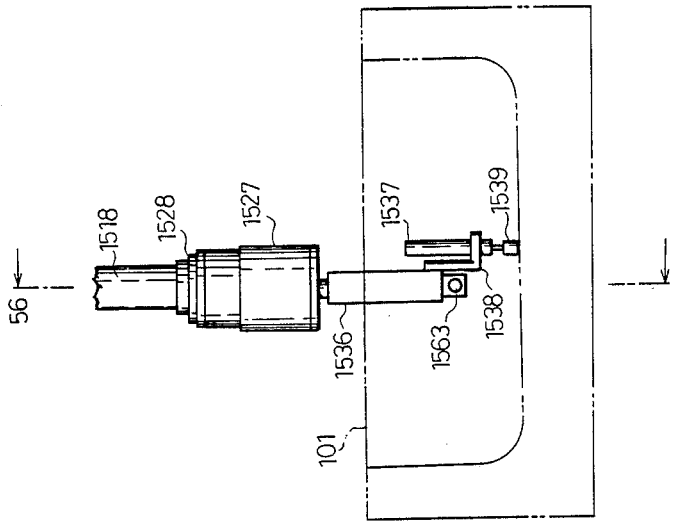
FIG. 55 is a front view of the wheel head portion of a grinding apparatus according to a fourteenth embodiment of the present invention.
Figure 56:
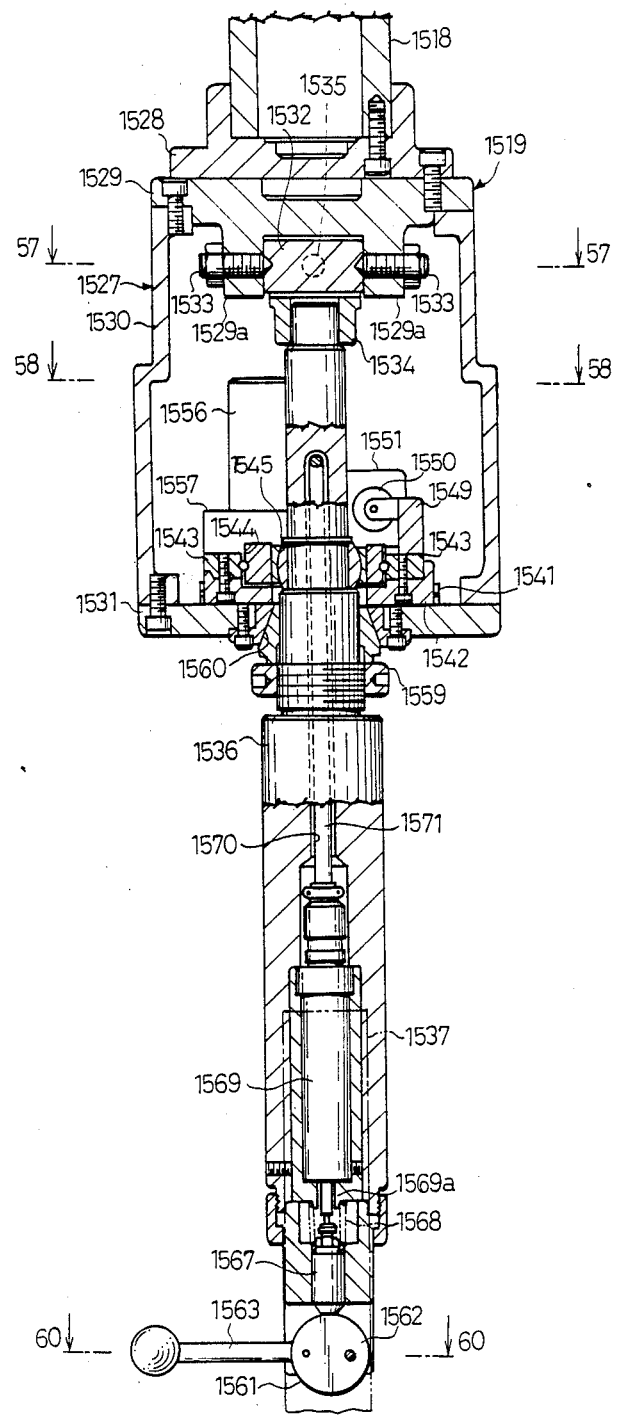
FIG. 56 is an enlarged sectional view taken along the line 56—56 of FIG. 55.
Figure 57:
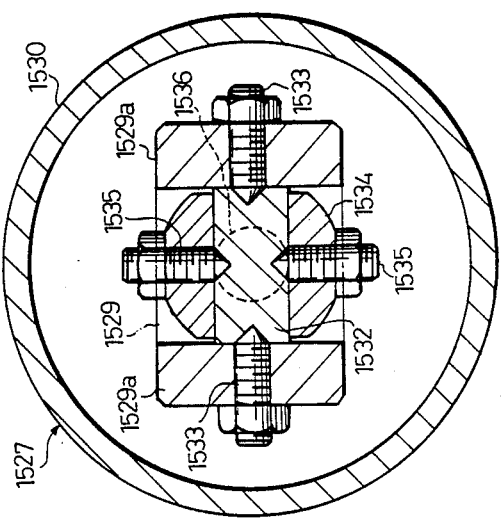
FIG. 57 is an enlarged sectional view taken along the line 57—57 of FIG. 56.

As shown in FIGS. 55 and 56, a wheel head 1518 which serves as a moving member is supported on a frame 1 of this grinding apparatus in such a manner that the wheel head 1518 is movable in the X-, Y- and Z-directions. A case member 1527 in the shape of a hermetically sealed tube is attached to the lower end of the wheel head 1518 through a coupling 1528. The case member 1527 consists of an upper plate 1529, a tubular body 1530 and a lower plate 1531. A pair of support pieces 1529a are formed so as to project from the lower surface of the upper plate 1529. As shown in FIGS. 56 and 57, a first tilting member 1532 is supported between the support pieces 1529a by means of a pair of support pins 1533 in such a manner as to be tiltable about a horizontal axis which extends in the X-direction, and a second tilting member 1534 is supported at the bifurcate lower portion of the first tilting member 1532 by means of a pair of support pins 1535 in such a manner that the second tilting member 1534 is tiltable about a horizontal axis which extends in the Y-direction.

A support rod 1536 which serves as a support member is rigidly secured to the second tilting member 1534 in such a manner as to project downwardly from the case member 1527, the support rod 1536 being adapted to be tiltable in the X- and Y-directions as desired together with both the tilting members 1532 and 1534. As shown in FIG. 55, an air motor 1537 is attached to the outer periphery of the lower end of the support rod 1536 through a mounting plate 1538, and a grindstone 1539 is secured to the lower portion of the air motor 1537. The grindstone 1539 is rotated or oscillated in response to the operation of the air motor 1537.

Figure 59:
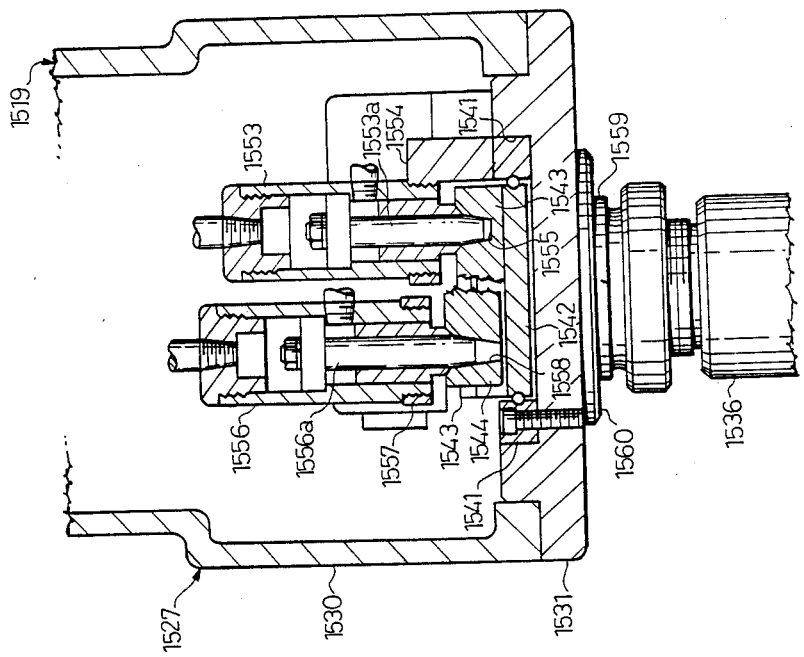
FIG. 59 is a fragmentary sectional view taken along the line 59—59 of FIG. 58.
Figure 58:
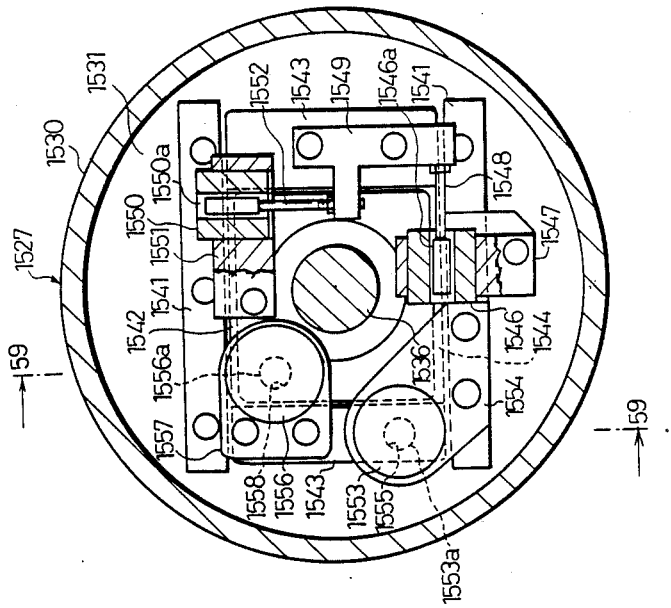
FIG. 58 is an enlarged sectional view taken along the line 58—58 of FIG. 56.

As shown in FIGS. 56, 58 and 59, a pair of front and rear X-direction guide rails 1541 which extend in the X-direction are rigidly secured to the upper surface of the lower plate 1531 of the case member 1527. An X-direction moving plate 1542 is movably supported between the X-direction guide rails 1541, and a pair of left and right Y-direction guide rails 1543 which extend in the Y-direction are rigidly secured to the upper surface of the X-direction moving plate 1542. A Y-direction moving plate 1544 is movably supported between the Y-direction guide rails 1543, and the above-described support rod 1536 is supported through a ball bearing 1545 so as to extend through the substantially central portion thereof.

As shown in FIG. 58, an X-direction differential transformer 1546 which serves as a detector is mounted on the front X-direction guide rail 1541 through a mounting block 1547, and a movable iron piece 1546a of the transformer 1546 is fixed through a connecting rod 1548 to a fixed plate 1549 on the right Y-direction guide rail 1543. A Y-direction differential transformer 1550 which serves as a detector is mounted on the Y-direction moving plate 1544 through a mounting block 1551, and a movable iron piece 1550a of the transformer 1550 is fixed to the fixed plate 1549 through a connecting rod 1552. When the moving plates 1542 and 1544 are moved in the X- and Y-directions, respectively, in response to the tilting of the support rod 1536, signals for driving the X- and Y-direction moving motors 19 and 25 are output from the differential transformers 1546 and 1550 in accordance with the amounts of movement of the moving plates 1542 and 1544.

As shown in FIGS. 58 and 59, an X-direction locking air cylinder 1553 is mounted on the front X-direction guide rail 1541 through a support plate 1554. When the air cylinder 1553 is activated, the distal end of its piston rod 1553a is engaged with an engagement hole 1555 provided in the upper side of the left Y-direction guide rail 1543 to lock the movement of the X-direction moving plate 1542. A Y-direction locking air cylinder 1556 is mounted on the left Y-direction guide rail 1543 through a support plate 1557. When the air cylinder 1556 is activated, the distal end of its piston rod 1556a is engaged with an engagement hole 1558 provided in the upper side of the Y-direction moving plate 1544 to lock the movement of Y-direction moving plate 1544. As shown in FIG. 56, a lock member 1559 is in thread engagement with the substantially central portion of the support rod 1536 in such a manner that the lock member 1559 is vertically movable. When this lock member 1559 is moved upward in response to the rotation for tightening, the tapered portion at the upper end of the lock member 1559 is engaged with a tapered bore member 1560 provided in the lower plate 1531 which constitutes the case plate 1527, thus locking the support rod 1536 from tilting.

Figure 60:
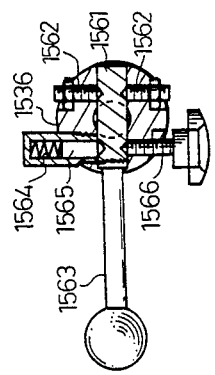
FIG. 60 is a sectional view taken along the line 60—60 of FIG. 56.

As shown in FIGS. 56 and 60, an eccentric ring 1561 is pivotally supported through a pair of pins 1562 at the bifurcate lower end portion of the support rod 1536, and an operating lever 1563 which serves as an operating member for tilting the support rod 1536 in the X- and Y-directions is provided so as to project from one side of the outer periphery of the bifurcate lower end portion of the support rod 1536. An engagement pin 1565 which is biased inwardly by means of a spring 1564 and a clamping screw 1566 are disposed in opposing relation to each other on the bifurcate portion of the support rod 1536. The eccentric ring 1561 is clamped between the engagement pin 1565 and the clamping screw 1566 by tightening the clamping screw 1566, thereby locking the eccentric ring 1561 from being pivoted with the operating lever 1563.

As shown in FIG. 56, an actuating pin 1567 is vertically movably received in the lower end of the support rod 1536 and is biased so as to abut against the eccentric ring 1561 by means of a spring 1568. A Z-direction differential transformer 1569 which serves as a detector is fitted so as to be supported within the support rod 1536 and above the actuating pin 1567, and a movable iron piece 1569a of the transformer 1569 is engaged with the actuating pin 1567. When the actuating pin 1567 is vertically moved in response to the pivotal movement of the eccentric ring 1561 through the operating lever 1563, a signal for driving the motor 40 for movement in the Z-direction is output from the differential transformer 1569 in accordance with an amount of movement of the pin 1567. A bore 1570 for receiving a cord 1571 is formed in the center of the support rod 1536 and above the Z direction differential transformer 1569.

Figure 61:
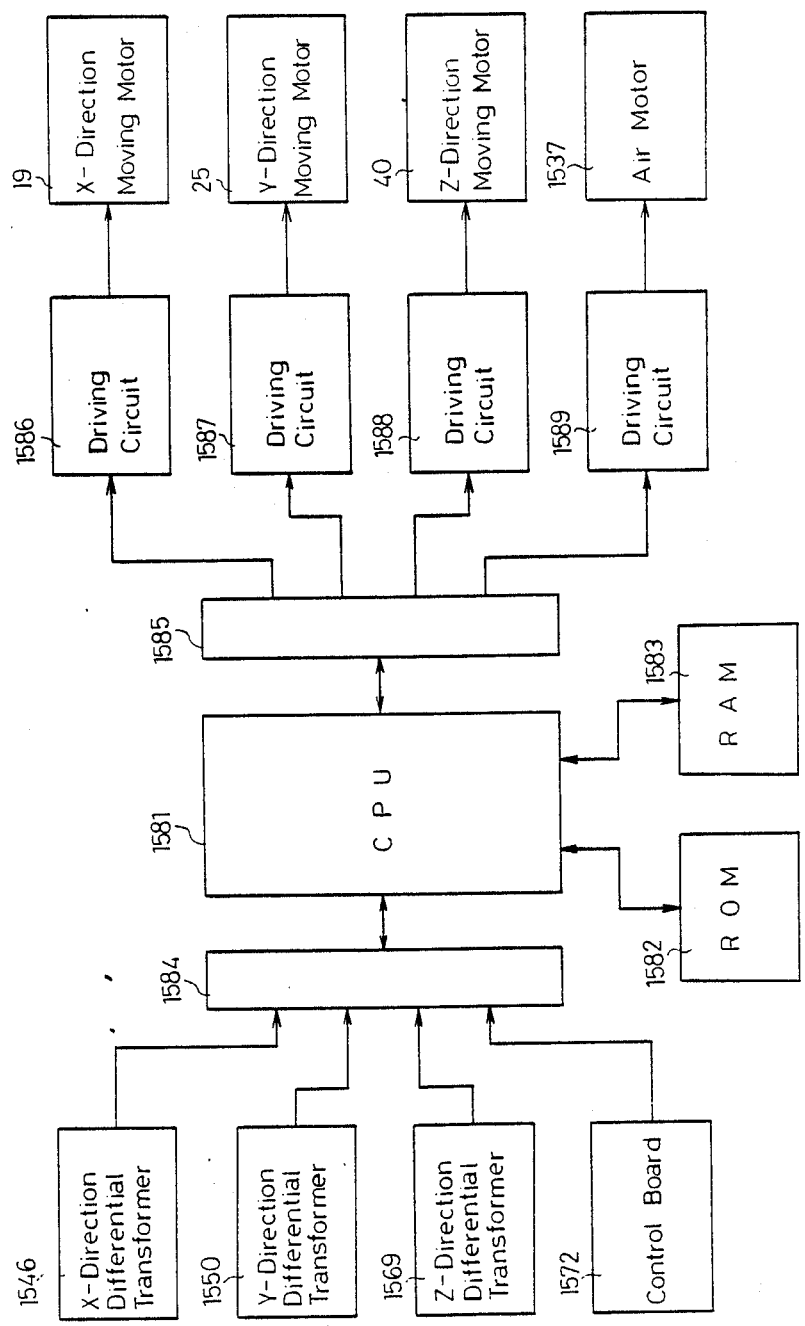
FIG. 61 is a block diagram of a control circuit.

A control circuit for controlling the grinding apparatus arranged as described above will next be explained with reference to FIG. 61. To a central processing unit (CPU) 1581 which defines a control means are connected a read-only memory (ROM) 1582 and a random-access memory (RAM) 1583 which defines a memory means. The ROM 1582 is adapted to store a program or the like for controlling the operation of the whole of the grinding apparatus, and the RAM 1583 is adapted to store grinding path data or the like for the wheel head 1518 which is input thereto in the teaching mode.

To the CPU 1581 are further connected through an input interface 1584 the X-, Y- and Z-direction differential transformers 1546, 1550 and 1569 and the control board 1572 for operating the grinding apparatus so that various signals delivered therefrom are input to the CPU 1581. To the CPU 1581 are further connected through an output interface 1585 and driving circuits 1586 to 1589 the X-, Y- and Z-direction moving motors 19, 25 and 40 for moving the wheel head 1518 and the air motor 1537 so that driving and stop signals are output thereto from the CPU 1581.

The operation of the grinding apparatus arranged as described above will next be described.

In this grinding apparatus, the wheel head 1518 is first moved as desired in the X-, Y- and Z-directions along a processed surface of a workpiece 101 such as a molding die to effect teaching of a grinding path of the grindstone 1539 as shown in FIG. 55. In this case, the teaching mode is selected using a mode selecting switch (not shown) on the control board 1572. In consequence, the air cylinders 1553 and 1556 shown in FIGS. 58 and 59 are activated to move their piston rods 1553a and 1556a upwardly and remove them from the corresponding engagement holes 1555 and 1558, thus releasing the X- and Y-direction moving members 1542 and 1544 from the locked state. When the lock member 1559 shown in FIG. 56 is untightened and removed downwardly from the tapered bore member 1560, the support rod 1536 is released from the locked state. Further, when the clamping screw 1566 is untightened, the eccentric ring 1561 is released from the locked state.

When, in this state, the support rod 1536, together with the grindstone 1539, is tilted in the X- and Y-directions as desired by controlling the operating lever 1563, the X- and Y-direction moving plates 1542 and 1544 are moved in the corresponding directions. In accordance with the amounts of movement of the moving plates 1542 and 1544, detection signals are output to the CPU 1581 from the X- and Y-direction differential transformers 1546 and 1550. When the operating lever 1563 is turned vertically, the eccentric ring 1561 is pivoted to move the actuating pin 1567 vertically, thus causing the Z-direction differential transformer 1569 to output a detection signal to the CPU 1581 in accordance with the amount of movement of the actuating pin 1567.

On the basis of these detection signals, the CPU 1581 outputs driving signals for the motors 19, 25 and 40 for movement in the X-, Y- and Z-directions. The operation of the motors 19, 25 and 40 enables the wheel head 1518 to be moved in the direction in which the operating lever 1563 is actuated. In addition, an equivalent signal is output from the CPU 1581 to the RAM 1583 and stored therein as grinding path data. Accordingly, grinding path data for the grindstone 1539 along the processed surface of the workpiece 101 can readily be stored by directly actuating through the operating lever 1563 the support rod 1536 supporting the grindstone 1539.

When the processed surface of the workpiece 101 is to be ground on the basis of the stored grinding path data, the machining mode is selected using the mode selecting switch on the control board 1572. In consequence, the grinding path data is successively read out from the RAM 1583 to the CPU 1581, and driving signals are output to the X-, Y- and Z-direction moving motors 19, 25 and 40 on the basis of the read data. Thus, the wheel head 1518 is moved as desired in the X-, Y- and Z-directions by the drive of the motors 19, 25 and 40. At the same time, the air motor 1537 is activated to reciprocate the grindstone 1539, thereby allowing the processed surface of the workpiece 101 to be successively ground along a predetermined grinding path.

It should be noted that this embodiment is not necessarily limitative to the above-described arrangement and load sensors may be employed as detectors in place of the above-described differential transformers and arranged such as to be able to detect actuating force acting thereon through an operating member.

As has been described above in detail, in this embodiment, by moving a grindstone directly in the X- and Y-direction with an operating member through a support member, movement signals corresponding to these directions can be generated, so that the operability is excellent and the apparatus can be handled considerably easily, advantageously.

A fifteenth embodiment in which the present invention is embodied in a teaching device which is arranged such that a grindstone of a die polishing machine is moved along a processed surface of a workpiece and the grindstone moving path is stored in memory will next be described in detail with reference to FIGS. 62 to 66 and in comparison with the first embodiment. A body 1645 of a teaching device 1643 consists of a substantially box-shaped case 1646 the front side of which is open, and a front panel 1647 which is attached to the front side of the case 1646. A mounting frame 1648 in the shape of a square frame is formed inside the front panel 1647 so as to project. An oscillating member 1649 having a substantially semi circular shape in plan view is oscillatably supported between the left and right side walls of the mounting frame 1648 through a pair of pins 1650 and 1651 which are rotatable together with the oscillating member 1649 in one unit, and an engagement groove 1649a is formed in the inner peripheral surface of the oscillating member 1649. A rotary shaft 1652 is rotatably supported between the upper and lower side walls of the mounting frame 1648 through a pair of pins 1653 and 1654 which are rotatable together with the shaft 1652 in one unit, and a vertically extending slot 1652a is formed in the central portion of the rotary shaft 1652.

An operating lever 1655 which serves as an operating member is received at its lower portion into the slot 1652a of the rotary shaft 1652 and supported by a pin 1656 in such a manner that the lever 1655 is vertically pivotal relative to the shaft 1652. The operating lever 1655 is provided with an engagement pin 1655a which is engaged with the engagement groove 1649a of the oscillating member 1649, the pin 1655a projecting from the lower end of the lever 1655, and an operating knob 1655b is provided at the upper end of the lever 1655. The front panel 1647 is formed with a through-hole 1657 for limiting the angle of pivoting of the operating lever 1655. A bellows member 1658 made from a rubber which is formed in a substantially planar shape so that it is readily produced and is deformable with small force is provided between the operating lever 1655 and the front panel 1647 so as to cover the through-hole 1657.

Figure 62:
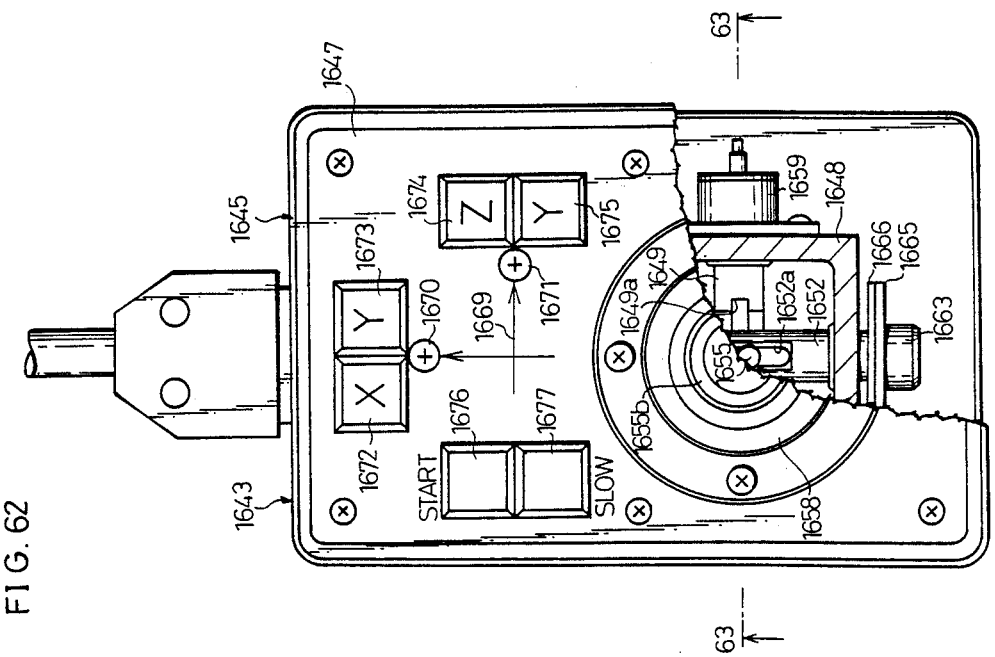
FIG. 62 is a partially-sectioned front view of a fifteenth embodiment of the present invention.

When the operating lever 1655 is pivoted vertically as viewed in FIG. 62, the oscillating member 1649, together with the pins 1650 and 1651 in one unit, is oscillated in the same direction through the engagement between the engagement pin 1655a and the engagement groove 1649a. When the operating lever 1655 is pivoted horizontally as viewed in FIG. 62, the rotary shaft 1652, together with the pins 1653 and 1654 in one unit, is rotated in the same direction through the slot 1652a. Accordingly, the operating lever 1655 can be pivoted as desired in any direction from the upright position shown in FIGS. 63 and 64, i.e., vertically, horizontally or composite directions of the vertical and horizontal directions.

Figure 63:
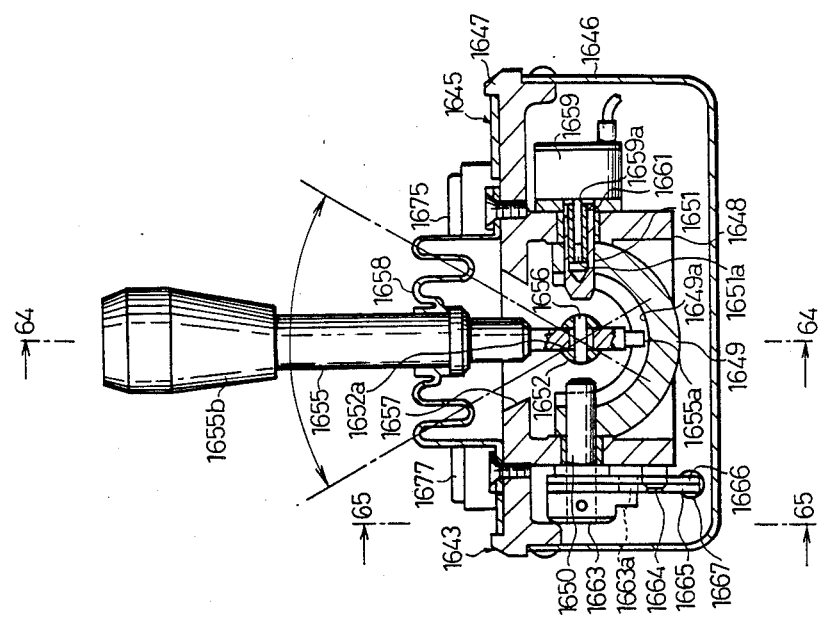
FIG. 63 is a sectional view taken along the line 63—63 of FIG. 62.
Figure 64:
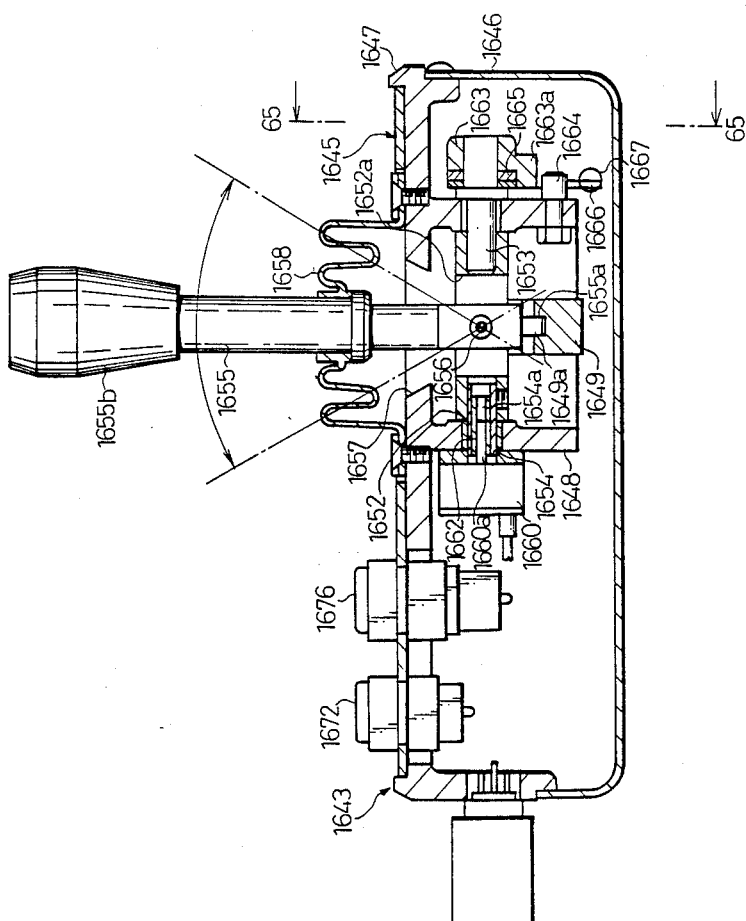
FIG. 64 is a sectional view taken along the line 64—64 of FIG. 63.

As shown in FIGS. 63 and 64, first and second encoders 1659 and 1660 are attached to the respective outer surfaces of the right and upper walls of the mounting frame 1648, and actuating shafts 1659a and 1660a of the encoders 1659 and 1660 are disposed so as to extend into the above-described pins 1651 and 1654 each of which is formed in the shape of a tube. Connecting shaft portions 1651a and 1652a are provided inside the pins 1651 and 1654, respectively, and are connected to the actuating shafts 1659a and 1660a through rubber tubes 1661 and 1662, respectively. The tubes 1661 and 1662 enable a considerable reduction in size of the shaft connecting arrangement at these portions. When the pins 1651 and 1654 are rotated through the oscillating member 1649 or the rotary shaft 1652 in response to the turning of the operating lever 1655, the encoders 1659 and 1660 are activated through the connecting shaft portions 1651a, 1654a and the actuating shafts 1659a, 1660a. Thus, signals for driving the motors 19, 25 and 40 (see FIG. 66) for moving the moving members in the X-, Y- and Z- directions are output from these encoders 1659 and 1660.

Figure 65:
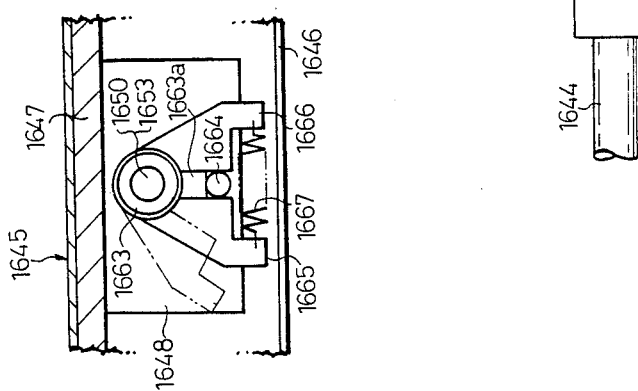
FIG. 65 is a sectional view taken along the line 65—65 of FIGS. 63 and 64.

As shown in FIGS. 63 to 65, tubular members 1663 are fitted and secured to the respective distal ends of the other pins 1650 and 1653 for the oscillating member 1649 and the rotary shaft 1652, and a projection 1663a is formed on the outer periphery of each of the tubular members 1663. A restraining pin 1664 projects from the outer surface of the mounting frame 1648 so as to face each projection 1663a. A pair of clamping arms 1665 and 1666 are pivotally supported at the proximal end of each of the pins 1650 and 1653 and between the corresponding tubular member 1663 and the outer surface of the mounting frame 1648, and a tension spring 1667 is stretched between the respective distal ends of the arms 1665 and 1666. As shown in FIG. 65, these clamping arms 1665 and 1666 are normally disposed at a neutral position wherein they clamp the restraining pin 1664 and the projection 1663a from both sides by the action of the tension spring 1667, whereby the oscillating member 1649 and the rotary shaft 1652 are maintained in their original positions shown in FIGS. 63 and 64, thereby allowing the operating lever 1655 to be maintained in the upright position.

As shown in FIG. 62, on the outer surface of the front panel 1647 are provided a pair of arrows 1668 and 1669 for indicating the directions in which the operating lever 1655 may be actuated, i.e., the vertical direction and the horizontal direction which intersects said direction at right angles, and plus indicators 1670 and 1671 for indicating the plus directions in correspondence with the arrows 1668 and 1669, respectively. First and second indicating members 1672 and 1673 are provided on the outer surface of the front panel 1647 and in the vicinity of the indicator 1670 for indicating the vertical actuating direction, and signs X and Y which represent two directions among directions of movement of the grindstone which defines a moving member are put to the respective surfaces of the first and second indicating members 1672 and 1673. Third and fourth indicating members 1674 and 1675 are provided on the outer surface of the front panel 1647 and in the vicinity of the indicator 1671 for indicating the horizontal actuating direction, and signs one of which indicates the remaining one direction among the grindstone moving directions, i.e., Z, and the same direction as either one of said two directions, i.e., Y, are put to the respective surfaces of the third and fourth indicating members 1674 and 1675.

When directions of movement of the grindstone are selected and set by actuating the switches and the like on a control board 1641 (see FIG. 66) which is installed on the body of the grinding apparatus, the indicating members 1672 to 1675 which designate directions of operation of the operating lever 1655 on the teaching device 1643 which are different from each other are selectively turned on for indication. More specifically, when the X-Y directions are selected and set as directions of movement of the grindstone, the first and fourth indicating members 1672 and 1675 are turned on; when the Y-Z directions are selected and set, the second and third indicating members 1673 and 1674 are turned on; and when the X-Z directions are selected and set, the first and third indicating members 1672 and 1674 are turned on.

Figure 66:
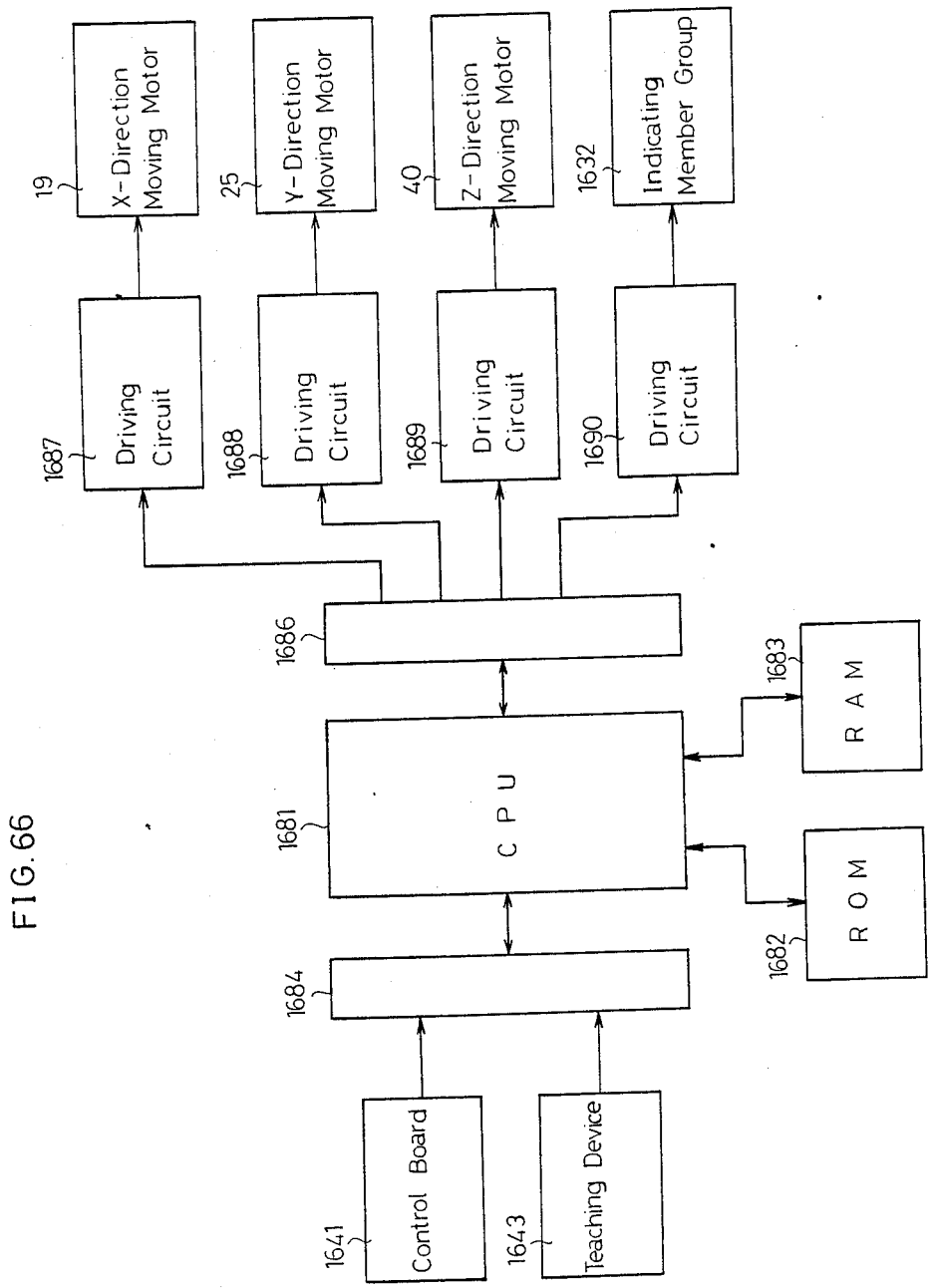
FIG. 66 is a block diagram of a control circuit.

The front panel 1674 is further provided on its outer surface with a start switch 1676 for starting a teaching operation and a slowdown switch 1677 for lowering the speed of movement of the grindstone A control circuit for controlling the grinding apparatus which includes the teaching device 1643 arranged as described above will next be explained with reference to FIG. 66. To a central processing unit (CPU) 1681 which defines a control means are connected a read-only memory (ROM) 1682 and a random-access memory (RAM) 1683 which defines a memory means. The ROM 1682 is adapted to store a program or the like for controlling the operation of the whole of the grinding apparatus. The RAM 1683 is adapted to store moving path data or the like for the grindstone which is input from the teaching device 1643 in the teaching step.

The control board 1641 and the teaching device 1643 are connected to the CPU 1681 through an input interface 1684 so that various signals delivered therefrom are input to the CPU 1681. To the CPU 1681 are further connected through an output interface 1686 and driving circuits 1687 to 1690 the motors 19, 25 and 40 for moving the grindstone in the X-, Y- and Z-directions and then the indicating member group 1632 which consists of the indicating members 1672 to 1675 on the teaching device 1643 so that driving and stop signals are output thereto from the CPU 1681.

The operation of the apparatus arranged as described above will next be explained.

To carry out teaching of a moving path of the grindstone, the teaching mode is selected using the mode selecting switch on the control board 1641, and any of the three combinations of directions, i.e., the X-Y directions, the Y-Z directions and the X-Z directions, is selected and set as directions of movement of the grindstone by actuating the direction selecting switch. In consequence, one of the combinations of indicating members on the teaching device 1643, i.e., the first and fourth indicating members 1672, 1675, the second and third indicating members 1673, 1674, and the first and third indicating members 1672, 1674, is selectively turned on.

When the operating lever 1655 is pivoted so as to tilt in any direction in accordance with the indication by the indicating members 1672 to 1675, detection signals are output from the first and second encoders 1659 and 1660 to the CPU 1681 in accordance with the direction and amount of pivoting of the lever 1655. On the basis of the detection signals, driving signals are output from the CPU 1681 to the corresponding X-, Y- and Z-direction moving motors 19, 25 and 40. Thus, the grindstone is moved in a desired direction and in a predetermined amount by the operation of the motors 19, 25 and 40, and an equivalent signal is output from the CPU 1681 to the RAM 1683 and stored therein as moving path data. Accordingly, it is possible to readily store moving path data in relation to each direction by pivoting the operating lever 1655 so as to tilt in accordance with the indication by the indicating members 1672 to 1675 while confirming the position of movement of the grindstone. Thereafter, when the machining mode is selected by actuating the mode selecting switch on the control board 1641, the moving path data is successively read out from the RAM 1683 to the CPU 1681, and driving signals are output to the motors 9, 25 and 40 for movement in the X-, Y- and Z-directions on the basis of the read data. Thus, the grindstone is moved in the X-Y directions, the Y-Z directions or the X-Z directions by the drive of the motors 9, 25 and 40.

As has been described above in detail, it is possible according to this embodiment to clearly designate directions in which the operating member may be actuated by means of a reduced number of indicating members, and the operability can therefore be improved.

A sixteenth embodiment of the present invention will next be described with reference to FIGS. 67 to 69.

Figure 69:
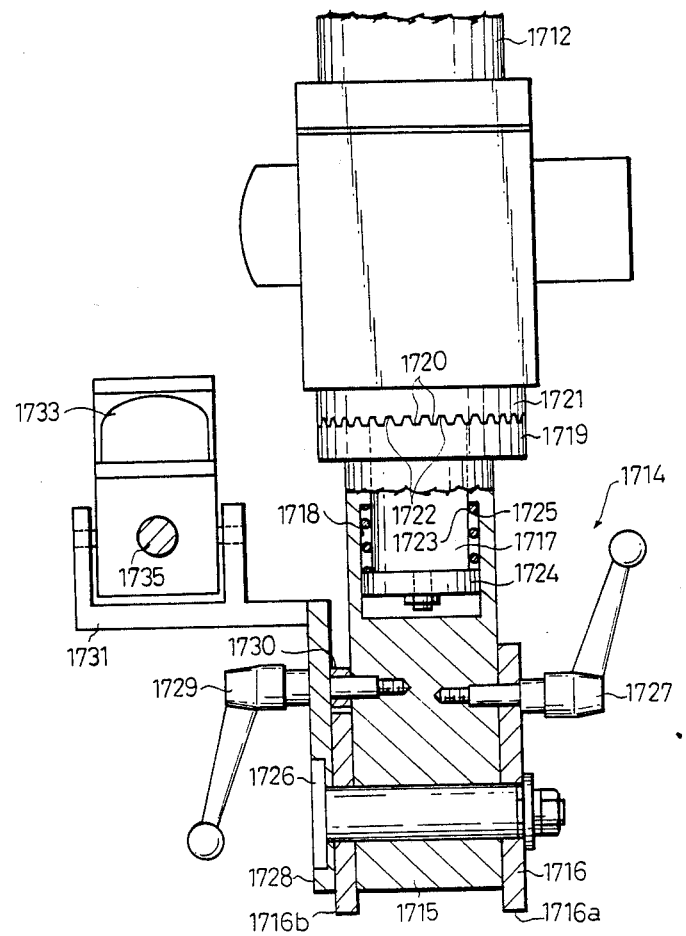
FIG. 69 is a sectional side view.

As shown in FIG. 69, a head block 1715 has a shaft bore 1718 for receiving a mounting shaft 1717, and the head block 1715 is provided on its upper end portion with a clutch plate 1719 having engagement portions 1720 formed at a predetermined pitch. The above-described Z-direction moving shaft 1712 is provided at its lower end portion with a clutch plate 1721 having engagement portions 1722 formed at a predetermined pitch. Thus, the wheel head 1714 is restrained from rotating about the mounting shaft 1717 by the engagement between the clutch plates 1719 and 1721. Further, a retaining step portion 1723 is formed in the shaft bore 1718, and a compression spring 1725 is interposed between the retaining step portion 1723 and a slide plate 1724 which is rigidly secured to the lower end of the mounting shaft 1717. The compression spring 1725 is adapted to bias the wheel head 1714 upward (toward the Z-direction moving shaft 1712) at all times, thereby maintaining the clutch plates 1719 and 1721 in their engaged state. The wheel head 1714 is clamped, pulled downward, rotated by a predetermined angle, and then released from the clamping. In consequence, the wheel head 1714 is moved upward by means of the biasing force from the compression spring 1725, causing the clutch plates 1719 and 1721 to engage with each other. Thus, it is possible to readily effect adjustment of the angle at which the wheel head 1714 is mounted with respect to the Z-direction moving shaft 1712.

An air cylinder 1738 is rigidly secured to a guide member 1737, and a rail 1739 is incorporated in the guide member 1737. A mounting frame 1741 is slidably provided on this rail 1739 through a slider 1740, and a piston rod 1742 (shown in FIG. 67) of the cylinder 1738 is fixedly connected to the mounting frame 1741. Thus, the mounting frame 1741 is moved in response to projection and withdrawal of the piston rod 1742.

Figure 67:
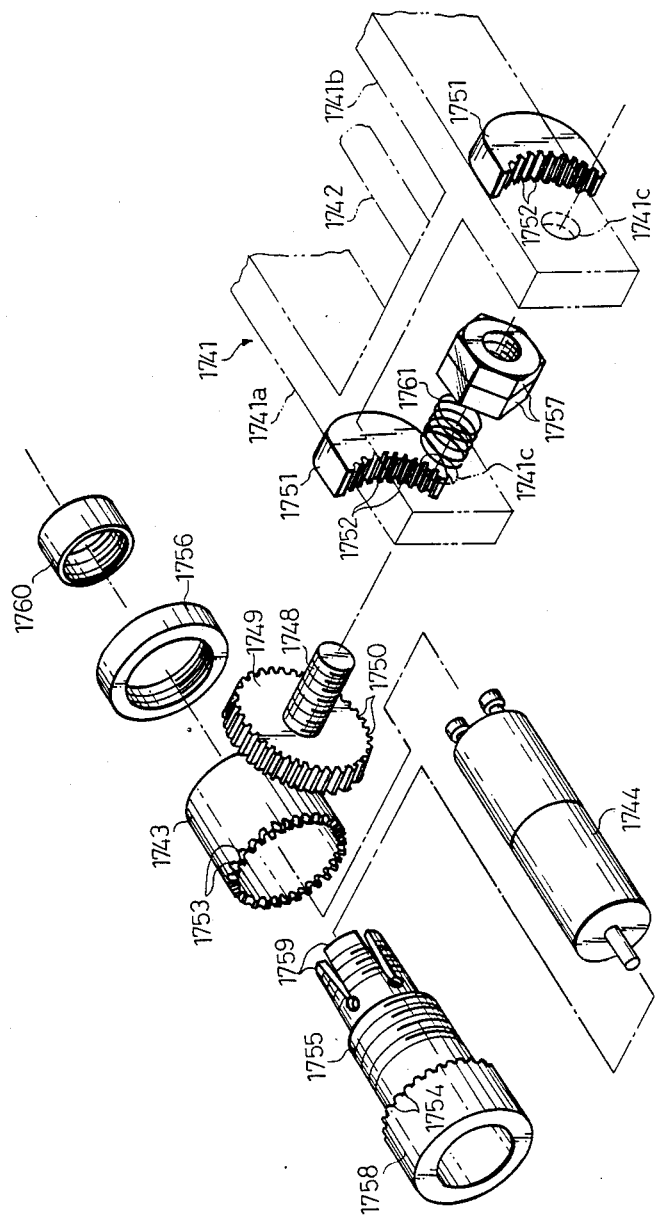
FIG. 67 is an exploded perspective view of a sixteenth embodiment of the present invention.
Figure 68:
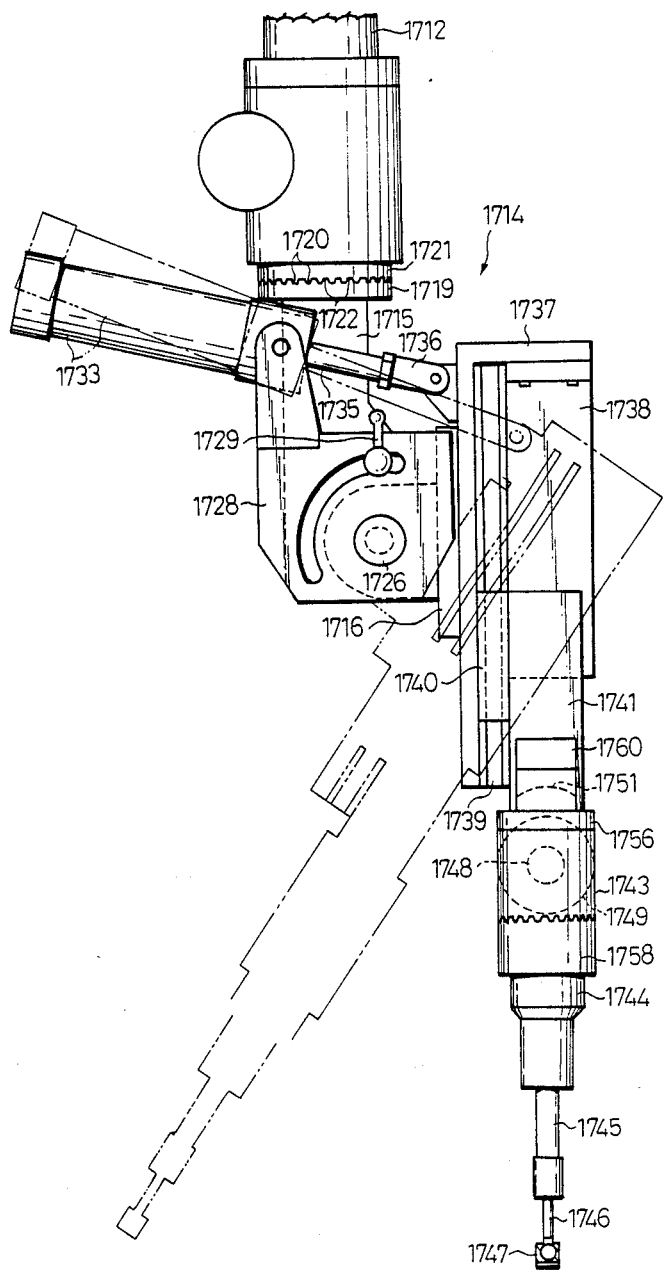
FIG. 68 is a front view of a wheel head.

As shown in FIG. 67, an air motor 1744 is detachably mounted on the mounting frame 1741 through a tubular mounting member 1743. A grindstone 1747 is rotatably attached through a mounting shaft 1746 to a driving shaft 1745 of the air motor 1744. The air motor 1744 is inserted into a tubular chuck member 1758 having a plurality of clamping pieces 1759 formed at its rear end, and rigidly secured to the chuck member 1758 by means of the clamping pieces 1759 by screwing a clamping ring 1760 thereonto. In this embodiment, the mounting member 1743, the air motor 1744, the chuck member 1758 and the clamping ring 1760 constitute in combination a drive means. A mounting bolt 1748 which is inserted into insertion bores 1741c provided in the mounting frame 1741 is provided on the mounting member 1743 so as to project from one side thereof. A double nut 1757 is in thread engagement with the end portion of the mounting bolt 1748. A compression spring 1761 is interposed between the nut 1757 and a frame piece 1741a of the mounting frame 1741 to constantly bias the mounting member 1743 in a direction in which it is brought into contact with the mounting frame 1741.

A mounting angle adjusting member 1749 formed in the shape of a circle in front view which has its center at the central axis of the mounting bolt 1748 is rigidly secured to the proximal end portion of the bolt 1748. First engagement portions 1750 are formed along the outer peripheral surface of the adjusting member 1749 at a predetermined pitch. Further, engagement portions 1753 are formed along the front end face of the mounting member 1743 at a predetermined pitch.

On the other hand, a retaining member 1751 which has a concave shape so as to be conformable with the mounting angle adjusting member 1749 and which is formed with second engagement portions 1752 engageable with the first engagement portions 1750 is rigidly secured to the outside of each of the left and right frame pieces 1741a and 1741b of the mounting frame 1741 so that the air motor 1744 can readily and reliably be retained at a desired angle position.

The chuck member 1758 has engagement portions 1754 formed at the rear end of its large-diameter portion, the engagement portions 1754 being engageable with the engagement portions 1753 formed along the front end face of the mounting member 1743, and the chuck member 1758 has an external thread portion 1755 formed on its rear end portion. The chuck member 1758 has its body portion inserted into the mounting member 1743, and the mounting ring 1756 having an internal thread is screwed onto the external thread portion 1755 projecting from the mounting member 1743, thereby enabling the chuck member 1758 to be reliably secured to the mounting member 1743 by the engagement between the engagement portions 1753 and 1754.

When a processed surface of a workpiece 101 is to be ground using the grinding apparatus arranged as described above, the clamping lever 1727 is untightened to allow the bracket 1716 to be able to pivot. In addition, the mounting plate 1728 is clamped by means of the clamping lever 1729, and the pair of air cylinders 1733 and 1738 are then activated. In consequence, the grindstone 1747 is pressed against the processed surface of the workpiece 101 with a predetermined pressure.

In this state, the air motor 1744 is started to rotate the grindstone 1747, and the grindstone 1714 is also moved vertically, laterally or longitudinally. Thus, the processed surface is ground over a predetermined width.

To change the mounting angle of the air motor 1744, with the mounting member 1743 held, the air motor 1744 is, together with the mounting member 1743, is moved leftward as viewed in FIG. 67 against the biasing force from the compression spring 1761, thereby disengaging the mounting angle adjusting member 1749 from the retaining member 1751. Thereafter, the air motor 1744 is pivoted through a desired angle about the mounting bolt 1748 in order to adjust the position thereof. When the mounting member 1743 is released from the hold at the adjusted position, the mounting angle adjusting member 1749 and the retaining member 1751 are engaged with each other by the action of the compression spring 1761, and the air motor 1744 is thereby reliably retained at the adjusted angular position.

Further, it is possible to secure the air motor 1744 readily and reliably without any fear of the body portion of the air motor 1744 being deformed as in the case of an ordinary mounting structure in which the body portion is clamped diametrically. In addition, the air motor 1744 can be secured without the need to take into consideration the portion of the air motor which is to be clamped.

It should be noted that this embodiment may also be carried out as follows:

(1) The mounting member 1743 is omitted, and the mounting angle adjusting member 1749 and the mounting bolt 1748 are formed on one side of the outer portion of the chuck member 1758 or the air motor 1744, thereby providing the air motor 1744 on the mounting frame 1741 so that the mounting angle of the air motor 1744 is adjustable.

(2) The circular mounting angle adjusting member 1749 is partially cut.

(3) Only one first engagement portion 1750 is formed on the mounting angle adjusting member 1749, while a plurality of second engagement portions 1752 are formed on the retaining member 1751 at a predetermined pitch. Conversely, only one second engagement portion 1752 is formed on the retaining member 1751, while a plurality of first engagement portions 1750 are formed on the mounting angle adjusting member 1749 at a predetermined pitch.

A seventeenth embodiment of the present invention will next be described with reference to FIGS. 70 and 71.

Figure 70:
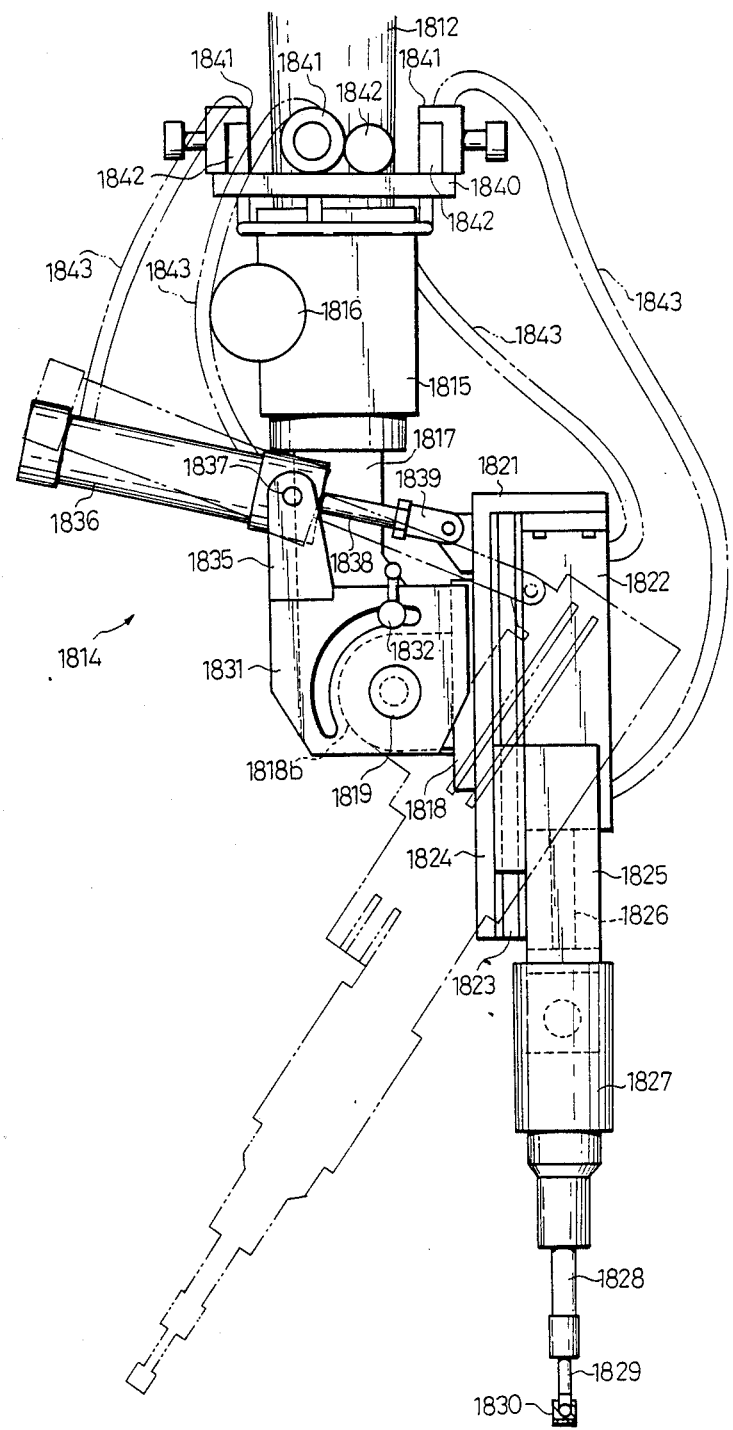
FIG. 70 is a front view of a wheel head in accordance with a seventeenth embodiment of the present invention.
Figure 71:
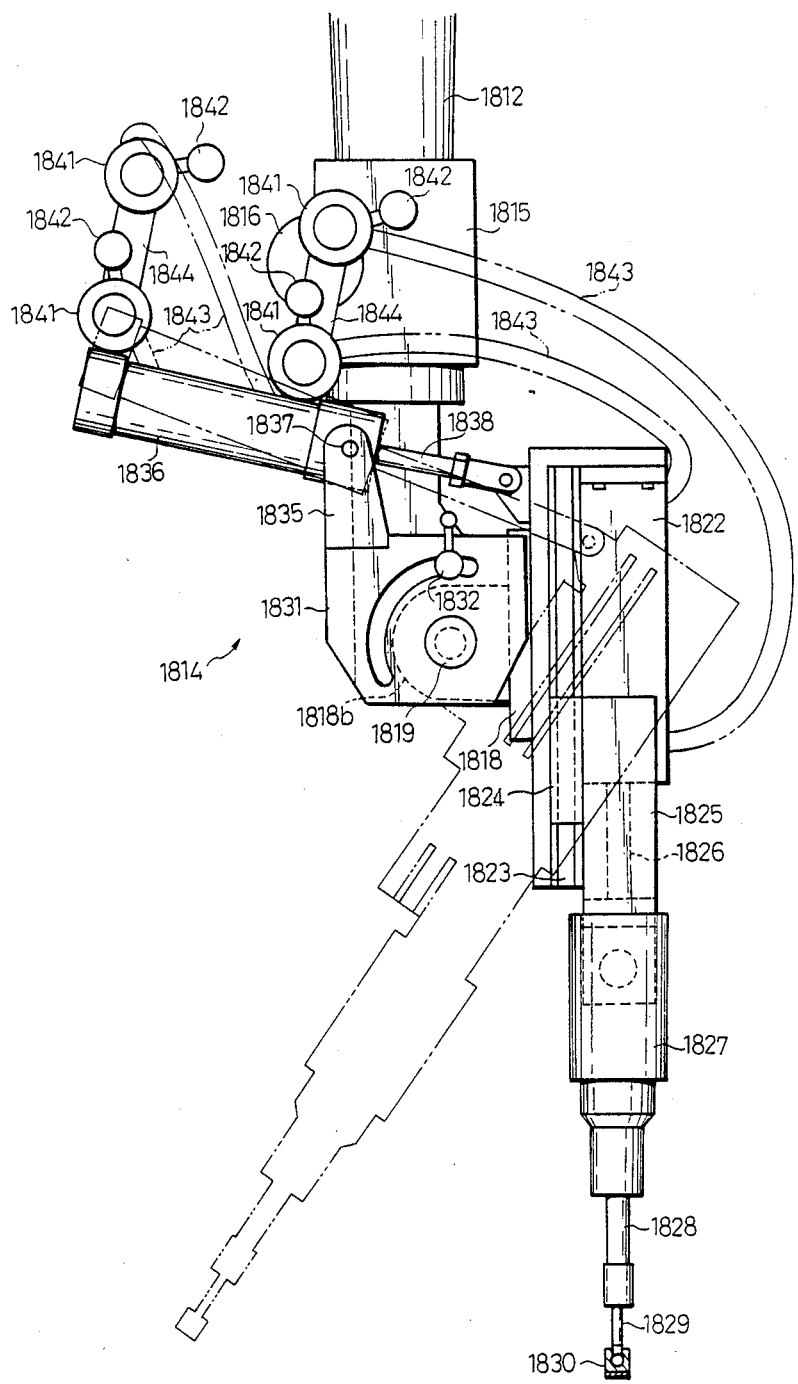
FIG. 71 is a front view of another example.

As shown in FIG. 70, a mounting ring 1840 is rotatably supported on the Z direction moving shaft 1812 so as to be positioned above the driving mechanism section 1815, and pressure regulating mechanisms each consisting of a pressure regulating valve 1841 and a pressure gage 1842 are respectively mounted at four positions (only three of them are illustrated) on the upper surface of the mounting ring 1840. Air is supplied to the above-described first and second air cylinders 1822 and 1836 through flexible air supply tube 1843. The mounting ring 1840 is freely rotatable in response to the rotation of the wheel head 1814 caused by the operation of the driving mechanism section 1815.

When a processed surface of a workpiece is to be ground using the grinding apparatus arranged as described above, the clamping lever 1820 is untightened to allow the bracket 1818 to be pivoted, and the mounting plate 1831 is clamped by means of the clamping lever 1882. Then, the pressure regulating valves 1841 are controlled to activate the first and second air cylinders 1822 and 1836. In consequence, the grindstone 1830 is pressed against the processed surface of the workpiece with a predetermined pressure.

In this state, the air motor 1827 is started to rotate the grindstone 1830. In addition, the wheel head 1814 is moved vertically, laterally or longitudinally, and the wheel head 1814 is further rotated around the Z-direction moving shaft 1812. Thus, the grindstone 1830 is smoothly moved while following changes in configuration of the processed surface. Accordingly, it is possible to grind the processed surface uniformly and highly accurately without any unevenness of grinding, that is, without any fear of a recess in the processed surface being insufficiently ground and without any fear of a projection on the processed surface being excessively ground.

During this grinding operation, the wheel head 1814 is in its lowered position, and the pressure regulating mechanisms are disposed at a position where the operator can readily actuate them. Accordingly, the operator can readily and accurately adjust the amount of air supplied to the first and second air cylinders 1822 and 1836.

In addition, the mounting ring 1840 provided with the pressure regulating mechanisms is freely rotatable in response to the rotation of the wheel head 1814 caused by the operation of the driving mechanism section 1815, and there is therefore substantially no change in the relative position of the first and second air cylinders 1822 1836 on the one hand and the pressure regulating mechanisms on the other. Accordingly, there is almost no fear of the joint of each air supply tube 1843 or the like being cracked.

It should be noted that this embodiment may be embodied in grinding apparatus having arrangements different from the above. For example, as shown in FIG. 71, a pair of mounting plates 1853 are provided on the second air cylinder 1836, and the pressure regulating mechanisms each consisting of a pressure regulating valve 1841 and a pressure gage 1842 are provided on the pair of mounting plates 1853, or each of the air cylinders 1822 and 1836 is provided with a pair of pressure regulating mechanisms, or an air cylinder for sliding the wheel head 1814 is provided between the Z-direction moving shaft 1812 and the wheel head 1814.

Figure 72:
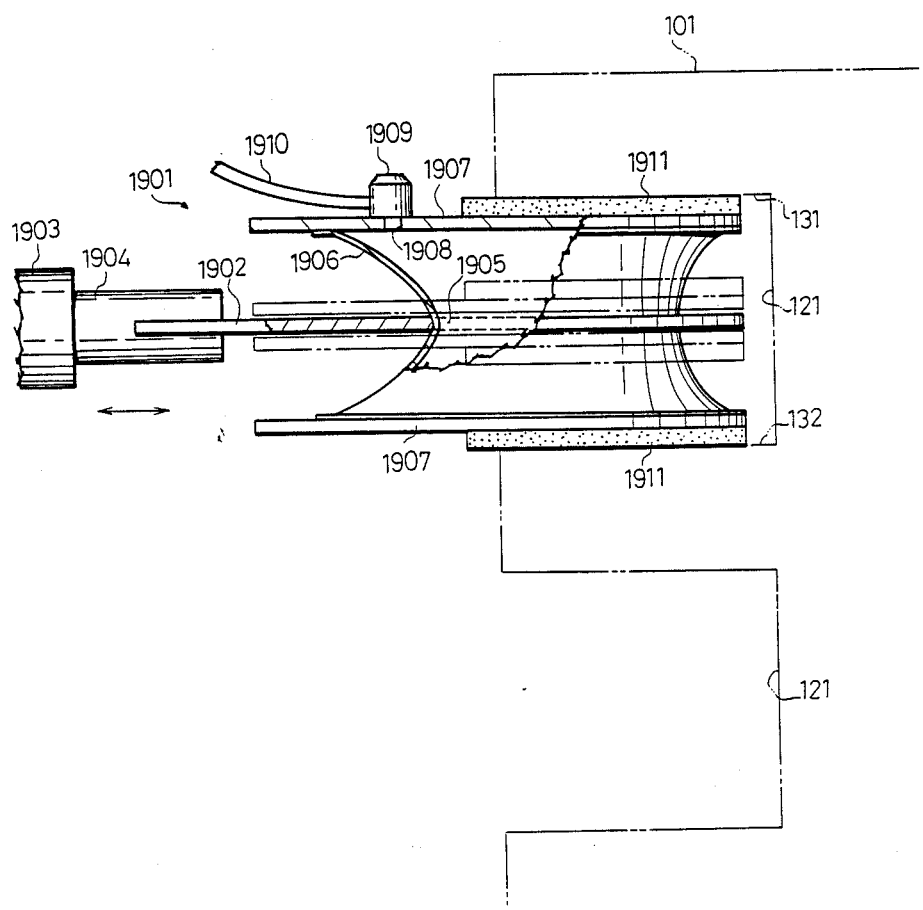
FIG. 72 is a partially-sectioned front view of an inner wall grinding tool in accordance with an eighteenth embodiment of the present invention.

An eighteenth embodiment in which the present invention is embodied in an inner wall grinding tool will next be described with reference to FIG. 72.

An inner wall grinding tool 1901 in accordance with this embodiment has a base member 1902 which is formed from a metal plate into a rectangular shape. The base member 1902 is secured at one end thereof to an output shaft 1904 of an oscillation generator 1903 which is defined by an air motor or the like. The oscillation generator 1903 is attached to the wheel head of the grinding apparatus, and as the wheel head moves, the base member 1902 is inserted into a recess 121 in the workpiece 101.

A rubber membrane 1906 which serves as an actuating member is rigidly secured through a through-hole 1905 provided in the base member 1902 in such a manner that the membrane 1906 projects from both side surfaces of the base member 1902. A pair of grindstone support plates 1907 each formed from a metal plate into a rectangular shape are bonded to the open edges, respectively, of the rubber membrane 1906 in such a manner that the support plates 1907 sandwich the base member 1902 in parallel relation to each other. Thus, the inside of the rubber membrane 1906 is hermetically sealed with these members.

On the other hand, a small bore 1908 provided in one grindstone support plate 1907 is connected to an air supply source serving as a drive source through a cap 1909 and a pipe 1910. When air is supplied, the rubber membrane 1906 is expanded in two directions perpendicular to the axis of insertion of the base member 1902 and the grindstone support plate 1907 are disposed at respective projecting positions separated from the base member 1902 as shown by the solid line in FIG. 72. When the supply of air is suspended, the rubber membrane 1906 contracts by virtue of its own elasticity, thus causing the grindstone support plates 1907 to be disposed in contact with both sides of the base member 1902 as shown by the two-dot chain line in the figure.

Paper grindstones 1911 for grinding the inner wall surfaces 131 and 132 of the recess 121 are rigidly secured to the respective outer surfaces of the grindstone support plates 1907 so that the paper grindstones 1911 face in the directions of expansion of the rubber membrane 1906. Thus, when the grindstone support plates 1907 are disposed at their respective projecting positions when the rubber membrane 1906 is expanded, the paper grindstones 1911 are simultaneously pressed against the inner wall surfaces 131 and 132, respectively, whereas, when the rubber membrane 1906 is contracted, the paper grindstones 1911 are separated therefrom. Accordingly, when the oscillation generator 1903 is started when the rubber membrane 1906 is in the expanded state, the inner wall surfaces 131 and 132 can simultaneously be ground under pressure by the respective paper grindstones 1911. Further, when the wheel head is moved when the rubber membrane 1906 is in its contracted state, the paper grindstones 1911 can readily be inserted into and removed from the recess 121.

Since in this embodiment the paper grindstones 1911 are supported on the base member 1902 through the respective grindstone support plates 1902 which are parallel to the base member 1902, together with the rubber membrane 1906, the paper grindstones 1911 can be brought into close contact with the inner wall surfaces 131 and 132 with pressing force which is uniformly applied thereto, so that it is possible to carry out the grinding operation readily and highly accurately without any fear of the inner wall surfaces 131 and 132 being unevenly ground.

Further, since in this embodiment the flat plate-shaped base member 1902, the grindstone support plates 1907 and the paper grindstones 1911 are used, the thickness of the inner wall grinding tool 1901 can be reduced, and therefore the grinding tool 1901 can be inserted into and removed from a narrow recess 121 in the workpiece 101 without any hindrance.

Further, the inner wall grinding tool 1901 in accordance with this embodiment is arranged such that the grindstone support plates 1907 are supported on the base member 1902 through the rubber membrane 1906. Therefore, even in the case of grinding a tapered recess which is narrower at the opening side than at the inner end side, the paper grindstones 1911 can be brought into close contact with the slanted inner wall surfaces with a uniform pressure.

It should be noted that this embodiment may also be arrangement such that an actuating member such as a spring or a solenoid is employed in place of the above-described rubber membrane 1906, or a plurality of grindstones are mounted around a bar-shaped base member through a rubber membrane, thereby enabling the inner wall surfaces of a cylindrical workpiece to be ground.

As has been described above in detail, it is possible according to this embodiment to simultaneously grind a plurality of inner wall surfaces of a workpiece in a single step without any need to change the position of the grindstone and thereby improve the operating efficiency, advantageously.

A nineteenth embodiment in which the present invention is embodied in a die polishing machine will next be explained with reference to FIGS. 73 to 78.

A frame 1 of the die polishing machine is provided with an X-moving member 2 in such a manner that the member 2 is laterally movable by means of an X-motor 3 which serves as a first drive means, and a Y-moving member 4 is supported on the X-moving member 2 in such a manner that the member 4 is longitudinally movable by means of a Y-motor 5 which serves as a second drive means. A Z-moving member 6 is mounted on the Y-moving member 4 in such a manner that the member 6 is vertically movable by means of a Z motor 7 which serves as a third drive means, and a wheel head 2008 is attached to the lower end of the Z-moving member 6. The wheel head 2008 has a fixed bracket 2009 and a pivoting base 2010. A grindstone driving motor 2011 is mounted on the pivoting base 2010. The grindstone driving motor 2011 has an attachment 2012 which transmits the rotation of the motor 2011 as it is or after converting it into oscillation. A grindstone 2013 which is employed to grind a ribbed workpiece 101 that has a plurality of recessed grinding blocks 141 to 145 is rigidly secured to the output shaft of the attachment 2012. The grindstone 2013 is oscillated horizontally as viewed in FIG. 73 through the attachment 2012 by the rotation of the grindstone driving motor 2011 at a position corresponding to each of the grinding blocks 141 to 145 of the workpiece 101.

Figure 73:
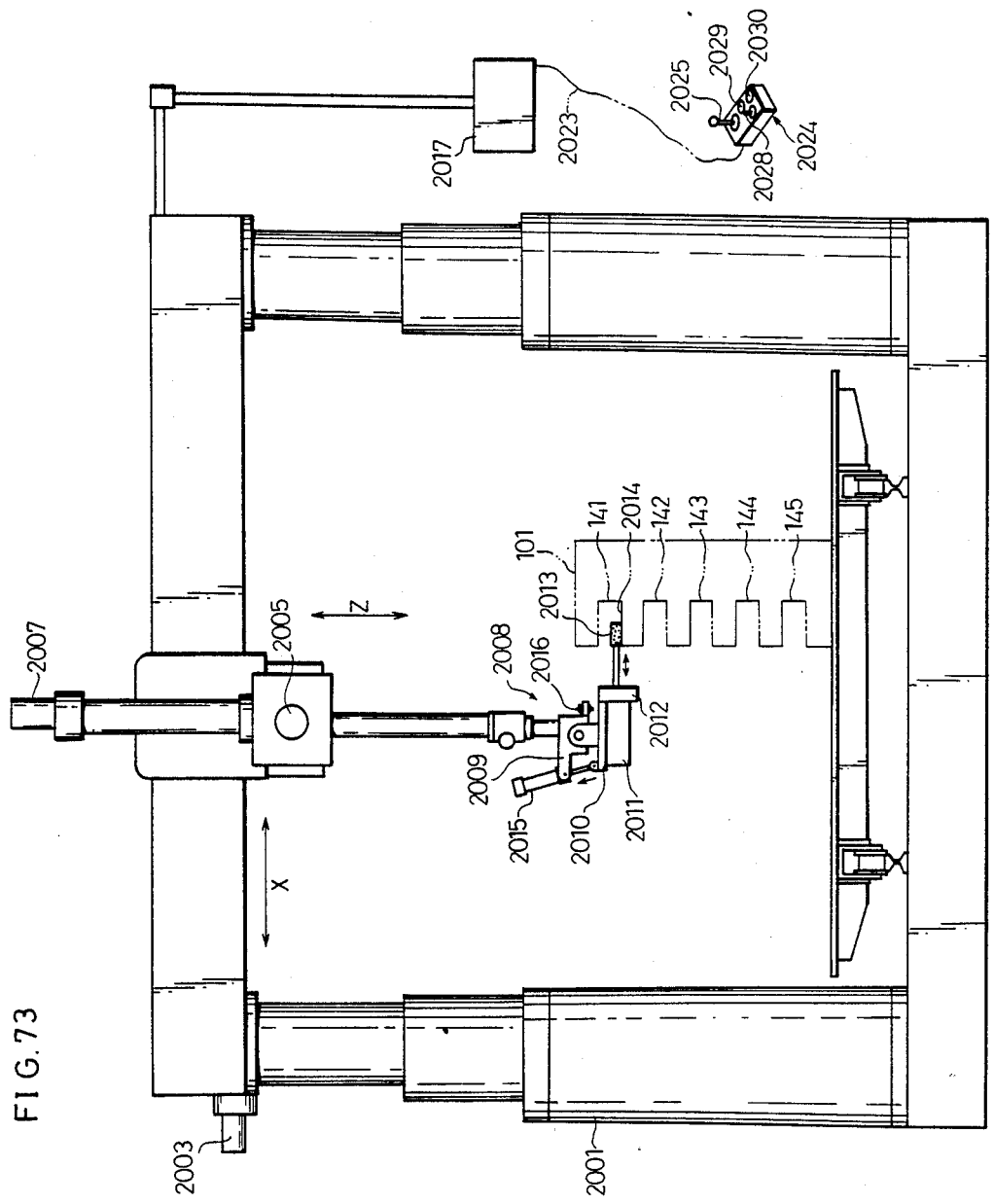
FIG. 73 is a front view of a grinding apparatus according to a nineteenth embodiment of the present invention.
Figure 74:
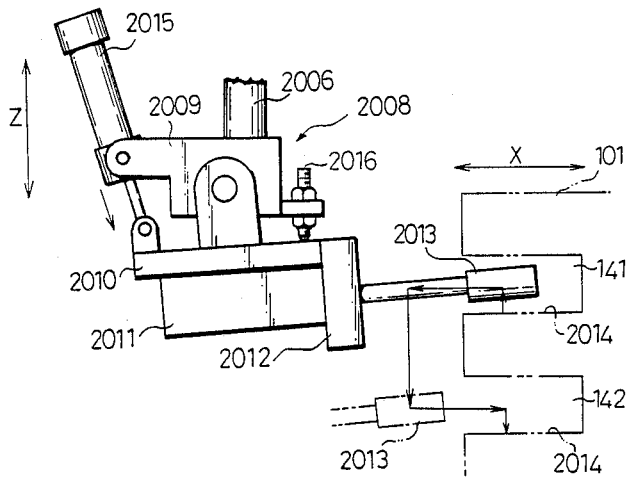
FIG. 74 is an enlarged front view of the wheel head portion.

As shown in FIGS. 73 and 74, a pressure cylinder 2015 is installed between the fixed bracket 2009 and the pivoting base 2010, the cylinder 2015 being adapted to pivot the pivoting base 2010 within a vertical plane to thereby cause the grindstone 2013 to be pressed against and separated from the X-Y processed surface 2014 of each of the grinding blocks 141 to 145. The fixed bracket 2009 is provided with a stop screw 2016 in such a manner that it is possible to effect positional adjustment. As shown in FIG. 74, when the pressure cylinder 2015 is projected, the screw 2016 engages with the pivoting base 2010, thereby maintaining the grindstone 2013 at an intermediate position in the Z-direction (the vertical direction as viewed in the figure) within the grinding block 141. Accordingly, when the grinding block 141 is exchanged for another by the movement of the wheel head 2008 in the Z-direction, the grindstone 2013 can enter the next grinding block 142 without colliding with the workpiece 101.

Figure 76:
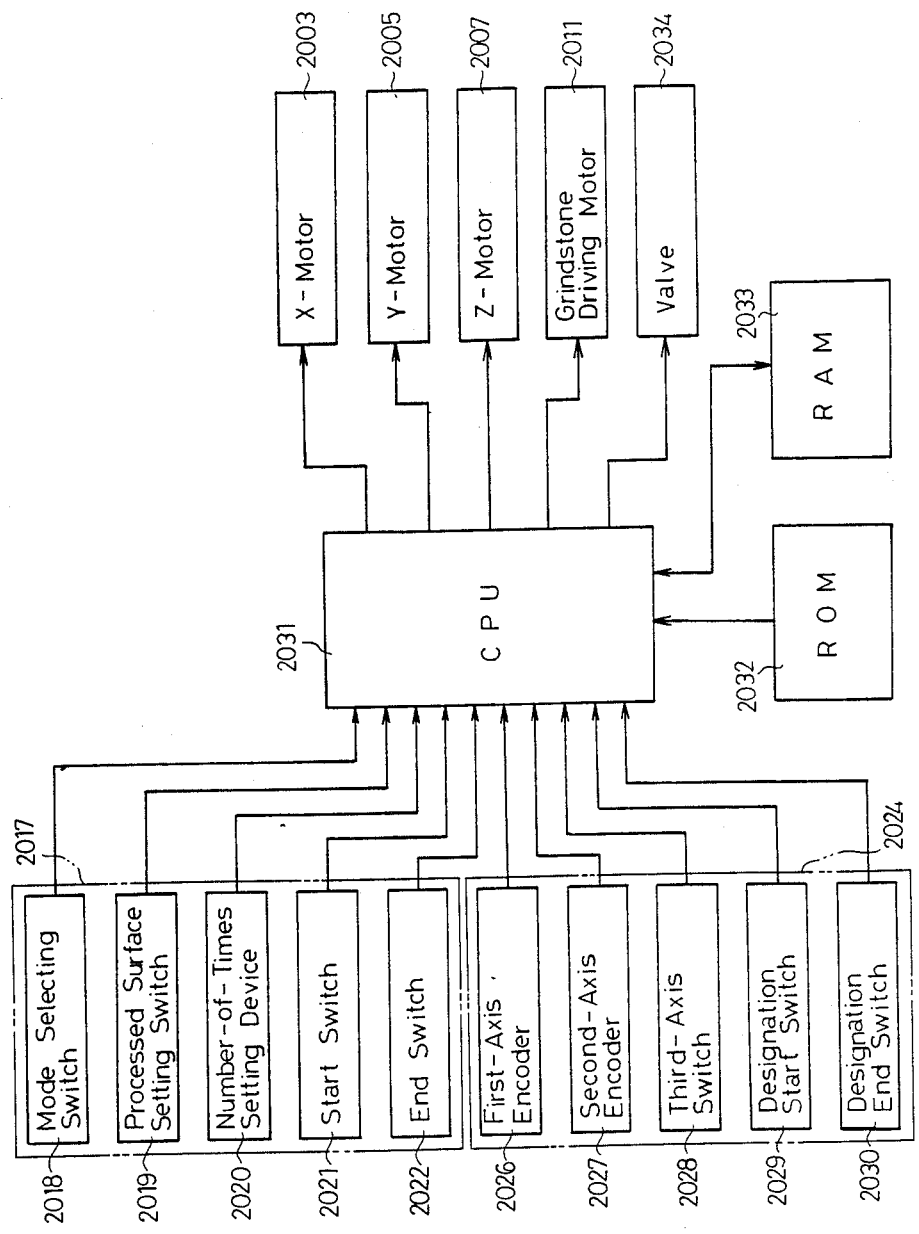
FIG. 76 is a block diagram schematically showing a control circuit.

A control board 2017 is attached to the frame 2001. On the control board 2017 are, as shown in FIG. 76, disposed input switches such as a mode selecting switch 2018 for selecting one of the manual grinding mode, the teaching mode and the playback mode, a processed surface setting switch 2019 for selecting two directions from the X-, Y- and Z-directions to thereby set a processed surface of the workpiece 101, a number-of-times setting device 2020 (this may be replaced with a moving time setting device) for setting the number of times of movement of the grindstone 2013 required in the playback step, a start switch 2021 for starting the teaching or playback step, and an end switch 2022 for finishing each of the steps.

As shown in FIG. 73, a portable and remote-controllable teaching device 2024 is connected to the control board 2017 through a cable 2023. This device 2024 has an operating lever 2025 which is tiltable within the range of 360°. Direction and amount of tilting of the operating lever 2025 are detected by means of a composite signal consisting of signals respectively output from a first-axis encoder 2026 and a second-axis encoder 2027 (see FIG. 76) which are disposed inside the device 2024. Further, the teaching device 2024 is provided with a third-axis switch 2028. For example, as shown in FIG. 74, when the third-axis switch 2028 is actuated while the grindstone 2013 is grinding the X-Y processed surface 2014 set through the processed surface setting switch 2019, the Z-direction moving motor 2007 is driven, and the grindstone 2013 is thereby moved in the Z-direction. On the teaching device 2024 are further disposed a designation start switch 2029 and a designation end switch 2030 for designating a movement starting position and a movement terminating position, respectively, for each of the grinding blocks on the workpiece 101 in the teaching step.

These switches are connected to the input side of a CPU 2031 which is incorporated in the control board 2017. To the output side of the CPU 2031 are connected the motors 2003, 2005 and 2007 for movement in the X-, Y- and Z-directions, the grindstone driving motor 2011, and a valve 2034 for controlling the operation of the pressure cylinder 2015.

Driving and stop signals are output from the CPU 2031 to the above-described motors and valve. To the CPU 2031 are further connected a ROM 2032 for storing a program or the like for controlling the operation of the whole of the grinding apparatus and a RAM 2033 which serves as a memory means for rewritably storing a moving path of the grindstone 2013 in the X-, Y- and Z-directions in the teaching step.

Figure 77:
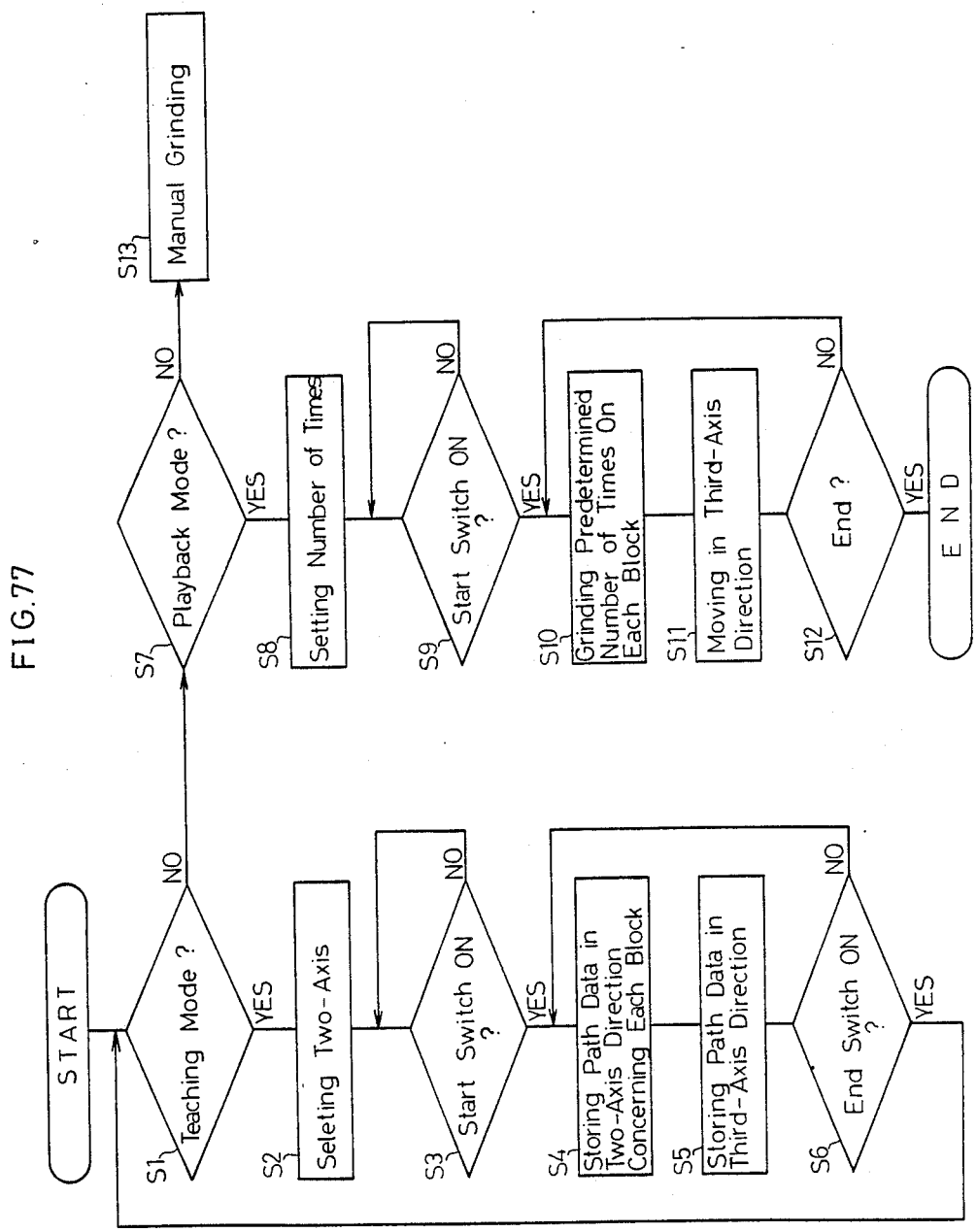
FIG. 77 is a flowchart showing the operation.
Figure 79:
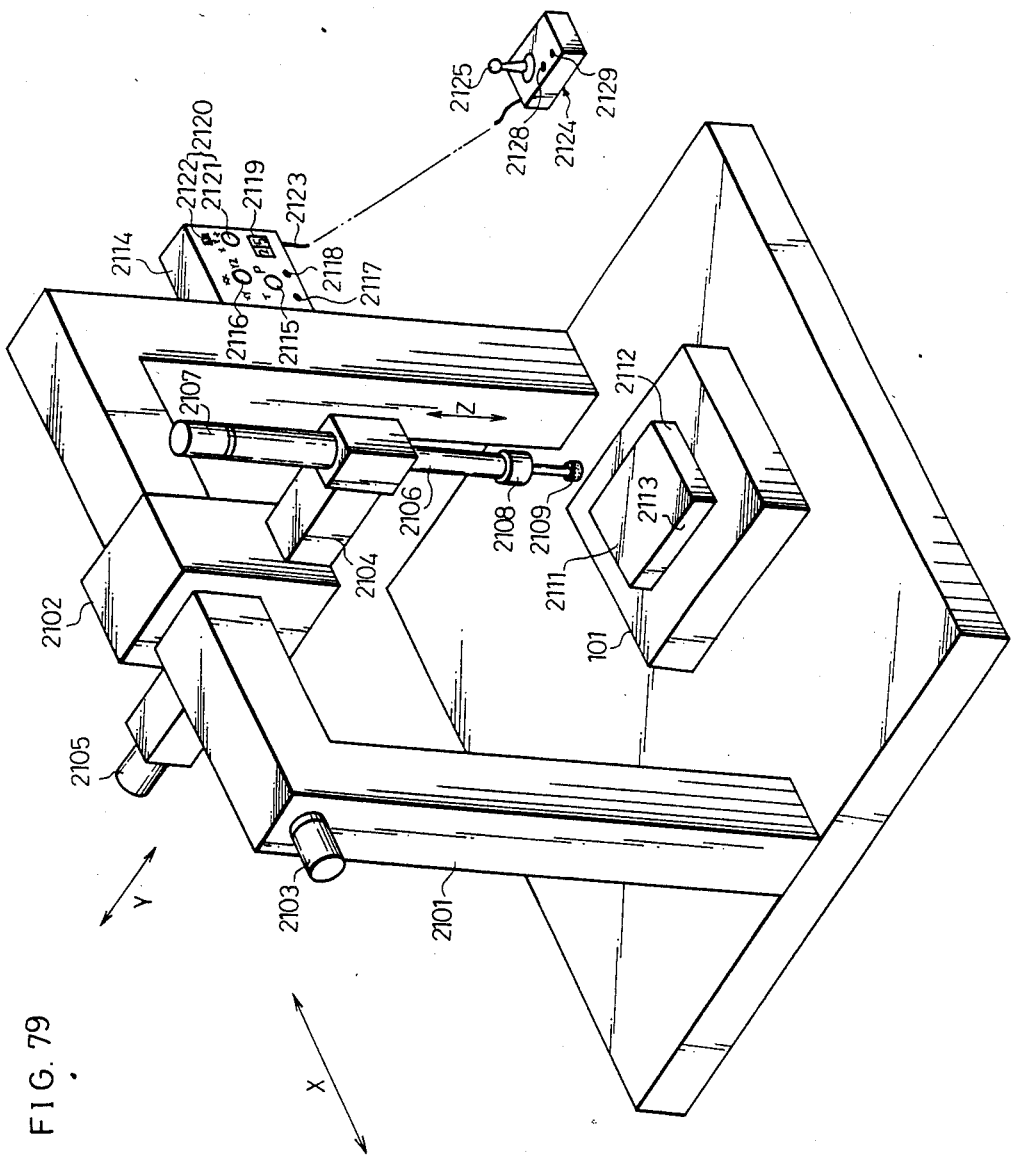
FIG. 79 is a perspective view of a die polishing machine in which the present invention is carried out.

The operation of the grinding apparatus arranged as described above which is carried out in the case of grinding a ribbed workpiece 101 which has a plurality of grinding blocks 141 to 145 will next be explained with reference to the flowchart shown in FIG. 77.

First, the teaching mode is selected using the mode selecting switch 2018 (Step S1). Then, two axes, i.e., X and Y, are selected using the processed surface setting switch 2019, thereby setting an X-Y processed surface 2014 of each of the grinding blocks 141 to 145 (Step S2). Subsequently, the start switch 2021 is actuated (Step S3) to start the teaching step.

The grindstone driving motor 2011 is started in a state wherein the grindstone 2013 is disposed within the first grinding block 141 and the grindstone 2013 is pressed against the X-Y processed surface 2014 by means of the pressure cylinder 2015 as shown in FIG. 73. After the designation start switch 2019 of the teaching device 2024 has been actuated (the point 151 in FIG. 75), the operating lever 2025 is tilted in a desired direction. In consequence, detection signals in accordance with the direction and amount of tilting of the lever 2025 are output from the encoders 2026 and 2027 to the CPU 2031. On the basis of the detection signals, driving signals are output from the CPU 2031 to the X- and Y-axis moving motors 2003 and 2005. As the motors 2003 and 2005 rotate, the grindstone 2013 is moved along a desired grinding path in the two-axis directions, i.e., X and Y, and on the basis of the operation of the designation end switch 2030 (the point 152 in FIG. 75), the moving path data concerning the grinding block 141 is stored in the RAM 2033 (Step S4).

When the grindstone 2013 is to be moved to the subsequent grinding block 142 upon completion of the teaching of the grinding block 141, the pressure cylinder 2015 is activated to bring the pivoting base 2010 into contact with the stop screw 2016 shown in FIG. 74. After the grindstone 2013 has been separated from the X-Y processed surface 2014, it is moved out of the block 141, and in this state, the third-axis switch 2028 is actuated. In consequence, when the X-Y processed surface 2014 is set, the Z-direction moving motor 2007 is started, and the grindstone 2013 is thereby disposed at a position which faces the subsequent grinding block 142, and the moving path data of the grindstone 2013 in the third-axis direction is stored in the RAM 2033 (Step S5). Thus, when the grinding blocks are changed from one to another, the grindstone 2013 can readily be moved in the third-axis direction by actuating the third-axis switch 2028 without the need to set a processed surface which is to be ground subsequently.

The above-described operation is repeated, and when teaching of the whole grinding blocks 141 to 145 is finished, the end switch 2022 is actuated (Step S6). Then, the playback mode is set (Step S7) using the mode selecting switch 2018. After a number of times of required movement of the grindstone 2013 has been set (Step S8) by actuating the number-of-times setting device 2020 on the control board 2017, the start switch 2021 is actuated (Step S9). In consequence, the moving path data stored in the RAM 2033 for each of the grinding blocks in the above-described teaching step is successively read out. Then, the X- and Y-direction moving motors 2003 and 2005 are driven on the basis of the read data, and the grindstone 2013 is thereby reciprocatively moved a predetermined number of times on the X-Y processed surface 2014 of each of the grinding blocks 141 to 145 (Step S10). When the blocks are changed from one to another, the Z-direction moving motor 2007 is driven to move the grindstone 2013 in the third-axis direction (Step S11). These operations are repeated to complete a plurality of block grinding operations sequentially, and when this is confirmed by an end signal (Step S12), the operation of grinding the X-Y processed surface 2014 of the workpiece 101 is finished.

Figure 75:
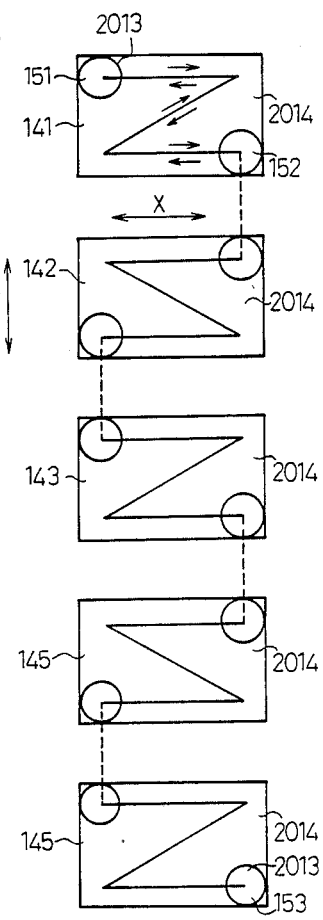
FIG. 75 is a plan view which is employed to describe the block grinding operation.

Accordingly, if a ribbed workpiece 101 having a plurality of grinding blocks is machined by the above-described playback grinding, the number of times of movement of the grindstone 2013 along non-grinding paths (shown by the broken line in FIG. 75) corresponding to the ribs of the workpiece 101 is reduced as compared with the grinding method in which the grindstone is reciprocatively moved a set number of times between the movement terminating position and the movement starting position (between the points 151 and 153 in FIG. 75). Accordingly, it is possible to eliminate the time wastefully consumed and thereby improve the machining efficiency. It should be noted that in this grinding apparatus the workpiece 101 can also be machined by a manual operation by setting the manual grinding mode using the mode selecting switch 2018 (Step S13).

Figure 78:
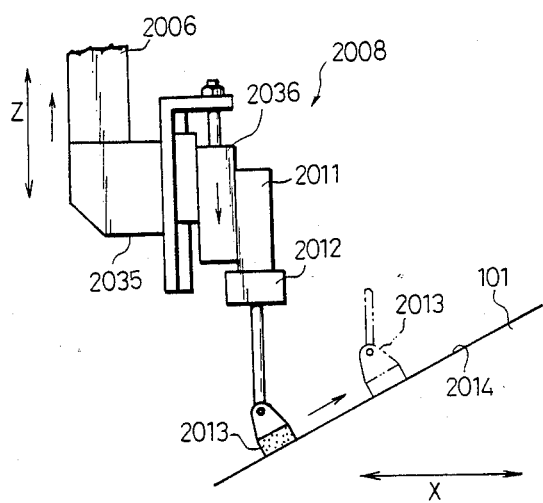
FIG. 78 is a front view of another example of the wheel head.

Referring to FIG. 78, which shows another example of the wheel head 2008, a pressure cylinder 2036 for pressing the grindstone 2013 against a slanted X-Y processed surface 2014 is mounted on the bracket 2035. As the wheel head 2008 is moved in the X-direction (the horizontal direction as viewed in the figure), the grindstone 2013 is able to grind the processed surface 2014 while moving along the body of the pressure cylinder 2036.

In this arrangement, if the movement of the grindstone 2013 exceeds the effective stroke of the pressure cylinder 2036, the above-described third-axis switch 2028 is actuated to drive the Z-direction moving motor 2007 so as to move the wheel head 2008 vertically. By so doing, with the apparatus maintained in the state which has been set for the X-Y processed surface 2014, the pressure cylinder 2036 can effectively be actuated to grind the slanted processed surface over a wide range. In addition, it is possible to carry out the teaching step for this slanted X-Y processed surface 2014 continuously and smoothly.

A twentieth embodiment of the present invention will next be described with reference to FIGS. 79 to 84.

A control board 2114 is mounted on a frame 2101, and on this control board 2114 are disposed a mode selecting switch 2115 for selecting one of the manual operation mode, the teaching mode and the playback mode, a surface selecting switch 2116 for selecting one processed surface from the X-Y processed surface 2111, the X-Z processed surface 2112 and the Y-Z processed surface 2113, a start switch 2117 for starting the teaching or playback step, an end switch 2118 for finishing each of the steps, a number-of-times setting device 2119 for setting a number of times of movement of the grindstone 2109 required in the playback step, and a shift amount setting device 2120 for inputting an amount of shift when a grinding path of the grindstone 2109 is set in the playback step in such a manner that said grinding path is shifted from the moving path stored in the teaching step. The shift amount setting device 2120 consists of a direction selecting switch 2121 for selecting a direction in which the grinding path is to be shifted and a digital switch 2122 for setting an amount of shift.

A portable and remote-controllable teaching device 2124 is connected to the control board 2114 through a cable 2123. The device 2124 has an operating member 2125 which is tiltable within the range of 360°. A direction and amount of tilting of the operating member 2125 are detected by means of a composite signal consisting of signals respectively output from a first-axis encoder 2126 and a second-axis encoder 2127 (see FIG. 81) which are disposed inside the device 2124. The teaching device 2124 is further provided with a shift switch 2128 which is actuated when the grindstone 2109 needs to move along a shifted grinding path in the playback step. Further, a reset switch 2129 is provided on the device 2124. When the teaching step is to be started, a preliminary moving path 171 from the first position 161 of the grindstone 2109 to the teaching start position 162 shown in FIG. 80 can be erased from the teaching data by actuating the reset switch 2129.

Figure 81:
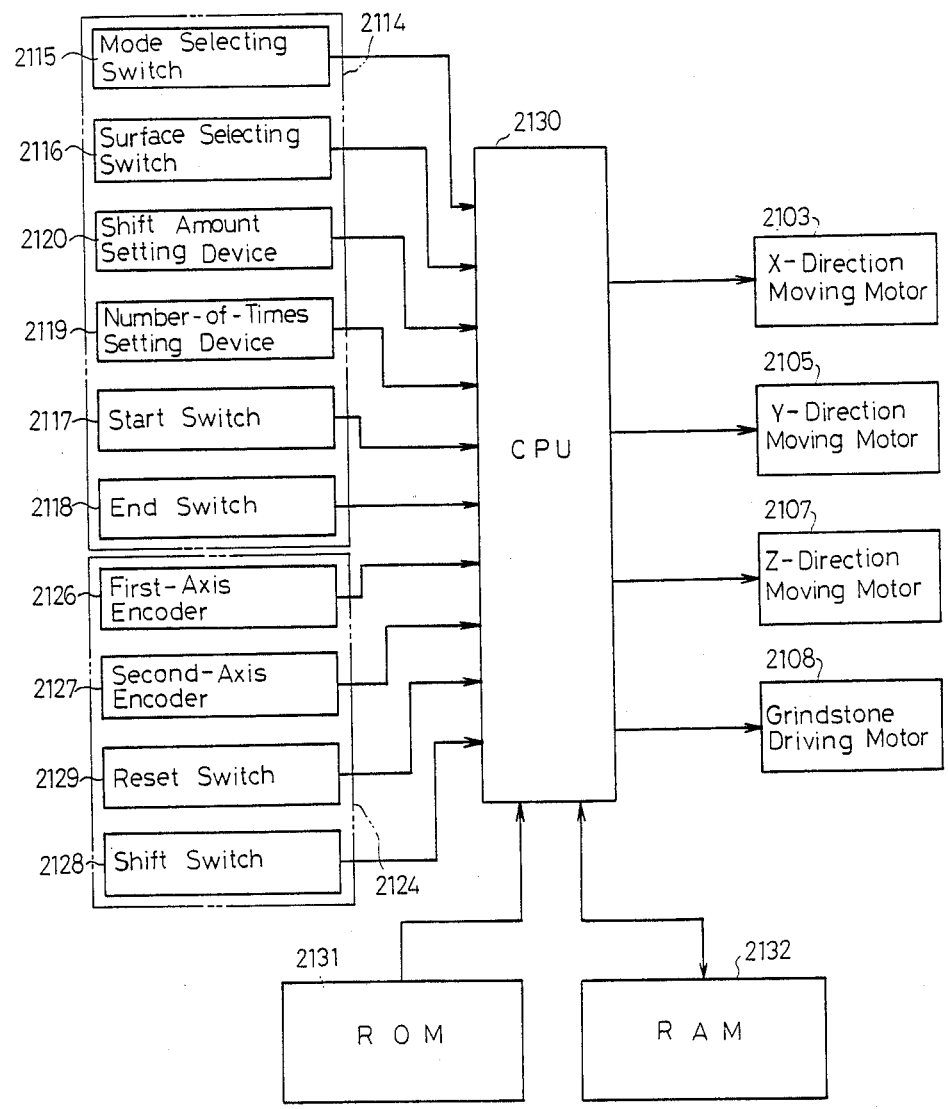
FIG. 81 is a block diagram schematically showing a control circuit for the die polishing machine.

As shown in FIG. 81, the above-described switches are connected to the input side of a CPU 2130 incorporated in the control board 2114. The X-, Y- and Z-direction moving motors 2103, 2105 and 2107 and the grindstone driving motor 2108 are connected to the output side of the CPU 2130, and driving and stop signals are output thereto from the CPU 2130. To the CPU 2130 are further connected a ROM 2131 for storing a program or the like for controlling the operation of the whole of the grinding apparatus, and a RAM 2132 which serves as a memory means for rewritably storing grinding path data for the grindstone 2109.

The following is a description of a grinding method which is carried out by the grinding apparatus arranged as described above. To effect teaching of a grinding path, the teaching mode is first selected using the mode selecting switch 2115 on the control board 2114. Then, the surface selecting switch 2116 is actuated to select, for example, the X-Y processed surface 2111, thereby setting two directions, i.e., X and Y, as directions of movement of the grindstone 2109.

Subsequently, the start switch 2117 is actuated, and the operating member 2125 of the teaching device 2124 is tilted in a desired direction. In consequence, detection signals in accordance with the direction and amount of tilting of the operating member 2125 are output from the encoders 2126 and 2127 to the CPU 2130. On the basis of the detection signals, driving signals are output from the CPU 2130 to the X- and Y-motors 2103 and 2105. As the motors 2103 and 2105 rotate, the grindstone 2109 is moved along a desired grinding path in the X- and Y-directions, and the grinding path data is stored in the RAM 2132.

This grinding path data includes the above-described preliminary moving path data stored at the start of teaching. However, since in the playback grinding operation the grindstone 2109 need not be moved on the preliminary moving path 171, if the reset switch 2129 is actuated when the grindstone 2109 reaches the teaching start position 162 during the teaching operation, the preliminary moving path data 171 concerning the path therebefore can be erased from the RAM 2132.

In this way, the teaching step is completed, and the above-described mode selecting switch 2115 is then actuated to set the playback mode. Then, in response to the operation of the start switch 2117, the grinding path data stored in the RAM 2132 in the teaching step is read out, and on the basis of the read data, the X- and Y-direction moving motors 2103 and 2105 are driven to cause the grindstone 2109 to be reciprocatively moved on the X-Y processed surface 2111 along the set grinding path a number of times preset by means of the number-of-times setting device 2119, thus enabling the workpiece 101 to be automatically ground by the oscillation or rotation of the grindstone 2109.

Figure 80:
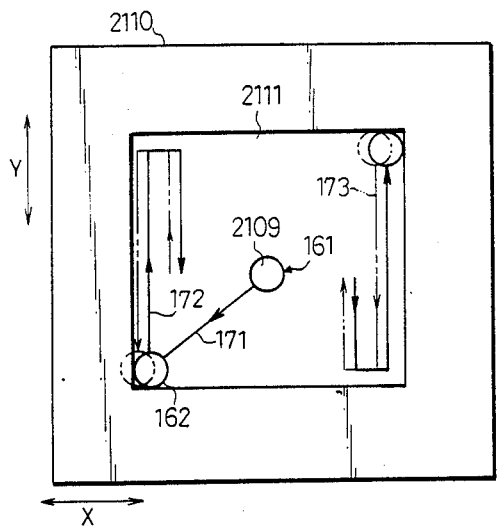
FIG. 80 is a plan view of a die for describing the grinding method according to the present invention.
Figure 83:
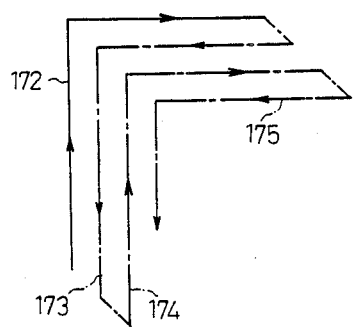
FIGS. 82 to 84 respectively show other examples of the grinding method according to the present invention.

In this case, if the shift switch 2128 is actuated when the playback step is to be started, the teaching path 172 is reset on the basis of a direction and amount of shift which have been preset using the direction selecting switch 2121 and the digital switch 2122 of the shift amount setting device 2120 as shown by the two-dot chain line in FIG. 80. Accordingly, if, in this state, the start switch 2117 is actuated, the grindstone 2109 is reciprocatively moved a set number of times alternately along the reset playback path and teaching path 172, thereby allowing the processed surface 2111 to be finished beautifully without any moving pattern of the grindstone 2109 left thereon.

Figure 82:
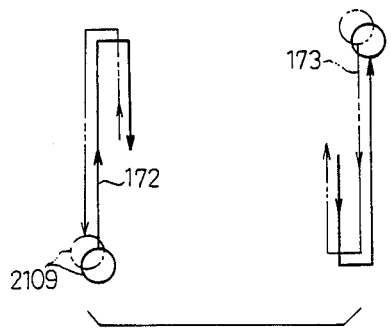
Figure 84:
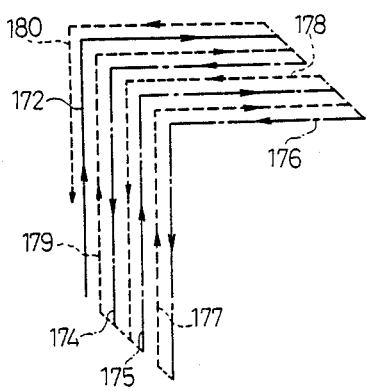
Figure 85:
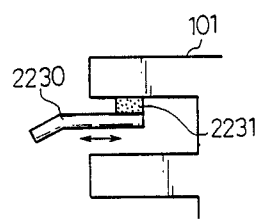
FIG. 85 is a front view of a grinding tool in accordance with a related art.

It should be noted that, although in FIG. 80 the teaching path 172 is shifted only in the X-direction to reset the playback path 173, this is not necessarily limitative, and it is also possible to reset the playback path 173 by shifting the teaching path 172 in both the X- and Y-directions as shown in FIG. 82. Alternatively, the teaching path 172 may be successively shifted in both the X- and Y-directions to set the playback path as at 174, 175, 176 . . . , or it is also possible to set a playback path as at 174 to 176 and further set a playback path as at 177 to 180 which returns toward the teaching path 172 by shifting the teaching path by a predetermined amount in the opposite direction to the above as shown in FIG. 84.

What is claimed is:

1. A grinding apparatus for processing a first surface of a workpiece and a second surface of said workpiece, said second surface intersecting said fist surface, said apparatus comprising:
   a frame including a pair of supports standing in opposing relation to each other and a support frame which is stretched between and secured to the respective upper end portions of said supports;
   first moving means provided on said support frame in such a manner that said first moving means is reciprocatable in a first horizontal direction;
   second moving means provided on said first moving means in such a manner that said second moving means is reciprocatable in a second horizontal direction which intersects the first horizontal direction at right angles;
   third moving means provided on said second moving means in such a manner that said third moving means is reciprocatable in the vertical direction;
   a wheel head having a longitudinal axis, said wheel head being provided on said third moving means to be movable in the vertical direction;
   grinding means provided on said wheel head for performing a grinding operation on said first and second surfaces of said workpiece;
   first pressing means operatively connected between said third moving means and said wheel head to urge said wheel head in the direction of the longitudinal axis thereof toward said first surface of said workpiece so that said grinding means is pressed against said first surface of said workpiece while performing the grinding operation; and
   second pressing means operatively connected between said third moving means and said wheel head to urge said wheel head in a direction intersecting the direction of the longitudinal axis of said wheel head toward said second surface of said workpiece so that said grinding means is pressed against said second surface of said workpiece while performing the grinding operation;
   said apparatus further comprising control means operatively connected with and controlling said first and second pressing means so that, when two directions among three directions are selected as directions of movement of said grinding means, at least one of said first and second pressing means presses said grinding means against said surfaces of said workpiece in the remaining one of said three directions with a predetermined pressure.

2. A grinding apparatus according to claim 6, wherein a table (55) for supporting the workpiece (101) in the area between said supports (3) is provided so as to be movable to the area between said supports (3).

3. A grinding apparatus according to claim 1, wherein each of said supports 3 comprises a fixed tube (3a) and a movable tube (3c) which is slidably fitted to said fixed tube (3a) and which is vertically movable by drive means (7).

4. A grinding apparatus according to claim 1, wherein first rotating means (26 to 31) is provided between said second moving means (21) and said third moving means (37) so that said third moving means (37) is rotatable about an axis which extends in the direction of movement of said second moving means (21).

5. A grinding apparatus according to claim 4, wherein second rotating means (32 to 36) is provided between said first rotating means (26 to 31) and said third moving means (37) so that said third moving means (37) is rotatable about a horizontal axis which intersects at right angles the axis extending in the direction of movement of said second moving means (21).

6. A grinding apparatus according to claim 1, wherein said first pressing means (52, 244) is provided between a guide support bar (43, 231) attached to the lower end of said third moving means (37, 128) and a slide member (45, 235) which is provided on said support bar (43, 231) in such a manner that said slide member is slidable in the longitudinal direction of said support bar; and said second pressing means (247) is provided between said slide member (235) and a support arm (236) which is pivotally provided on said slide member (235) through a shaft (237) which extends in the direction of movement of said first moving means (16).

7. A grinding apparatus according to claim 6, wherein a control circuit is connected to a first air cylinder (244) and a second air cylinder (247), said control circuit including switching valves (266a, 266b, 267a, 267b) for switching these air cylinders from an operative state to an inoperative state and vice versa.

8. A grinding apparatus according to claim 6, wherein an air motor (238) for driving the grinding means (242) is provided between said support arm (236)

and said grinding means (242), and an overload sensor (365) is provided outside said air motor (238), said sensor being adapted to detect abnormal approach of said support arm (236) during machining of a processed surface (104) of the workpiece (101) which faces in the direction of movement of said third moving means (218) and to thereby detect generation of an overload acting on said support arm (236).

9. A grinding apparatus according to claim 6, wherein said first pressing means comprises an air cylinder (52, 244) mounted on said slide member (45, 235), and a piston rod (246) having its distal end secured to said third moving means (37, 218).

10. A grinding apparatus according to claim 9, wherein a pair of first overload sensors (361, 362) are provided inside said air cylinder (244) at both its ends, respectively, said first overload sensors being adapted to detect abnormal approach of a piston (245) during machining of a processed surface (104) of the workpiece (101) which faces in the direction of movement of said third moving means (218) and to thereby detect an overload acting on said grinding means (242).

11. A grinding apparatus according to claim 6, wherein said second pressing means comprises an air cylinder (247) which is pivotally mounted on said slide member (235) through a shaft (249) extending horizontally, and a piston rod (246) having its distal end secured to said support arm (236).

12. A grinding apparatus according to claim 11, wherein a pair of second overload sensors (363, 364) are provided inside said air cylinder (247) at both its ends, respectively, said second overload sensors being adapted to detect abnormal approach of a piston (250) during machining of processed surfaces (102, 103) of the work piece (101) which face in the directions of movement of said first and second moving means (16, 21), respectively, and to thereby detect an overload acting on said grinding means (242).

13. A grinding apparatus according to claim 11, wherein said slide member (235) is provided with a stopper (253) on the side thereof which faces said second pressing means (247), said stopper being adapted to limit the pivoting of said support arm (236).

14. A grinding apparatus according to claim 13, wherein said slide member (235) is further provided with a support member (254) for receiving said stopper (253), said support member (254) being provided therein with a fourth overload sensor (366) adapted to detect abnormal withdrawal of said stopper (253) during machining of a processed surface (104) of the workpiece (101) which faces in the direction of movement of said third moving means (218) and to thereby detect generation of an overload acting on said support arm (236).

15. A grinding apparatus according to claim 6, wherein said third moving means (37, 218) has a moving shaft (812) at its lower end, and rotating means (817) is provided between said moving shaft (812) and said wheel head (814), said wheel head (814) being rotatable together with said rotating means (817) about the axis of said moving shaft (812).

16. A grinding apparatus according to claim 15, wherein said rotating means (817) comprises a casing (818) mounted on said moving shaft (812), a servomotor (819) provided on one side of said casing (813), a worm (821) provided inside said casing (818) and rotated by said servomotor (819), and a worm wheel (823) provided at the lower end of said moving shaft (812) and engaged with said worm (821).

17. A grinding apparatus according to claim 16, wherein said casing (818) is further provided with a rotary encoder (824) which detects an angle of rotation of said worm (821).

18. A grinding apparatus according to claim 15, wherein said first and second pressing means (831, 845) include a bracket (816) pivotally attached through a horizontally extending shaft (825) to a head block (815) which is mounted on said third moving means (39, 218), said first pressing means (831) being mounted on said bracket (816) and adapted to move said grinding means (838) in a direction parallel to said bracket (816) and to thereby press said grinding means (838) against a processed surface (105, 196, 107) of the workpiece (101) with a predetermined pressure, said second pressing means (845) being mounted between said head block (815) and said bracket (816) and being adapted to pivot said bracket (816) and to thereby press said grinding means (838) against a processed surface (105, 106, 107) of the workpiece (101) in the direction of pivoting of said bracket (816) with a predetermined pressure.

19. A grinding apparatus according to claim 18, wherein said first and second pressing means are first and second air cylinders (831, 845), respectively, and drive means (835) for activating said grinding means (838) to perform a grinding motion is provided between said first air cylinder (831) and said grinding means (838).

20. A grinding apparatus according to claim 19, wherein said drive means (835) is detachable with respect to said wheel head (814) together with said grinding means (838).

21. A grinding apparatus according to claim 20, wherein each of said first air cylinder (831) and said second air cylinder (845) is provided with a pressure regulating mechanism (1841, 1842) for regulating the amount of supply of a fluid, said pressure regulating mechanism being provided on said wheel head (1814) or on the side of said third moving means (39, 218) which is in the vicinity of said wheel head (1814).

22. A grinding apparatus according to claim 21, wherein said pressure regulating mechanism comprises a pressure regulating valve (1841) and a pressure gage (1842).

23. A grinding apparatus according to claim 22, wherein said pressure regulating mechanism is provided on a mounting ring (1840) which is rotatably fitted on the lower end of said third moving means (39, 218).

* * * * *